(12) United States Patent
Kawai et al.

(10) Patent No.: US 10,416,481 B2
(45) Date of Patent: Sep. 17, 2019

(54) SEMICONDUCTOR DEVICE

(71) Applicant: RENESAS ELECTRONICS CORPORATION, Tokyo (JP)

(72) Inventors: Tohru Kawai, Ibaraki (JP); Shinichi Watanuki, Ibaraki (JP); Yasutaka Nakashiba, Ibaraki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/182,259

(22) Filed: Nov. 6, 2018

(65) Prior Publication Data
US 2019/0196231 A1 Jun. 27, 2019

(30) Foreign Application Priority Data

Dec. 22, 2017 (JP) .................................. 2017-245974

(51) Int. Cl.
*G02F 1/025* (2006.01)
(52) U.S. Cl.
CPC ........ *G02F 1/025* (2013.01); *G02F 2201/063* (2013.01); *G02F 2203/50* (2013.01)
(58) Field of Classification Search
CPC ........................... G02F 1/025; G02F 2201/063; G02F 2203/50
See application file for complete search history.

(56) References Cited

U.S. PATENT DOCUMENTS

| 5,434,943 A * | 7/1995 | Dentai ................... G02F 1/218 257/80 |
| 6,912,079 B2 * | 6/2005 | Liu ........................ G02F 1/025 359/245 |
| 8,483,520 B2 | 7/2013 | Fujikata et al. |
| 8,712,204 B2 * | 4/2014 | Kondo ................... G02B 6/122 385/132 |
| 9,158,138 B2 | 10/2015 | Liu et al. |
| 9,341,868 B2 * | 5/2016 | Fujikata ................. G02F 1/025 |
| 9,880,404 B2 | 1/2018 | Ogawa et al. |
| 10,120,212 B2 * | 11/2018 | Baehr-Jones ........... G02F 1/015 |
| 2017/0102564 A1 | 4/2017 | Sakamoto et al. |

FOREIGN PATENT DOCUMENTS

| JP | 2016-524722 A | 8/2016 |
| JP | 2017-509022 A | 3/2017 |
| JP | 2017-072808 A | 4/2017 |
| WO | 2010/098248 A1 | 9/2010 |

\* cited by examiner

*Primary Examiner* — Ryan A Lepisto
(74) *Attorney, Agent, or Firm* — McDermott Will & Emery LLP

(57) ABSTRACT

The performances of a semiconductor device are improved. The semiconductor device includes an insulation layer, an optical waveguide part formed over the insulation layer, and including a p type semiconductor region and an n type semiconductor region formed therein, and an interlayer insulation film formed over the insulation layer in such a manner as to cover the optical waveguide part. At the first portion of the optical waveguide part, in a cross sectional view perpendicular to the direction of extension of the optical waveguide part, the n type semiconductor region is arranged at the central part of the optical waveguide part, and the p type semiconductor region is arranged in such a manner as to surround the entire circumference of the n type semiconductor region.

20 Claims, 27 Drawing Sheets

SEMICONDUCTOR DEVICE

CROSS-REFERENCE TO RELATED APPLICATIONS

The disclosure of Japanese Patent Application No. 2017-245974 filed on Dec. 22, 2017 including the specification, drawings and abstract is incorporated herein by reference in its entirety.

BACKGROUND

The present invention relates to a semiconductor device, and is preferably applicable to, for example, a semiconductor device including a silicon photonics device therein.

In recent years, a silicon photonics technology has been developed. The silicon photonics technology is a technology of establishing a coupling between an optical device and an electronic device by an optical circuit using an optical waveguide including silicon as the material. The semiconductor device for thus coupling an optical device and an electronic device using an optical circuit, and including these mounted therein is referred to as an optical communication module.

Some such semiconductor devices each have an optical waveguide formed of a semiconductor layer formed over a base material via an insulation layer as the transmission line for an optical signal, and an insulation film formed in such a manner as to cover the optical waveguide. At this step, the optical waveguide functions as a core layer, and the insulation layer and the insulation film function as a cladding layer.

Patent Document 1 (Japanese Unexamined Patent Application Publication No. 2017-72808), Patent Document 2 (Japanese Unexamined Patent Application Publication (Translation of PCT Application) No. 2016-524722), Patent Document 3 (Japanese Unexamined Patent Application Publication (Translation of PCT Application) No. 2017-509022), and Patent Document 4 (WO 2010/098248) each describe an optical modulator using an optical waveguide including a p type semiconductor region and an n type semiconductor region formed therein.

CITED DOCUMENTS

Patent Documents

[Patent Document 1] Japanese Unexamined Patent Application Publication No. 2017-72808
[Patent Document 2] Japanese Unexamined Patent Application Publication (Translation of PCT Application) No. 2016-524722
[Patent Document 3] Japanese Unexamined Patent Application Publication (Translation of PCT Application) No. 2017-509022
[Patent Document 4] WO 2010/098248

SUMMARY

The present inventors have conducted a study on an optical modulator using a pn junction in a semiconductor device to which a silicon photonics technology is applied. The semiconductor device including such an optical modulator is also expected to be improved in performances.

Other problems and novel features will be apparent from the description of the present specification and the accompanying drawings.

In accordance with one embodiment, a semiconductor device includes an optical waveguide including a first semiconductor region of a first conductivity type, and a second semiconductor region of a second conductivity type different from the first conductivity type formed therein. At a first portion of the optical waveguide, in a cross sectional view perpendicular to the direction of extension of the optical waveguide, the first semiconductor region is arranged at the central part of the optical waveguide, and the second semiconductor region is arranged in such a manner as to surround the entire circumference of the first semiconductor region.

In accordance with one embodiment, the performances of a semiconductor device can be improved.

DETAILED DESCRIPTION

Figure 1:
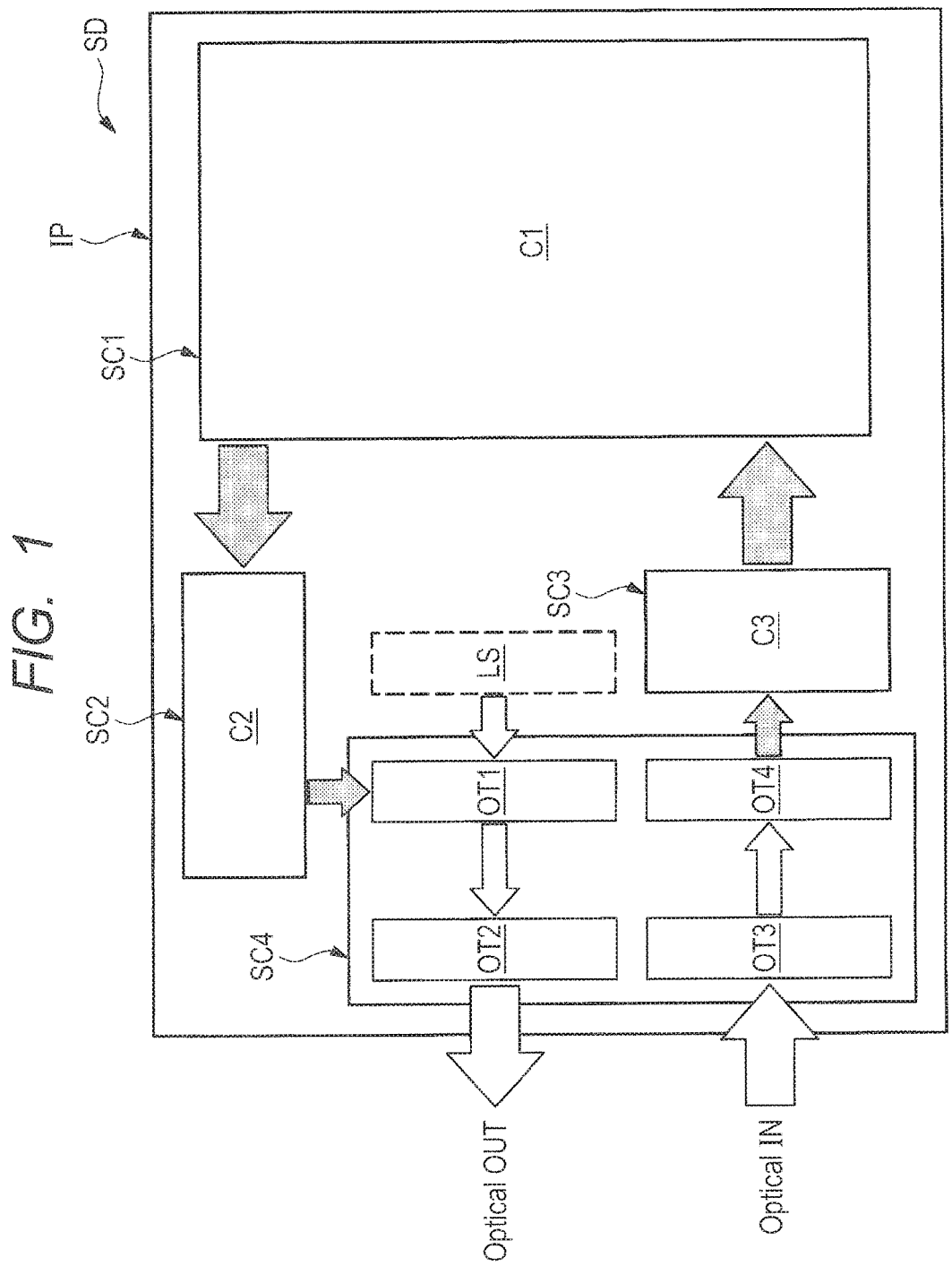
FIG. 1 is a schematic view showing a configuration example of an optical communication module in accordance with one embodiment.

In description of the following embodiment, the embodiment may be described in a plurality of divided sections or embodiments for convenience, if required. However, unless otherwise specified, these are not independent of each other, but are in a relation such that one is a modified example, details, a complementary explanation, or the like of a part or the whole of the other. Further, in the following embodiments, when a reference is made to the number of elements, and the like (including number, numerical value, quantity, range, or the like), the number of elements, or the like is not limited to the specific number, but may be greater than or less than the specific number, unless otherwise specified, except for the case where the number is apparently limited to the specific number in principle, or except for other cases. Further, in the following embodiments, it is needless to say that the constitutional elements (including element steps, or the like) are not always essential, unless otherwise specified, and except for the case where they are apparently considered essential in principle, or except for other cases. Similarly, in the following embodiments, when a reference is made to the shapes, positional relationships, or the like of the constitutional elements, or the like, it is understood that they include ones substantially analogous or similar to the shapes or the like, unless otherwise specified, and unless otherwise considered apparently in principle, or except for other cases. This also applies to the foregoing numerical values and ranges.

Below, the embodiments will be described in details by reference to the accompanying drawings. Incidentally, in all the drawings for describing the embodiments, the members having the same function are given the same reference signs and numerals, and a repeated description thereon is omitted. Further, in the following embodiments, a description on the same or similar part will not be repeated in principle unless otherwise required.

Further, in drawings for use in the embodiments, hatching may be omitted even in a cross sectional view for ease of understanding of the drawing. Further, hatching may be added even in a plan view for ease of understanding of the drawing.

First Embodiment

Configuration Example of Optical Communication Module

A configuration example of an optical communication module in accordance with the present embodiment will be described by reference to FIG. 1. FIG. 1 is a schematic view showing a configuration example of an optical communication module in accordance with the present embodiment. In FIG. 1, for ease of understanding, the flow of an electric signal is indicated with arrows hatched with dots, and the flow of an optical signal is indicated with an arrow not hatched with dots.

As shown in FIG. 1, for example, the data outputted from a silicon electronic circuit C1 including a control circuit or a memory circuit formed therein is sent as an electric signal via a silicon electronic circuit (transceiver IC) C2 to an optical modulator OT1. The optical modulator OT1 is an optical device for converting the data sent as an electric signal into an optical signal. For example, a continuous wave laser light is made incident upon the optical modulator OT1 from a light source LS. At the optical modulator OT1, the phase of the light is manipulated, thereby to change the state of the optical signal. As a result, the data sent as an electric signal can be correlated with the phase state of the light. The optical signal modulated at the optical modulator OT1 is outputted from an optical communication module (semiconductor device) SD to the outside via an I/O element OT2 such as a grating coupler or a spot size modulator.

On the other hand, the optical signal inputted to the optical communication module (semiconductor device) SD is sent to a photodetector OT4 via an I/O element OT3 such as a grating coupler or a spot size modulator. The photodetector OT4 is an optical device for converting the data sent as an optical signal into an electric signal. Then, the data converted into an electric signal at the photodetector OT4 is sent to the silicon electronic circuit C1 via a silicon electronic circuit (receiver IC) C3.

For the transmission of the electric signal sent from the silicon electronic circuit C1 via the silicon electronic circuit C2 to the optical modulator OT1 and the electric signal sent from the photodetector OT4 via the silicon electronic circuit C3 to the silicon electronic circuit C1, an electric wire formed of a conductive material such as aluminum (Al), copper (Cu), or tungsten (W) is mainly used. On the other hand, for the transmission of an optical signal, a transmission line for an optical signal formed of, for example, silicon (Si) or germanium (Ge) (which will be hereinafter referred to as an optical signal line) is used. An optical waveguide described later corresponds to the optical signal line.

Further, the silicon electronic circuit C1 is formed in a semiconductor chip SC1, the silicon electronic circuit C2 is formed in a semiconductor chip SC2, the silicon electronic circuit C3 is formed in a semiconductor chip SC3, and the optical modulator OT1, the I/O elements OT2 and OT3, and the photodetector OT4 are formed in one semiconductor chip SC4. The semiconductor chips SC1, SC2, SC3, and SC4, and the light source LS are mounted in, for example, one interposer IP, thereby to form an optical communication module (semiconductor device) SD.

Incidentally, herein, an electronic device and an optical device are formed at different semiconductor chips, respectively. However, the present invention is not limited thereto. For example, an electronic device and an optical device can be formed at one semiconductor chip.

Regarding Structure of Semiconductor Device

Figure 2:
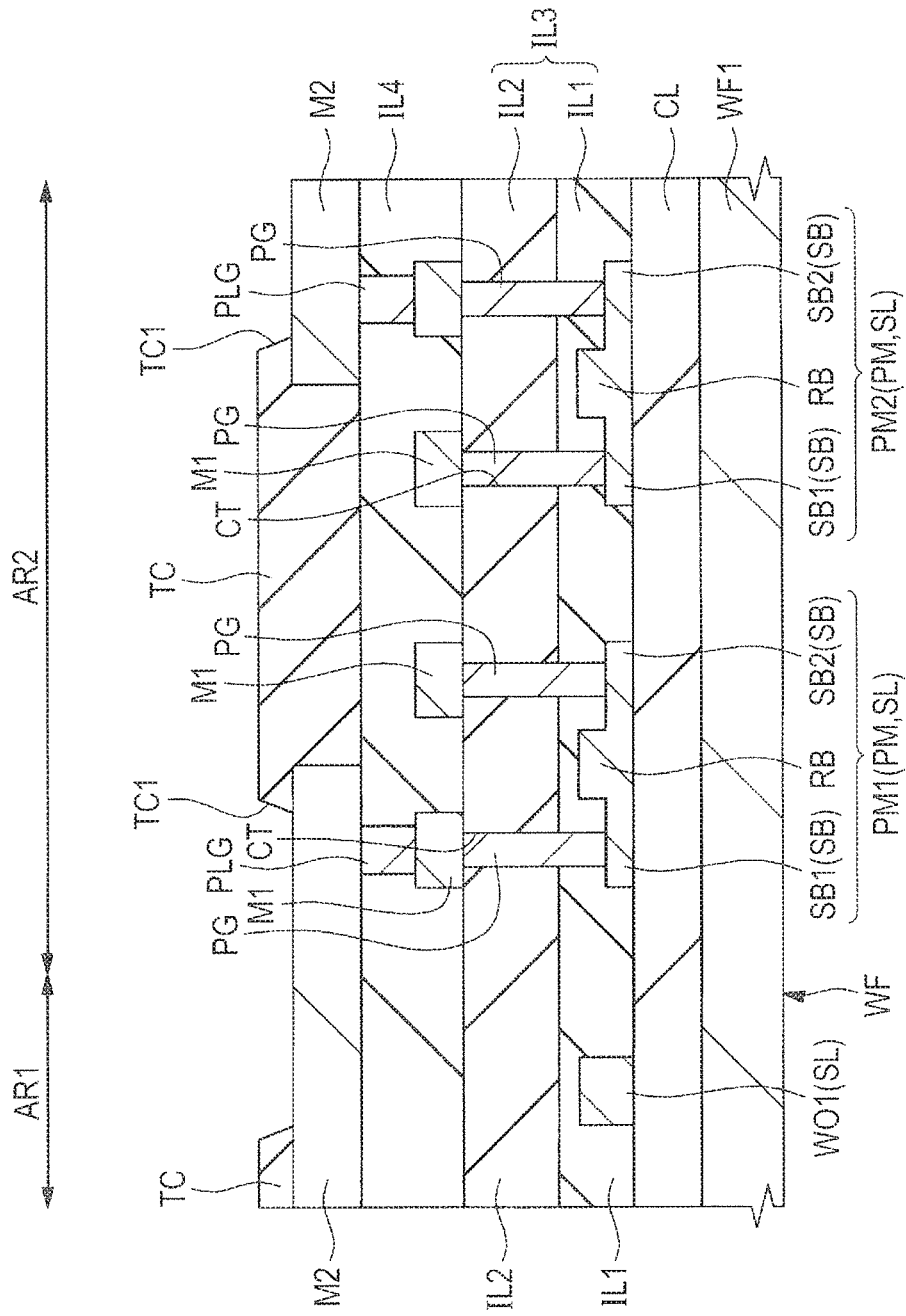
FIG. 2 is an essential part cross sectional view showing a semiconductor device of one embodiment.
Figure 3:
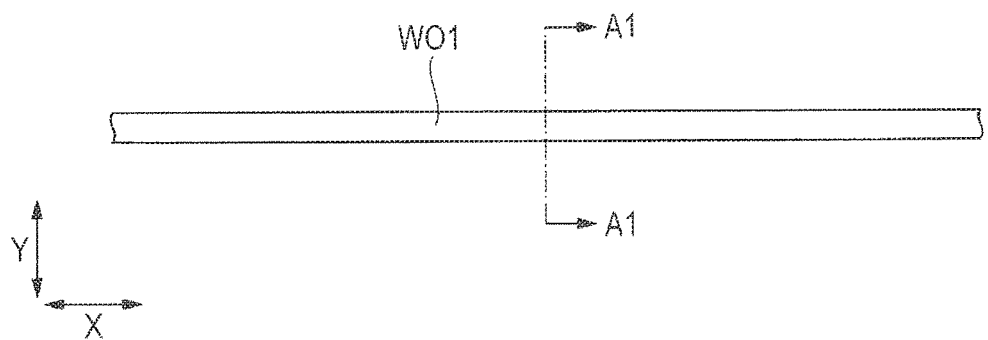
FIG. 3 is an essential part plan view of the semiconductor device of one embodiment.
Figure 4:
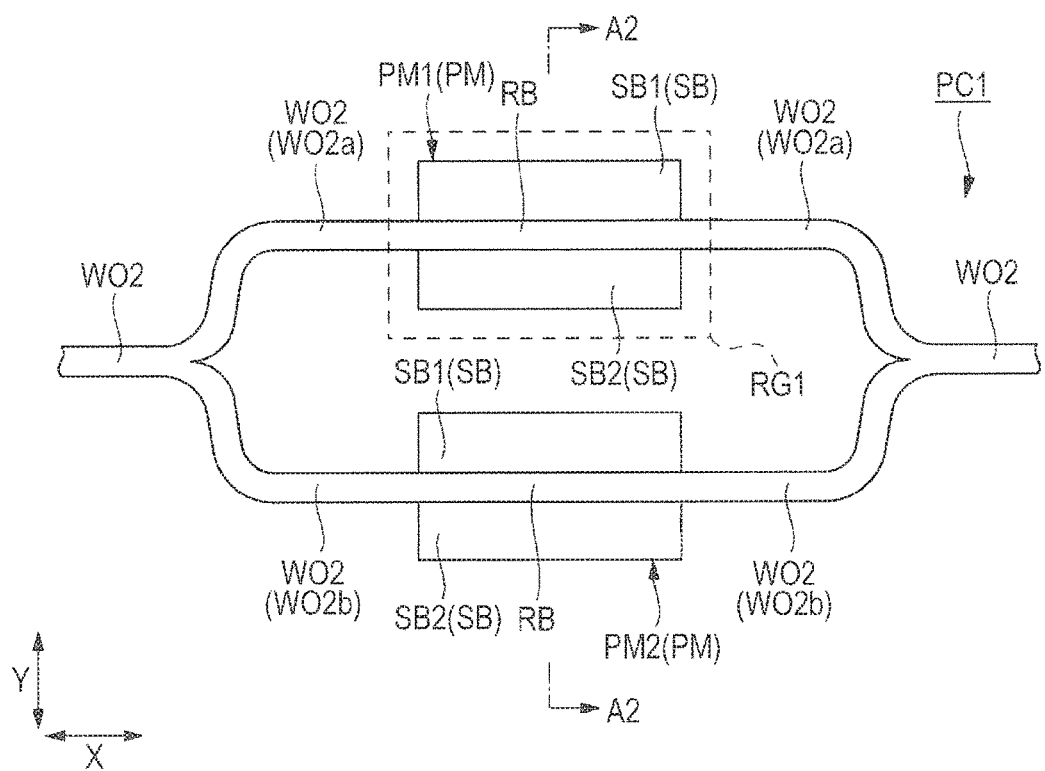
FIG. 4 is an essential part plan view of the semiconductor device of one embodiment.
Figure 9:
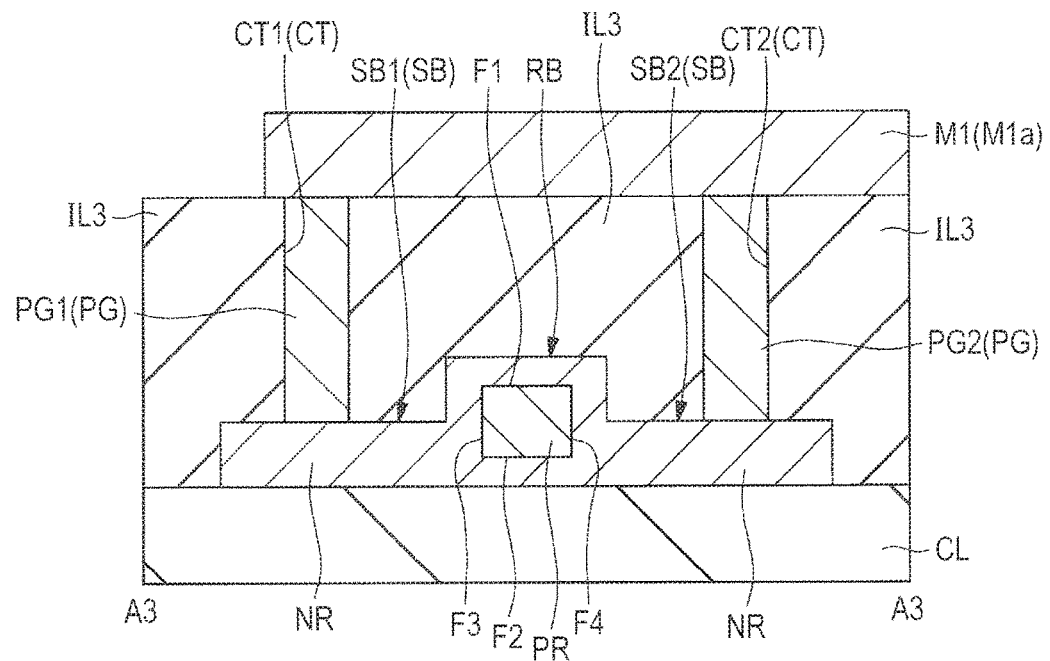
FIG. 9 is an essential part cross sectional view showing the semiconductor device of one embodiment.
Figure 10:
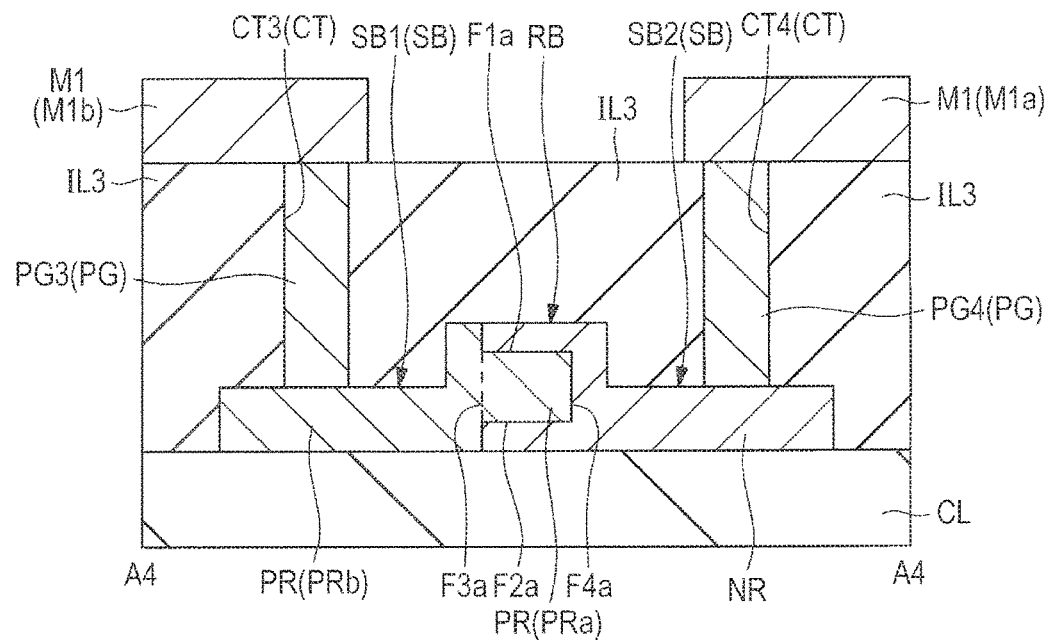
FIG. 10 is an essential part cross sectional view showing the semiconductor device of one embodiment.
Figure 11:
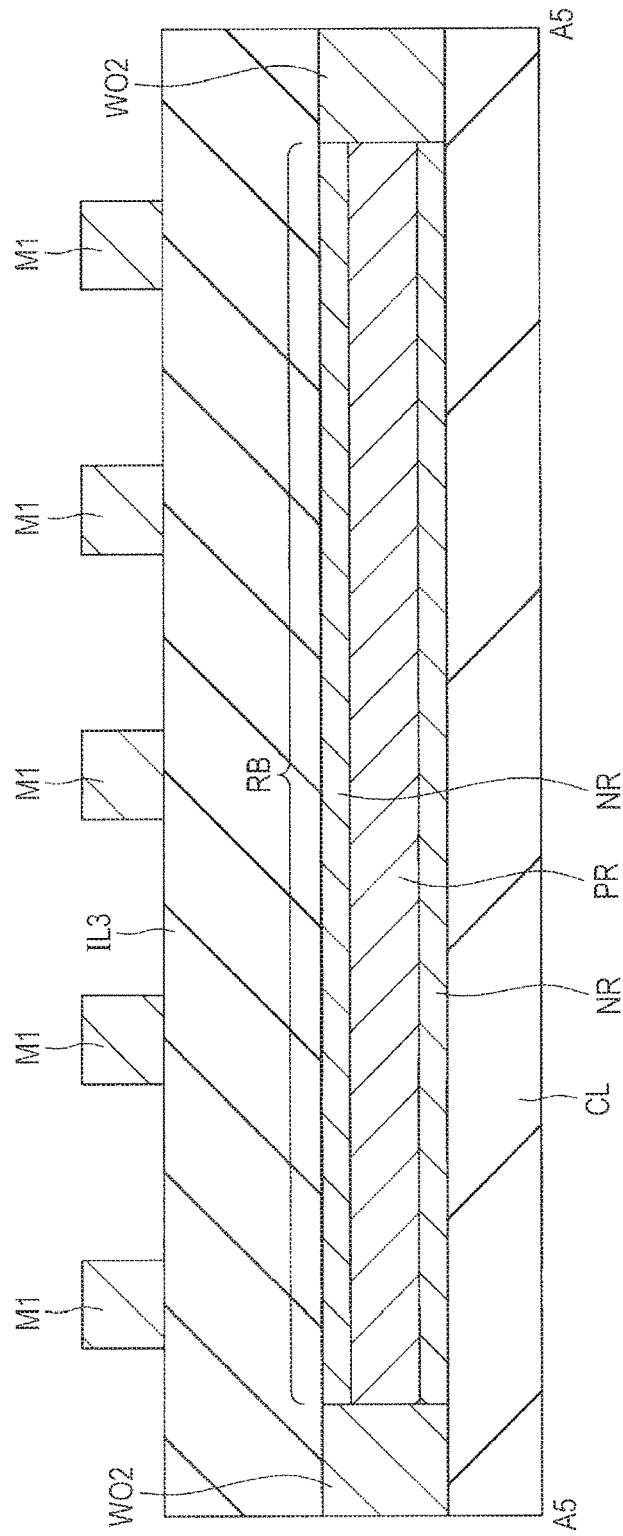
FIG. 11 is an essential part cross sectional view showing the semiconductor device of one embodiment.

FIG. 2 is an essential part cross sectional view showing a semiconductor device of the present embodiment. The semiconductor device shown in FIG. 2 corresponds to the semiconductor chip SC4 of FIG. 1. FIGS. 3 to 8 are each an essential part plan view of the semiconductor device of the present embodiment. FIGS. 9 to 11 are each an essential part cross sectional view of the semiconductor device of the present embodiment. FIG. 3 shows a plan perspective view of a region AR1 (see FIG. 2). FIG. 4 shows a plan perspective view of a region AR2 (see FIG. 2). The cross sectional view at a position along line A1-A1 of FIG. 3 corresponds to the cross section of the region AR1 of FIG. 2. The cross sectional view at a position along line A2-A2 of FIG. 4 corresponds to the cross section of the region AR2 of FIG. 2. FIGS. 5 to 8 each correspond to the partially enlarged plan view showing the region RG1 surrounded by a dotted line in FIG. 4 on an enlarged scale.

Figure 5:
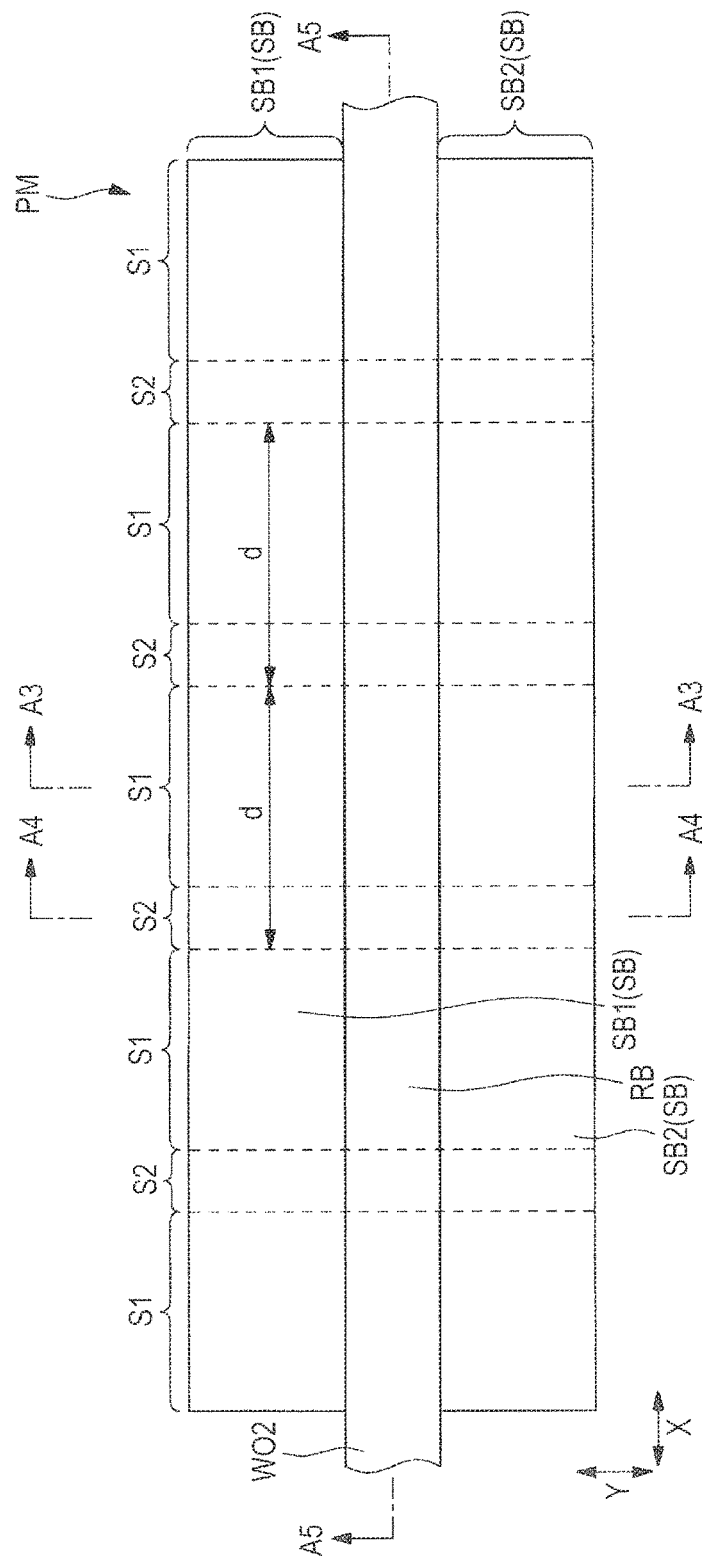
FIG. 5 is an essential part plan view of the semiconductor device of one embodiment.
Figure 6:
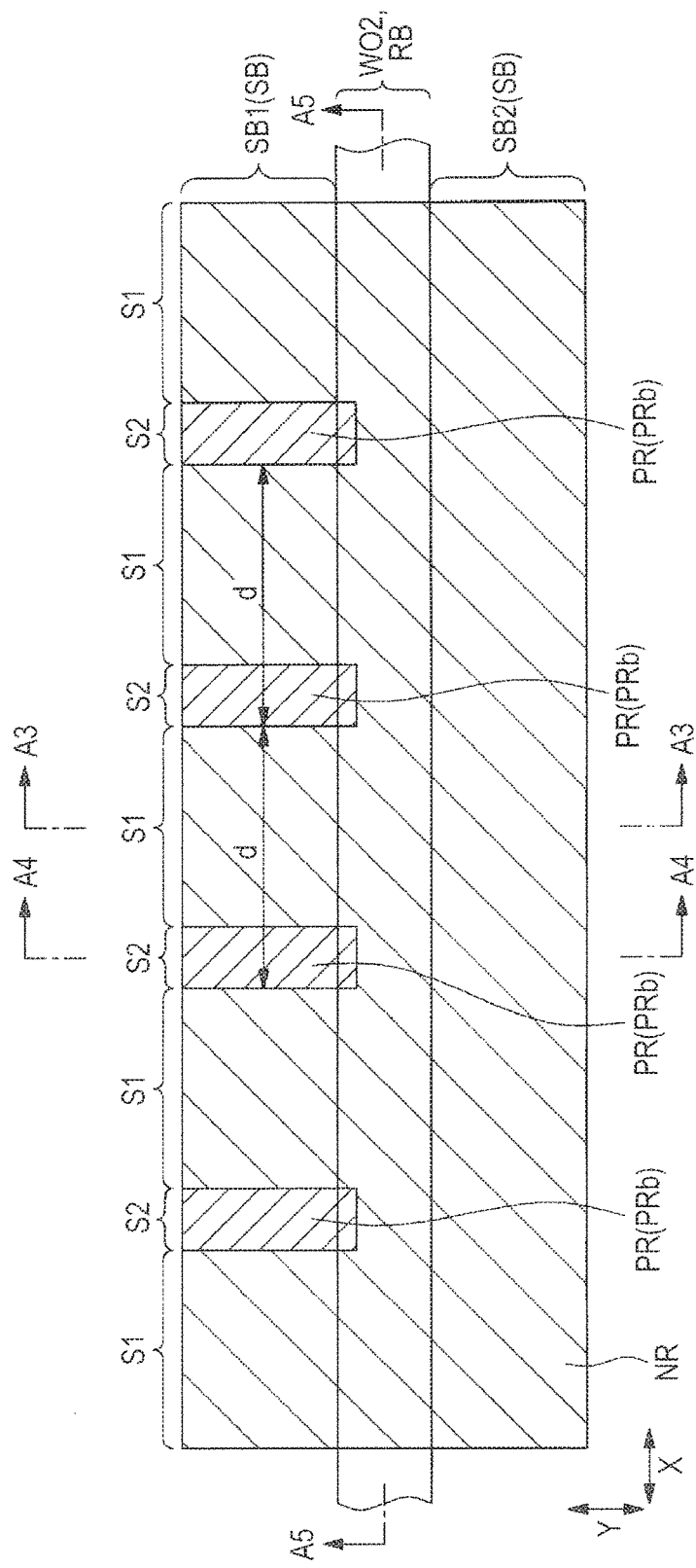
FIG. 6 is an essential part plan view of the semiconductor device of one embodiment.
Figure 7:
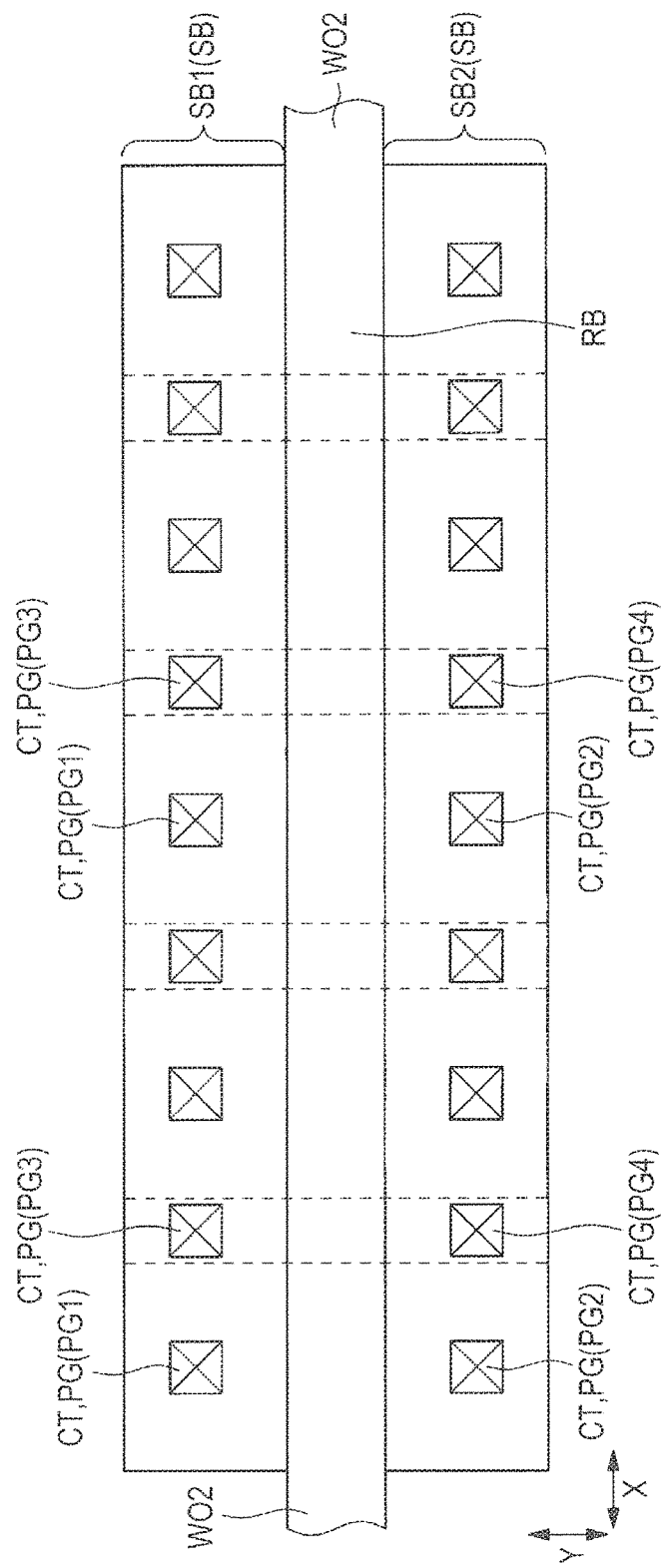
FIG. 7 is an essential part plan view of the semiconductor device of one embodiment.
Figure 8:
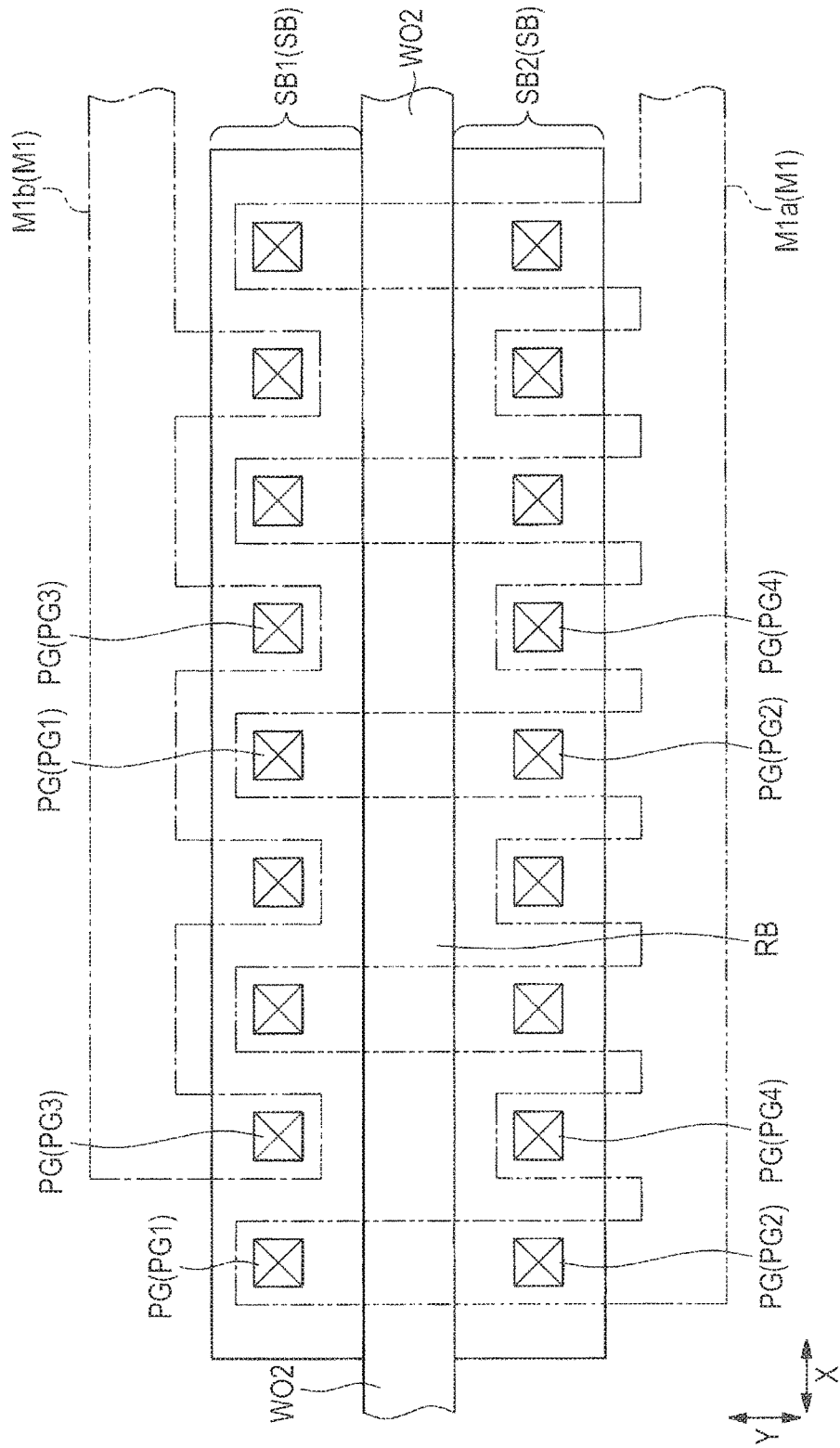
FIG. 8 is an essential part plan view of the semiconductor device of one embodiment.

Incidentally, FIGS. 5 to 8 each show a plan view of the same region (the region RG1 of FIG. 2). In FIG. 5, the boundary between a main section S1 and a secondary section S2 is indicated with a dotted line so as to show the positional relationship between the main section S1 of a phase modulation part PM and the secondary section S2 of the phase modulation part PM. Further, FIG. 6 is a plan view, where, for ease of understanding, the n type semiconductor region NR and the p type semiconductor region PR formed in the phase modulation part PM are hatched, respectively. The directions of the hatching are opposite between the n type semiconductor region NR and the p type semiconductor region PR. Incidentally, the p type semiconductor region PR shown in FIG. 6 is a p type semiconductor region PRb described later in the secondary section S2. The p type semiconductor region PR in the main section S1, and a p type semiconductor region PRa described later in the secondary section S2 are situated under the n type semiconductor region NR, and hence are not shown in FIG. 6. Whereas, FIG. 7 further additionally shows plugs PG (PG1, PG2, PG3, and PG4) to be coupled to the phase modulation part PM in FIG. 5. In FIG. 8, the dotted line showing the boundary between the main section S1 and the secondary section S2 is omitted from FIG. 7, and wires M1 (M1a and M1b) to be coupled to the phase modulation part PM via the plugs PG are additionally shown. The wires M1(M1a and M1b) are indicated with a two-dot chain line. Further, FIG. 9 corresponds to the cross sectional view at the position along line A3-A3 of FIGS. 5 and 6. FIG. 10 corresponds to the cross sectional view at the position along line A4-A4 of FIGS. 5 and 6. FIG. 11 corresponds to the cross sectional view at the position along line A5-A5 of FIGS. 5 and 6. However, FIGS. 9 to 11 each do not show a base material WF1, an interlayer insulation film IL4, and the structure thereabove shown in FIG. 2. Further, the interlayer insulation film IL3 is shown without being divided into the insulation film IL1 and the insulation film IL2.

As shown in FIG. 2, the semiconductor device of the present embodiment has the base material (support substrate) WF1, an insulation layer CL formed over the base material WF1, and a semiconductor layer SL formed over the insulation layer CL. The base material WF1, the insulation layer CL, and the semiconductor layer SL form a SOI (Silicon on Insulator) substrate WF.

The base material WF1 is a support substrate for supporting the insulation layer CL, and the structure above the insulation layer CL, and is also a semiconductor substrate. The base material WF1 is preferably formed of a single crystal silicon substrate, and is formed of, for example, a p type single crystal silicon substrate having a plane orientation of (100), and a resistivity of about 5 to 50Ωcm. The insulation layer CL is preferably formed of a silicon oxide film. The insulation layer CL can also be regarded as a BOX (Buried Oxide) layer. The semiconductor layer SL is preferably formed of a silicon layer (more specifically, a single crystal silicon layer), and can also be regarded as a SOI layer.

The SOI substrate WF has a region AR1 and a region AR2. The region AR1 and the region AR2 correspond to mutually different plane regions of the main surface of the same SOI substrate WF. In the region AR1, a transmission line for optical signal (optical waveguide WO1) is formed. In the region AR2, an optical modulator PC1 is formed. Incidentally, the region AR1 and the region AR2 may be either adjacent or not adjacent to each other. For ease of understanding, in FIG. 2, the regions AR1 and AR2 are shown adjacent to each other.

Optical Signal Line

As shown in FIGS. 2 and 3, an optical waveguide WO1 as a transmission line for various optical signals (i.e., optical signal line) is formed in the region AR1.

The optical waveguide WO1 is formed of a semiconductor layer SL (silicon layer), and is formed over the insulation layer CL. The lower surface of the optical waveguide WO1 is in contact with the upper surface of the insulation layer CL. The optical waveguide WO1 is not doped with impurity ions. In other words, the optical waveguide WO1 is formed of an intrinsic semiconductor, namely, an i (intrinsic) type semiconductor. In the case of FIG. 3, the optical waveguide WO1 has a line-shaped pattern extending in the X direction. However, the direction of extension of the optical waveguide WO1 is not limited to the X direction. The optical signal introduced into the optical waveguide WO1 travels along the direction of extension of the optical waveguide WO1 in the optical waveguide WO1. This also applies to an optical waveguide WO2 described later.

Incidentally, the X direction and the Y direction shown in FIGS. 3 to 8 are directions orthogonal to each other, and are also the directions substantially in parallel with the main surface of the SOI substrate WF (or the main surface of the base material WF1). In each cross sectional view of FIGS. 2, 9, and 10, the direction perpendicular to the paper plane corresponds to the X direction.

Further, FIG. 2 shows the optical waveguide WO1 in a tetragonal shape (rectangular shape) in cross sectional configuration. However, the optical waveguide of a convex type (rib type) in cross sectional configuration may be provided over the insulation layer CL. Further, in other regions than the regions AR1 and AR2, grating coupler equivalent to the I/O element OT2 or OT3, a germanium photodetector (photoelectric conversion element) equivalent to the photodetector OT4, and the like are formed over the insulation layer CL. The grating coupler and the germanium photodetector are also covered with the interlayer insulation film IL3, which is herein not shown and not described. Incidentally, the grating coupler is formed of the semiconductor layer SL formed over the insulation layer CL. Further, a part of the germanium photodetector is also formed of the semiconductor layer SL formed over the insulation layer CL.

Optical Modulator

Referring to FIGS. 2, and 4 to 11, the optical modulator PC1 formed in the region AR2 will be described. In the region AR2, the optical modulator PC1 is formed. The optical modulator PC1 corresponds to the optical modulator OT1 of FIG. 1.

As shown in FIGS. 2, and 4 to 11, the optical waveguide WO2 extending in the X direction in the region AR2 is divided into two optical waveguides WO2 (i.e., an optical waveguide WO2a and an optical waveguide WO2b) at the branching part. The two optical waveguides WO2 (WO2a and WO2b) extend in the X direction while being separated from each other in the Y direction, and then, merge again into one optical waveguide WO2, which extends in the X direction. The optical signal introduced into the optical waveguide WO2 travels along the direction of extension of the optical waveguide WO2 (herein, the X direction) in the optical waveguide WO2.

Each of the two optical waveguides WO2a and WO2b is provided with a phase modulation part PM. The phase modulation part PM is an element for changing the phase of a light. Herein, the phase modulation part PM provided at the optical waveguide WO2a is given a reference sign and numeral PM1, and is referred to as a phase modulation part PM1. The phase modulation part PM provided at the optical waveguide WO2b is given a reference sign and numeral PM2, and is referred to as a phase modulation part PM2. The structure of the phase modulation part PM1 and the structure of the phase modulation part PM2 are basically the same.

The phase modulation part PM has a rib type (convex type) structure, and the cross section orthogonal to the optical waveguide direction of the phase modulation part PM is in a convex type shape. Incidentally, the optical waveguide direction of the phase modulation part PM corresponds to the direction of extension of the phase modulation part PM. In the case of FIGS. 4 to 8, the optical waveguide direction of the phase modulation part PM is the X direction. A light propagates (transmits) in the phase modulation part PM, and hence the phase modulation part PM itself can be regarded as the optical waveguide part.

The phase modulation part PM is formed of a rib part RB, and a pair of slab parts SB arranged on both sides of the rib part RB. The rib part RB, and the pair of slab parts SB arranged on both sides of the rib part RB are formed integrally. The height position of the upper surface of the rib part RB is higher than the height position of the upper surface of each slab part SB. This is because the thickness of each slab part SB is set smaller than the thickness of the rib part RB.

Of the pair of slab parts SB arranged on both sides of the rib part RB, one is referred to as a slab part SB1, and the other is referred to as a slab part SB2. Namely, of both sides of the rib part RB, the slab part SB1 is provided on one side, and the slab part SB2 is provided on the other side. The rib part RB is arranged between the slab part SB1 and the slab part SB2. In other words, the phase modulation part PM has the rib part RB to be the optical waveguide, the slab part SB1 arranged in such a manner as to be adjacent to one side of both sides of the rib part RB, and the slab part SB2 arranged in such a manner as to be adjacent to the other side. Respective thicknesses of the slab parts SB1 and SB2 are smaller than the thickness of the rib part RB. The rib part RB, the slab part SB1, and the slab part SB2 are integrally formed.

The rib part RB, the slab part SB1, and the slab part SB2 are formed of the semiconductor layer SL (silicon layer), and are formed over the insulation layer CL. Their respective lower surfaces are in contact with the upper surface of the insulation layer CL. In other words, the phase modulation part PM is formed of the semiconductor layer SL processed into a rib type. The larger-thickness portion of the semiconductor layer SL processed into the rib type is the rib part RB, and the smaller-thickness portions on both sides of the rib part RB are the slab parts SB1 and SB2. The upper surface of the insulation layer CL is almost flat. For this reason, the height position of the lower surface of the rib part RB and the height position of each lower surface of the slab parts SB1 and SB2 are almost the same. In the case of the phase modulation part PM1, the optical waveguide WO2a becomes the rib part RB. In the case of the phase modulation part PM2, the optical waveguide WO2b becomes the rib part RB.

In the case of FIGS. 4 to 11, the rib part RB, the slab part SB1, and the slab part SB2 all extend in the X direction. The rib part RB and the slab part SB1 are adjacent to each other in the Y direction. The rib part RB and the slab part SB2 are adjacent to each other in the Y direction. In the Y direction, the rib part RB is situated between the slab part SB1 and the slab part SB2. The portion of the optical waveguide WO2a interposed between the slab part SB1 and the slab part SB2 forming the phase modulation part PM1 is the rib part RB of the phase modulation part PM1. The portion of the optical waveguide WO2b interposed between the slab part SB1 and the slab part SB2 forming the phase modulation part PM2 is the rib part RB of the phase modulation part PM2.

Any size of the rib part RB to be the optical waveguide WO2b is acceptable so long as the size enables propagation of a light in the inside thereof. The size capable of depleting the entire optical waveguide WO2b is preferable. The height of the upper surface of the rib part RB with respect to the upper surface of the insulation layer CL (i.e., the thickness of the rib part RB) is, for example, about 200 nm. The width of the rib part RB is, for example, about 400 nm. The height of the upper surface of the slab part SB with respect to the upper surface of the insulation layer CL (i.e., the thickness of the slab part SB) is, for example, about 100 nm.

The phase modulation part PM has the main section (main part or first portion) S1 and the secondary section (secondary part, second portion, lead-out section, or lead-out part) S2 having mutually different cross sectional structures. As seen in the direction of extension of the phase modulation part PM (herein, the X direction), the main sections S1 of the phase modulation part PM and the secondary sections S2 of the phase modulation part PM are alternately repeated. The main section S1 and the secondary section S2 are adjacent to each other in the direction of extension of the phase modulation part PM (herein, the X direction). In other words, as seen in the direction of extension of the phase modulation part PM (herein, the X direction), the phase modulation part PM has the plurality of main sections S1 and the secondary sections S2 provided between the plurality of main sections S1 in an integral form. Incidentally, in the case of FIG. 5, the case where the number of the main sections S1 is five, and the number of the secondary sections S2 is four is shown. However, the present invention is not limited thereto.

Incidentally, the direction of extension of the phase modulation part PM is the direction of extension of the rib part RB or the slab part SB, and the X direction in the case of FIGS. 4 to 8. Further, when the cross sectional view is mentioned for the phase modulation part PM, the rib part RB, or the slab part SB, the cross sectional view refers to the view as seen from the cross section substantially perpendicular to the direction of extension of the phase modulation part PM, the rib part RB, or the slab part SB. For example, when the phase modulation part PM, the rib part RB, and the slab part SB extend in the X direction as in FIGS. 4 to 8, the cross sectional view corresponds to the case of the view as seen from the cross section substantially perpendicular to the X direction, and FIGS. 9 and 10 correspond to the cross sectional view herein referred to. FIG. 11 is the cross section substantially in parallel with the direction of extension of the phase modulation part PM, and passing through the upper surface and the lower surface of the rib part RB.

Both of the main section S1 of the phase modulation part PM and the secondary section S2 of the phase modulation part PM are each formed of the rib part RB and the slab parts SB1 and SB2 on both sides thereof. Accordingly, the outward configuration is basically the same between the main section S1 of the phase modulation part PM and the secondary section S2 of the phase modulation part PM. The difference between the main section S1 of the phase modulation part PM and the secondary section S2 of the phase modulation part PM lies in where the p type semiconductor region and the n type semiconductor region are formed.

First, a description will be given to the main section S1 of the phase modulation part PM. The cross section substantially perpendicular to the direction of extension of the modulation part PM is the same as that of FIG. 9 at any position of the main section S1.

At the main section S1 of the phase modulation part PM, the p type semiconductor region PR and the n type semiconductor region NR are formed in the rib part RB. The p type semiconductor region PR is mainly doped with a p type impurity, and shows a p conductivity type. The n type semiconductor region NR is mainly doped with an n type impurity, and shows an n conductivity type.

At the main section S1 of the phase modulation part PM, in a cross sectional view, a p type semiconductor region PR is formed at the central part (central region, central part, or central region) of the rib part RB, and an n type semiconductor region NR is formed at the outer circumferential part (the outer circumferential region) of the rib part RB in such a manner as to surround the p type semiconductor region PR (see FIG. 9). In other words, at the rib part RB of the main section S1 of the phase modulation part PM, the p type semiconductor region PR is formed at the central part, and the n type semiconductor region NR surrounds (covers) the entire circumference of the p type semiconductor region PR in a cross sectional view. The region except for the p type semiconductor region PR is the n type semiconductor region NR.

The n type semiconductor region NR surrounds the p type semiconductor region PR in such a manner as to be in contact with the p type semiconductor region PR in a cross sectional view. For this reason, the upper surface (first upper surface) F1, the lower surface (first lower surface) F2, and the both side surfaces (first side surface and second side surface) F3 and F4 of the p type semiconductor region PR are in contact with the n type semiconductor region NR, and therefore are covered with the n type semiconductor region NR. Accordingly, a pn junction (pn junction surface) is formed (at the interface) between the n type semiconductor region NR and the p type semiconductor region PR, and the upper surface F1, the lower surface F2, the side surface F3, and the side surface F4 of the p type semiconductor region PR become pn junction surfaces.

Incidentally, in the case of FIG. 9, the cross sectional configuration (the cross sectional configuration substantially perpendicular to the direction of extension of the phase modulation part PM) of the p type semiconductor region PR is a rectangular shape. The upper surface F1 of the p type semiconductor region PR and the lower surface F2 of the p type semiconductor region PR are the surfaces situated on mutually opposite sides (opposite sides in the thickness direction) of the p type semiconductor region PR. The side surface F3 of the p type semiconductor region PR and the side surface F4 of the p type semiconductor region PR are surfaces situated on mutually opposite sides (opposite sides in the Y direction) of the p type semiconductor region PR. The side surfaces F3 and F4 are also the surfaces crossing the upper surface F1 and the lower surface F2. Of the side surfaces F3 and F4 of the p type semiconductor region PR, the side surface F3 is situated on the side closer to the slab part SB1, and the side surface F4 is situated on the side closer to the slab part SB2. Each of the upper surface F1 and the lower surface F2 of the p type semiconductor region PR is substantially in parallel with the upper surface of the insulation layer CL (or the upper surface of the base material WF1), and therefore, is substantially in parallel with the X direction and the Y direction. Whereas, each of the side surfaces F3 and F4 of the p type semiconductor region PR is substantially perpendicular to the upper surface of the insulation layer CL (or the upper surface of the base material WF1), and therefore, is substantially in parallel with the X direction, and substantially perpendicular to the Y direction.

Further, at the main section S1 of the phase modulation part PM, the n type semiconductor region NR is formed almost throughout the slab parts SB1 and SB2 on both sides of the rib part RB. Namely, the n type semiconductor region NR is formed at the rib part RB and the slab parts SB1 and SB2, and is formed in such a manner as to surround the p type semiconductor region PR at the rib part RB, and is formed almost therethroughout at the slab parts SB1 and SB2. The n type semiconductor region NR of the rib part RB and the n type semiconductor region NR of the slab parts SB1 and SB2 are integrally coupled with (continuous to) each other.

Thus, at the main section S1 of the phase modulation part PM, the p type semiconductor region PR is formed at the central part of the rib part RB, and the n type semiconductor region NR is formed at the outer circumferential part of the rib part RB, at the entire slab part SB1, and at the entire slab part SB2, and the region except for the p type semiconductor region PR is the n type semiconductor region NR. The rib part RB and the slab parts SB1 and SB2 extend in the X direction. Accordingly, the p type semiconductor region PR extends in the X direction in the rib part RB while keeping the state of being formed at the central part of the rib part RB in a cross sectional view, and being surrounded by the n type semiconductor region NR. Whereas, the n type semiconductor region NR extends in the X direction in the rib part RB and the slab parts SB1 and SB2 while keeping the state of surrounding the p type semiconductor region PR in a cross sectional view.

Then, a description will be given to the secondary section S2 of the phase modulation part PM. The cross section substantially perpendicular to the direction of extension of the phase modulation part PM is the same as that of FIG. 10 at any position of the secondary section S2.

At the secondary section S2 of the phase modulation part PM, the p type semiconductor region PR and the n type semiconductor region NR are formed in the rib part RB. In a cross sectional view, the p type semiconductor region PR is formed at the central part of the rib part RB. However, the p type semiconductor region PR is not formed only at the central part of the rib part RB. Therefore, the n type semiconductor region NR does not surround the entre circumference of the p type semiconductor region PR. In other words, at the secondary section S2 of the phase modulation part PM, in a cross sectional view, the p type semiconductor region PR is arranged at the central part of the rib part RB, and the n type semiconductor region NR is arranged so as not to surround the entire circumference of the p type semiconductor region PR in the rib part RB.

Namely, at the rib part RB of the secondary section S2 of the phase modulation part PM, the region of extension of the p type semiconductor region PR in the X direction formed at the rib part RB of the main section S1 of the phase modulation part PM becomes a p type semiconductor region. The p type semiconductor region is referred to as a p type semiconductor region PRa. The p type semiconductor region PRa of the secondary section S2 and the p type semiconductor region PR of the main section S1 are coupled with (continuous to) each other in the X direction. Then, the region over the upper surface F1a of the p type semiconductor region PRa becomes an n type semiconductor region NR. The region under the lower surface F2a of the p type semiconductor region PRa also becomes the n type semiconductor region NR. The region adjacent to the side surface F4a of the p type semiconductor region PRa also becomes the n type semiconductor region NR. For this reason, the upper surface F1a, the lower surface F2a, and the side surface F4a of the p type semiconductor region PRa are in contact with the n type semiconductor region NR, and therefore, are covered with the n type semiconductor region NR. Accordingly, the upper surface F1a, the lower surface F2a, and the side surface F4a of the p type semiconductor region PRa each become a pn junction surface. The n type semiconductor region NR of the secondary section S2 is coupled with (continuous to) the n type semiconductor region NR of the main section S1 in the X direction.

Incidentally, the extension region of the p type semiconductor region PR of the main section S1 is the p type semiconductor region PRa of the secondary section S2. For this reason, the upper surface F1a of the p type semiconductor region PRa of the secondary section S2 is on the extension of the upper surface F1 of the p type semiconductor region PR of the main section S1. The upper surface F1a of the p type semiconductor region PRa of the secondary section S2 and the upper surface F1 of the p type semiconductor region PR of the main section S1 are continuous to each other. Whereas, the lower surface F2a of the p type semiconductor region PRa of the secondary section S2 is on the extension of the lower surface F2 of the p type semiconductor region PR of the main section S1. The lower surface F2a of the p type semiconductor region PRa of the secondary section S2 and the lower surface F2 of the p type semiconductor region PR of the main section S1 are continuous to each other. Whereas, the side surface F4a of the p type semiconductor region PRa of the secondary section S2 is on the extension of the side surface F4 of the p type semiconductor region PR of the main section S1. The side surface F4a of the p type semiconductor region PRa of the secondary section S2 and the side surface F4 of the p type semiconductor region PR of the main section S1 are continuous to each other.

However, the region adjacent to the side surface F3a of the p type semiconductor region PRa is not an n type semiconductor region NR, but a p type semiconductor region. The p type semiconductor region is referred to as a p type semiconductor region PRb. For this reason, the side surface F3a of the p type semiconductor region PRa is in contact with not the n type semiconductor region NR but the p type semiconductor region PRb. Therefore, the side surface F3a of the p type semiconductor region PRa is not a pn junction surface.

Incidentally, the side surface F3a of the p type semiconductor region PRa of the secondary section S2 is the virtual extension surface of the side surface F3 of the p type semiconductor region PR of the main section S1. For the secondary section S2 of the phase modulation part PM, the p type semiconductor region PR is described by being virtually divided into the p type semiconductor region PRa and the p type semiconductor region PRb.

However, for the secondary section S2, the p type semiconductor region PRa and the p type semiconductor region PRb are integrally coupled with each other, and there is no clear boundary (boundary surface) between the p type semiconductor region PRa and the p type semiconductor region PRb. For this reason, in FIG. 10, the virtual side surface F3a is indicated with a dotted line. At the secondary section S2, the entire combination of the p type semiconductor region PRa and the p type semiconductor region PRb can be regarded as the p type semiconductor region PR (the p type semiconductor region PR of the secondary section S2).

Further, the p type semiconductor region PRa and the p type semiconductor region PRb of the secondary section S2 are integrally coupled with each other. In addition, the p type semiconductor region PRa of the secondary section S2 and the p type semiconductor region PR of the main section S1 are integrally coupled with each other in the X direction. Accordingly, the p type semiconductor region PR of the main section S1, the p type semiconductor region PRa of the secondary section S2, and the p type semiconductor region PRb of the secondary section S2 are integrally coupled with one another. For this reason, the entire combination of the p type semiconductor region PR of the main section S1 and the p type semiconductor region PR of the secondary section S2, namely, the entire combination of the p type semiconductor region PR of the main section S1, the p type semiconductor region PRa of the secondary section S2, and the p type semiconductor region PRb of the secondary section S2 can be regarded as the p type semiconductor region PR (the p type semiconductor region PR formed at the phase modulation part PM).

Therefore, the p type semiconductor region PR of the secondary section S2 of the phase modulation part PM has the upper surface F1a continuous to the upper surface F1 of the p type semiconductor region PR of the main section S1 in the X direction, the lower surface F2a continuous to the lower surface F2 of the p type semiconductor region PR of the main section S1 in the X direction, and the side surface F4a continuous to the side surface F4 of the p type semiconductor region PR of the main section S1 in the X direction, which are in contact with the n type semiconductor region NR, to be each a pn junction surface. However, the p type semiconductor region PR of the secondary section S2 of the phase modulation part PM does not have the pn junction surface continuous to the side surface F3 of the p type semiconductor region PR of the main section S1 in the X direction. At the secondary section S2 of the phase modulation part PM, the position of extension of the side surface F3 of the p type semiconductor region PR of the main section S1 in the X direction (the position of the virtual side surface F3a) is in the p type semiconductor region PR of the secondary section S2. In the case of FIG. 10, at the rib part RB of the secondary section S2, in addition to the extension region of the p type semiconductor region PR of the main section S1 (i.e., the p type semiconductor region PRa), the region on the left side (i.e., outside or the side closer to the slab part SB1) of the extension surface of the side surface F3 of the p type semiconductor region PR of the main section S1 (corresponding to the side surface F3a of the p type semiconductor region PRa) also becomes the p type semiconductor region PR.

Further, at the secondary section S2 of the phase modulation part PM, the n type semiconductor region NR is formed almost entirely at the slab part SB2 of the slab parts SB1 and SB2 on both sides of the rib part RB, and the p type semiconductor region PRb is formed almost throughout the slab part SB1. In the case of FIG. 10, at the secondary section S2, the n type semiconductor region NR is formed at a part of the rib part RB, and the entire slab part SB2. However, the n type semiconductor region NR is not formed at the slab part SB1. Further, the p type semiconductor region PR is formed at a part of the rib part RB, and the entire slab part SB1. However, the p type semiconductor region PR is not formed at the slab part SB2.

The n type semiconductor region NR of the secondary section S2 is coupled with the n type semiconductor region NR of the main section S1 in the X direction. Whereas, the p type semiconductor region PRa of the secondary section S2 is coupled with the p type semiconductor region PR of the main section S1 in the X direction. However, the p type semiconductor region PRb of the secondary section S2 is adjacent to the n type semiconductor region NR of the main section S1 in the X direction. Namely, at the boundary between the secondary section S2 and the main section S1, the p type semiconductor region PRb of the secondary section S2 and the n type semiconductor region NR of the main section S1 are adjacent to each other in the X direction. The pn junction surface between the p type semiconductor region PRb of the secondary section S2 and the n type semiconductor region NR of the main section S1 is present at the boundary between the secondary section S2 and the main section S1 (see FIG. 6). The pn junction surface between the p type semiconductor region PRb of the secondary section S2 and the n type semiconductor region NR of the main section S1 is substantially perpendicular to the X direction of the direction of extension of the phase modulation part PM.

Thus, at the main section S1 of the phase modulation part PM, in a cross sectional view, the n type semiconductor region (NR) in a cross sectional view surrounds the entire circumference of the p type semiconductor region (PR). However, at the secondary section S2 of the phase modulation part PM, the n type semiconductor region (NR) does not surround the entire circumference of the p type semiconductor region (PR). Then, the p type semiconductor region (PRb) integrally coupled with the p type semiconductor region (PR) of the main section S1 is formed at the slab part SB1 of the secondary section S2. As a result, by applying a desired voltage via a plug PG3 described later to the p type semiconductor region (PRb) of the secondary section S2, it is possible to apply the voltage via the p type semiconductor regions (PRb and PRa) of the secondary section S2 to the p type semiconductor region (PR) of the main section S1.

The p type semiconductor region and the n type semiconductor region are formed at the optical waveguide WO2 (i.e., the rib part RB) forming the phase modulation part PM. However, the optical waveguide WO2 except for the phase modulation part PM is not implanted (doped) with impurity ions, and is formed of an intrinsic semiconductor (i.e., an i type region).

At the phase modulation part PM, the n type semiconductor region (NR) and the p type semiconductor regions (PR, PRa, and PRb) form an element of a pn structure (pn diode). Using the element of the pn structure (pn diode), the phase of a light can be changed.

Alternatively, as the cross sectional structure of the phase modulation part PM, the cross sectional structure obtained by horizontally reversing FIGS. 9 and 10 is also applicable.

Then, a description will be given to the interlayer insulation film IL3, and the structure thereabove at the regions AR1 and AR2.

As shown in FIGS. 2, and 9 to 11, an interlayer insulation film IL3 is formed over the insulation layer CL in such a manner as to cover the optical waveguide WO1, the optical waveguide WO2, and the phase modulation part PM (PM1 and PM2). The interlayer insulation film IL3 is preferably formed of a silicon oxide. As the interlayer insulation film IL3, a monolayer film (preferably, a monolayer silicon oxide film), or a lamination film of a plurality of insulation films (preferably, a plurality of silicon oxide films) stacked one over another can be used. Herein, there is shown the case where the interlayer insulation film IL3 is formed of a lamination film of the insulation film IL1, and the insulation film IL2 over the insulation film IL1. The insulation film IL1 and the insulation film IL2 are each preferably formed of a silicon oxide film. Of the insulation film IL1 and the insulation film IL2, it is the insulation film IL1 that is in contact with the optical waveguide WO1, the optical waveguide WO2, and the phase modulation part PM.

(The vertical and horizontal) circumferences of the optical waveguide WO1, the optical waveguide WO2, and the phase modulation part PM are surrounded by the insulation layer CL and the interlayer insulation film IL3 (more specifically, the insulation film IL1). The optical waveguide WO1, the optical waveguide WO2, and the phase modulation part PM function as the core layer. The insulation layer CL and the interlayer insulation film IL3 function as the cladding layer. Respective refractive indices of the insulation layer CL and the interlayer insulation film IL3 as the cladding layer are lower than respective refractive indices of the optical waveguide WO1, the optical waveguide WO2, and the phase modulation part PM.

A plurality of contact holes (openings or through holes) CT penetrating through the interlayer insulation film IL3 are formed over the slab parts SB (SB1 and SB2) of the phase modulation part PM. A conductive plug (contact part, coupling electrode, or electrode) PG is formed (buried) in each contact hole CT.

Incidentally, the contact hole CT and the plug PG formed over the slab part SB1 of the main section S1 are referred to as contact hole CT1 and plug PG1, respectively. Whereas, the contact hole CT and the plug PG formed over the slab part SB2 of the main section S1 are referred to as contact hole CT2 and plug PG2, respectively. Further, the contact hole CT and the plug PG formed over the slab part SB1 of the secondary section S2 are referred to as contact hole CT3 and plug PG3, respectively. Whereas, the contact hole CT and the plug PG formed over the slab part SB2 of the secondary section S2 are referred to as contact hole CT4 and plug PG4, respectively.

At the bottom of the contact hole CT1, a part of the upper surface of the slab part SB1 (n type semiconductor region NR) of the main section S1 is exposed. Whereas, at the bottom of the contact hole CT2, a part of the upper surface of the slab part SB2 (n type semiconductor region NR) of the main section S1 is exposed. Further, at the bottom of the contact hole CT3, a part of the upper surface of the slab part SB1 (p type semiconductor region PRb) of the secondary section S2 is exposed. Further, at the bottom of the contact hole CT4, a part of the upper surface of the slab part SB2 (n type semiconductor region NR) of the secondary section S2 is exposed.

The plug PG1 is in contact with the n type semiconductor region NR formed at the slab part SB1 of the main section S1, and is electrically coupled with the n type semiconductor region NR. Further, the plug PG2 is in contact with the n type semiconductor region NR formed at the slab part SB2 of the main section S1, and is electrically coupled with the n type semiconductor region NR. Furthermore, the plug PG3 is in contact with the p type semiconductor region PRb formed at the slab part SB1 of the secondary section S2, and is electrically coupled with the p type semiconductor region PRb. Still further, the plug PG4 is in contact with the n type semiconductor region NR formed at the slab part SB2 of the secondary section S2, and is electrically coupled with the n type semiconductor region NR.

Incidentally, FIGS. 7 to 10 each show the case where the number of the plugs PG1 provided for the slab part SB1 of each main section S1 is one. However, the number may be two or more. This also applies to the plugs PG2, PG3, and PG4.

Over the interlayer insulation film IL3 including the plugs PG buried therein, a wire M1 is formed. The wire M1 is a first-layer wire, and includes wires M1a and M1b. The plug PG is in contact with the wire M1 extending over the plug PG, and is electrically coupled with the wire M1.

The wire M1a extends over the plugs PG1, PG2, and PG4. The plugs PG1, PG2, and PG4 are in contact with the common wire M1a, and are electrically coupled with the wire M1a. Further, the plug PG3 is in contact with the wire M1b situated over the plug PG3, and is electrically coupled with the wire M1b.

For this reason, a desired common voltage can be applied from the wire M1a via the plugs PG1, PG2, and PG4 to the n type semiconductor region NR of the slab part SB1 of the main section S1, the n type semiconductor region NR of the slab part SB2 of the main section S1, and the n type semiconductor region NR of the slab part SB2 of the secondary section S2. Further, a desired voltage can be applied from the wire M1b via the plug PG3 to the p type semiconductor region PRb of the slab part SB1 of the secondary section S2.

Over the interlayer insulation film IL3, an interlayer insulation film IL4 is formed in such a manner as to cover the wire M1. Through holes are formed in the interlayer insulation film IL4. A conductive plug PLG is buried in each through hole. Over interlayer insulation film IL4 including the plugs PLG buried therein, a wire M2 is formed. The wire M2 is a second-layer wire. Each plug PLG is arranged between the wire M1 and the wire M2, and electrically couples the wire M1 and the wire M2.

Over the interlayer insulation film IL4, a protective film TC is formed in such a manner as to cover the wire M2. Incidentally, the interlayer insulation film IL4 is formed of, for example, silicon oxide. Silicon oxide is preferable as the material for the cladding layer. Further, the protective film TC is formed of, for example, silicon oxynitride. The refractive index n of silicon oxide is about 1.45, and the refractive index n of silicon oxynitride is about 1.82. An opening TC1 exposing a part of the wire M2 is formed in the protective film TC, so that the portion of the wire M2 exposed from the opening TC1 serves as a pad part (bonding pad or external coupling part).

Then, the operation of the optical modulator PC1 will be described.

As described above, at the phase modulation part PM, the n type semiconductor region NR and the p type semiconductor region PR are provided to form a pn junction. By controlling the voltage to be applied to the n type semiconductor region NR, and the voltage to be applied to the p type semiconductor region PR, it is possible to change the phase of a light. Namely, it is possible to control the phase of a light passing through the phase modulation part PM.

For example, at the phase modulation part PM, the n type semiconductor region NR and the p type semiconductor region PR are applied with voltages, respectively. Specifically, the p type semiconductor region PR is applied with a first voltage (e.g., ground potential), and the n type semiconductor region NR is applied with a second voltage higher than the first voltage. Namely, the pn structure diode (pn junction) formed at the phase modulation part PM is applied with a reverse bias. As a result, at the phase modulation part PM, the width of the depletion layer generated in the vicinity of the pn junction increases. This results in a change in carrier density at the rib part RB of the phase modulation part PM. In other words, an increase in difference between the first voltage to be applied to the p type semiconductor region PR and the second voltage to be applied to the n type semiconductor region NR results in an increase in width of the depletion layer generated in the vicinity of the pn junction at the phase modulation part PM. This results in a decrease in effective carrier density at the rib part RB of the phase modulation part PM. When the carrier density of the rib part RB of the phase modulation part PM changes, the refractive index of the light at the rib part RB of the phase modulation part PM changes. A change in refractive index of a light at the rib part RB of the phase modulation part PM results in a change in wavelength of a light proceeding through the rib part RB of the phase modulation part PM.

For this reason, the phase of a light can be changed in the process of proceeding (passing) through the phase modulation part PM.

Incidentally, in the present embodiment, at the phase modulation part PM, application of the voltage (second voltage) to the n type semiconductor region NR is performed from the plugs PG1, PG2, and PG4. Application of the voltage (first voltage) to the p type semiconductor region PR is performed from the plug PG3. On the other hand, in Second Embodiment, at the phase modulation part PM, application of the voltage (second voltage) to the n type semiconductor region NR is performed from the plugs PG1 and PG2, and application of the voltage (first voltage) to the p type semiconductor region PR is performed from the plugs PG3 and PG4.

The light incident from the input part proceeds in the optical waveguide WO2, and is divided into two optical waveguides WO2a and WO2b at the branching part, which are operated in phase at phase modulation parts PM, respectively, provided at the optical waveguides WO2a and WO2b, and then are merged into one optical waveguide WO2. The first voltage and the second voltage to be applied to the phase modulation part PM1 provided for the optical waveguide WO2a, and the first voltage and the second voltage to be applied to the phase modulation part PM2 provided for the optical waveguide WO2b are controlled. As a result, the phase difference between the light passed through the phase modulation part PM1 and the light passed through the phase modulation part PM2 is adjusted. This can control the phase and the intensity of the light outputted from the optical modulator PC1.

Incidentally, FIG. 4 shows the case where phase modulation parts PM are provided at the two optical waveguides WO2a and WO2b, respectively. As another aspect, the phase modulation part PM may be provided at only one of the two optical waveguides WO2a and WO2b. In that case, in FIG. 4, one of the phase modulation parts PM1 and PM2 is omitted.

Further, when at the rib part RB of the phase modulation part PM, the impurity density (p type impurity density) of the p type semiconductor region PR and the impurity density (n type impurity density) of the n type semiconductor region NR are too large, scattering of the light transmitted through the rib part RB may be caused. However, when the impurity densities are too small, the amount of change in carrier density adjustable by reverse bias decreases. For this reason, the impurity density (p type impurity density) of the p type semiconductor region PR and the impurity density (n type impurity density) of the n type semiconductor region NR at the rib part RB of the phase modulation part PM are desirably set at a proper density according to the characteristics required of the phase modulation part PM, and can be set at about $1\times10^{17}/cm^3$ to $1\times10^{18}/cm^3$ as one example.

On the other hand, at the slab parts SB1 and SB2 to which the plugs PG are coupled, the impurity densities of the p type semiconductor region PR and the n type semiconductor region NR are desirably set high to a certain degree for reducing the resistance. For this reason, the impurity density (p type impurity density) of the p type semiconductor region PR and the impurity density (n type impurity density) of the n type semiconductor region NR at the slab parts SB1 and SB2 can be set higher than the impurity density (p type impurity density) of the p type semiconductor region PR and the impurity density (n type impurity density) of the n type semiconductor region NR at the rib part RB, and can be set at about $1\times10^{20}/cm^3$ as one example.

Regarding Manufacturing Steps of Semiconductor Device

Then, one example of manufacturing steps of a semiconductor device of the present embodiment will be described by reference to FIGS. 12 to 32. FIGS. 12 to 32 are each an essential part cross sectional view of the semiconductor device of the present embodiment during a manufacturing step. However, FIGS. 12, 13, and 28 to 32 each show the cross section equivalent to FIG. 2. FIGS. 14, 16, 18, 20, 22, 24, and 26 each show the cross section equivalent to FIG. 9. FIGS. 15, 17, 19, 21, 23, 25, and 27 each show the cross section equivalent to FIG. 10.

Figure 12:
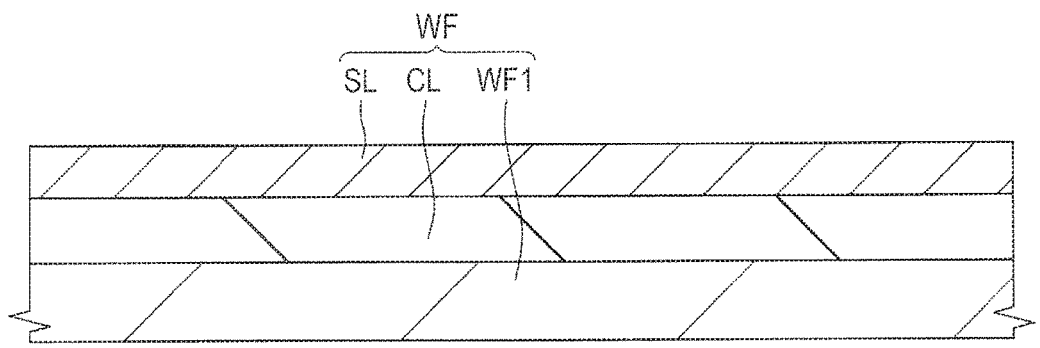
FIG. 12 is an essential part cross sectional view of the semiconductor device of one embodiment during a manufacturing step.

First, as shown in FIG. 12, there is provided a SOI substrate WF having a base material (support substrate) WF1, an insulation layer CL formed over the base material WF1, and a semiconductor layer SL formed over the insulation layer CL. The base material WF1 is preferably formed of a single crystal silicon substrate. The insulation layer CL is preferably formed of a silicon oxide film, and has a thickness of, for example, about 2 to 3 μm. The semiconductor layer SL is preferably formed of a silicon layer (more specifically, a single crystal silicon layer), and has a thickness of, for example, about 180 to 250 nm. The manufacturing method of the SOI substrate WF has no restriction. For example, using a SIMOX (Silicon Implanted Oxide) method, a bonding method, a smart cut process, or the like, the SOI substrate WF can be manufactured.

Figure 13:
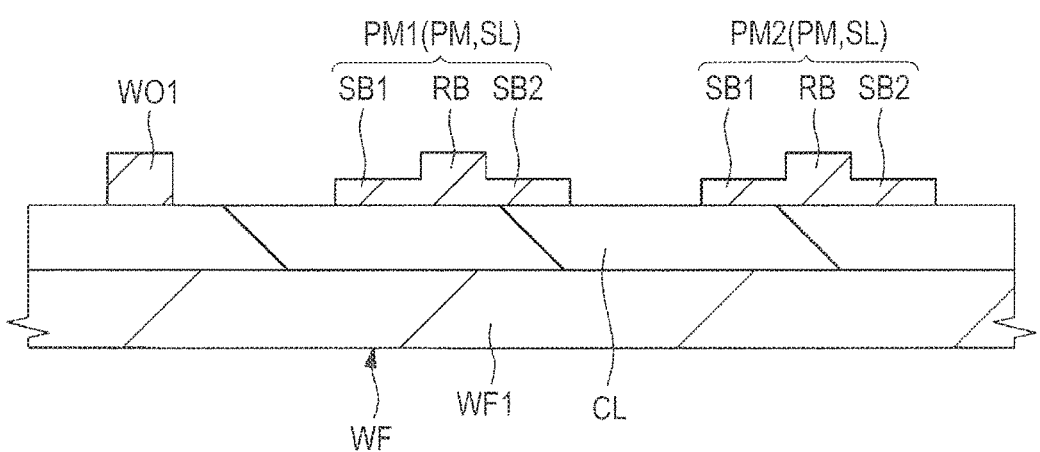
FIG. 13 is an essential part cross sectional view of the semiconductor device during a manufacturing step following FIG. 12.

Thereafter, various ion implantation steps on the semiconductor layer SL, and the processing steps of the semiconductor layer SL are performed. As a result, as shown in FIG. 13, an optical waveguide WO1, an optical waveguide WO2, and phase modulation parts PM (PM1 and PM2) are formed over the insulation layer CL. A specific formation method of the phase modulation part PM will be described by reference to FIGS. 14 to 27. Incidentally, for ease of understanding, in FIGS. 14 to 17, and 19, the region of the semiconductor layer SL not doped with an impurity is indicated without hatching.

Figure 14:
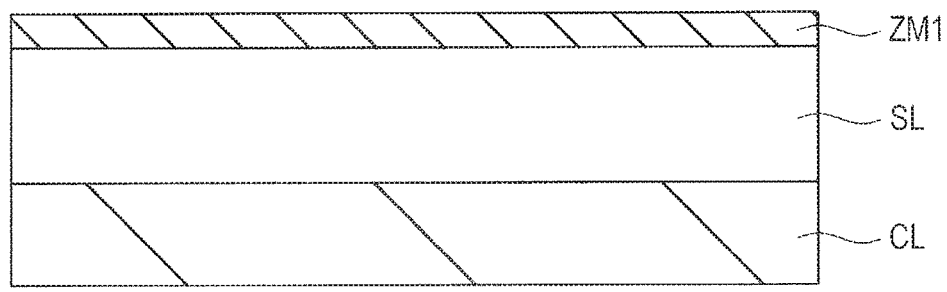
FIG. 14 is an essential part cross sectional view of the semiconductor device during a manufacturing step following FIG. 12.
Figure 15:
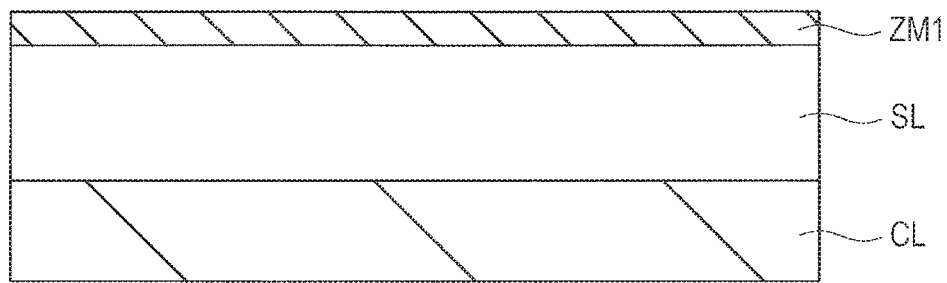
FIG. 15 is an essential part cross sectional view of the semiconductor device during the same manufacturing step as that of FIG. 14.

First, the SOI substrate WF as in FIG. 12 is provided. As shown in FIGS. 14 and 15, an insulation film ZM1 is formed over the semiconductor layer SL, if required. The insulation film ZM1 is formed of, for example, a silicon oxide film.

Figure 16:
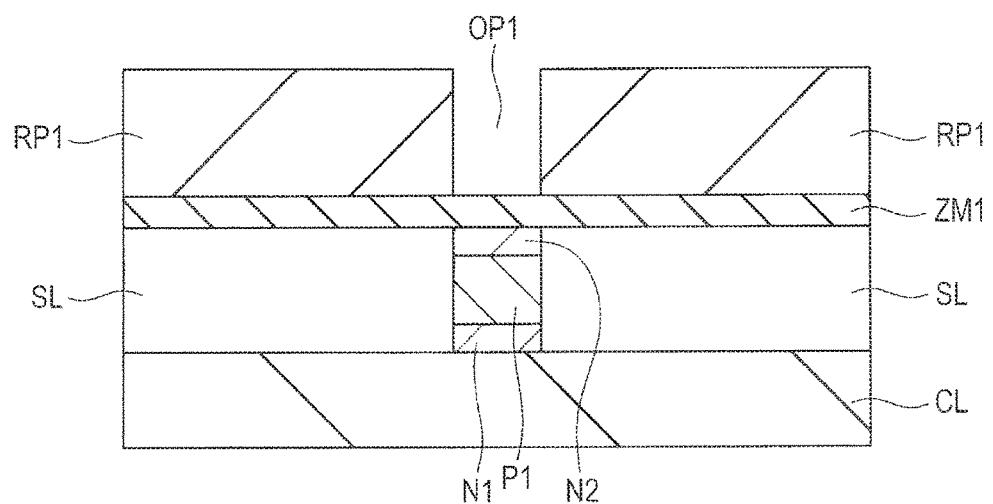
FIG. 16 is an essential part cross sectional view of the semiconductor device during a manufacturing step following FIG. 14.
Figure 17:
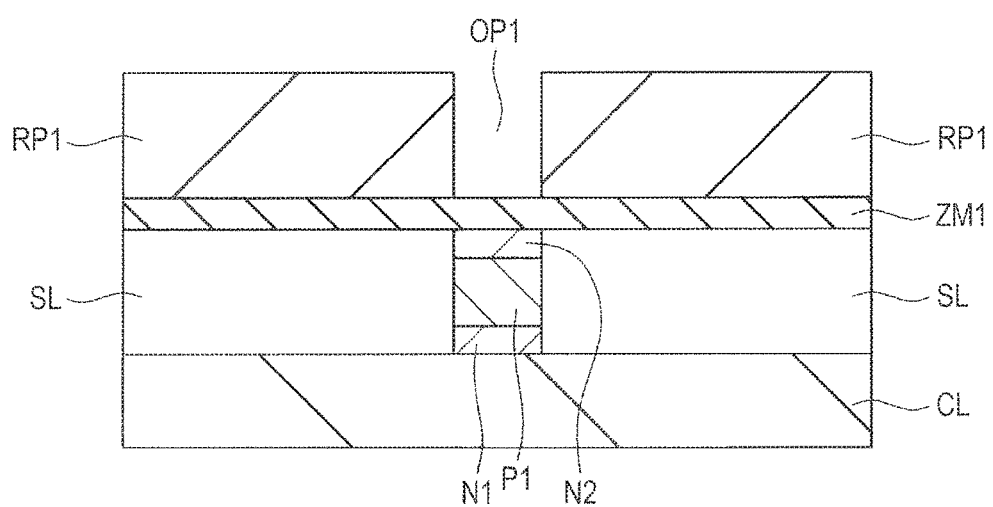
FIG. 17 is an essential part cross sectional view of the semiconductor device during the same manufacturing step as that of FIG. 16.

Then, as shown in FIGS. 16 and 17, using a photolithography technology, a photoresist pattern RP1 is formed over the insulation film ZM1. The photoresist pattern RP1 has an opening OP1 in the region where an n type semiconductor region N1, a p type semiconductor region P1, and an n type semiconductor region N2 described later should be formed.

Then, ion implantation is performed using the photoresist pattern RP1 as a mask (ion implantation inhibiting mask). As a result, an n type semiconductor region N1, a p type semiconductor region P1, and an n type semiconductor region N2 are formed in the portion of the semiconductor layer SL not covered with the photoresist pattern RP1 (i.e., the portion overlapping the opening OP1 in a plan view).

Then type semiconductor region N1, the p type semiconductor region P1, and the n type semiconductor region N2 overlap one another in a plan view, and are formed at the same plane, but are different in depth position from one another. Namely, the n type semiconductor region N1, the p type semiconductor region P1, and the n type semiconductor region N2 vertically overlap one another. The n type semiconductor region N1 is situated undermost. The p type semiconductor region P1 is situated (arranged) over the n type semiconductor region N1. The n type semiconductor region N2 is situated (arranged) over the p type semiconductor region P1. Incidentally, the vertical direction is the direction substantially perpendicular to the upper surface of the insulation layer CL or the upper surface of the base material WF1, and can also be regarded as the height direction or the thickness direction. The lamination structure of the n type semiconductor region N1, the p type semiconductor region P1, and the n type semiconductor region N2 is formed in the region of the semiconductor layer SL to be the rib part RB of the phase modulation part PM later. For this reason, the lamination structure of the n type semiconductor region N1, the p type semiconductor region P1, and the n type semiconductor region N2 extends in the X direction (the direction of extension of the rib part RB of the phase modulation part PM).

The lamination structure of the n type semiconductor region N1, the p type semiconductor region P1, and then type semiconductor region N2 can be formed, for example, in the following manner. Namely, first, using the photoresist pattern RP1 as a mask, an n type impurity is ion implanted, thereby to form the n type semiconductor region N1 at the semiconductor layer SL. At this step, the ion implantation energy is adjusted, so that an n type impurity is implanted into the vicinity of the lower part of the thickness of the semiconductor layer SL. Then, using the photoresist pattern RP1 as a mask, a p type impurity is ion implanted, thereby to form the p type semiconductor region P1 at the semiconductor layer SL. At this step, the ion implantation energy is controlled, so that a p impurity is implanted into the vicinity of the central part of thickness of the semiconductor layer SL. Then, using the photoresist pattern RP1 as a mask, an n type impurity is ion implanted, thereby to form an n type semiconductor region N2 in the semiconductor layer SL. At this step, the ion implantation energy is controlled, so that an n type impurity is implanted into the vicinity of the upper part of the thickness of the semiconductor layer SL. For this reason, the implantation energy at the time of formation of the n type semiconductor region N2 is set smaller than the implantation energy at the time of formation of the n type semiconductor region N1. Thus, a lamination structure of the n type semiconductor region N1, the p type semiconductor region P1 over the n type semiconductor region N1, and the n type semiconductor region N2 over the p type semiconductor region P1 can be formed at the semiconductor layer SL. Incidentally, the order of performing the ion implantations may be changed. Further, the dose amounts of respective ion implantations can be set, for example, so that each impurity density of the n type semiconductor regions N1 and N2, and the p type semiconductor region P1 is about $1 \times 10^{17}/cm^3$ to $1 \times 10^{18}/cm^3$.

Figure 18:
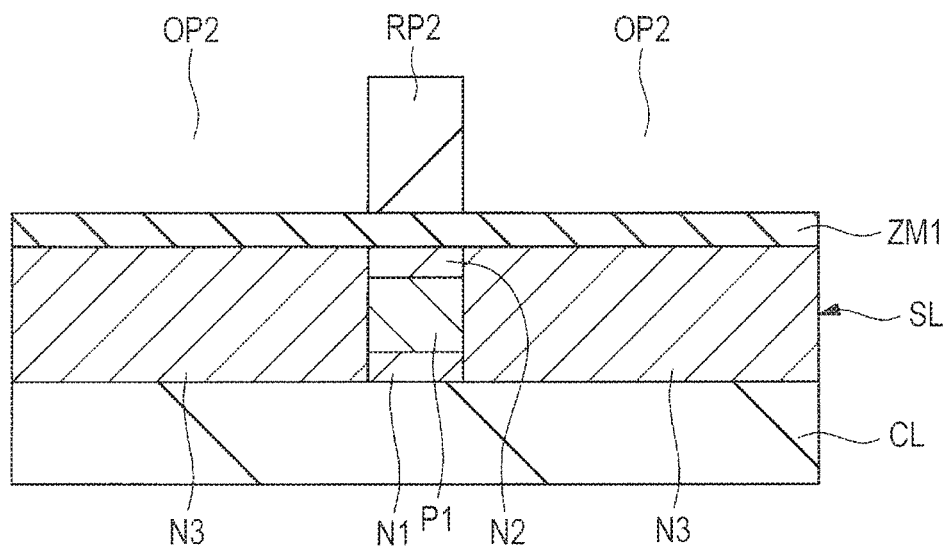
FIG. 18 is an essential part cross sectional view of the semiconductor device during a manufacturing step following FIG. 16.
Figure 19:
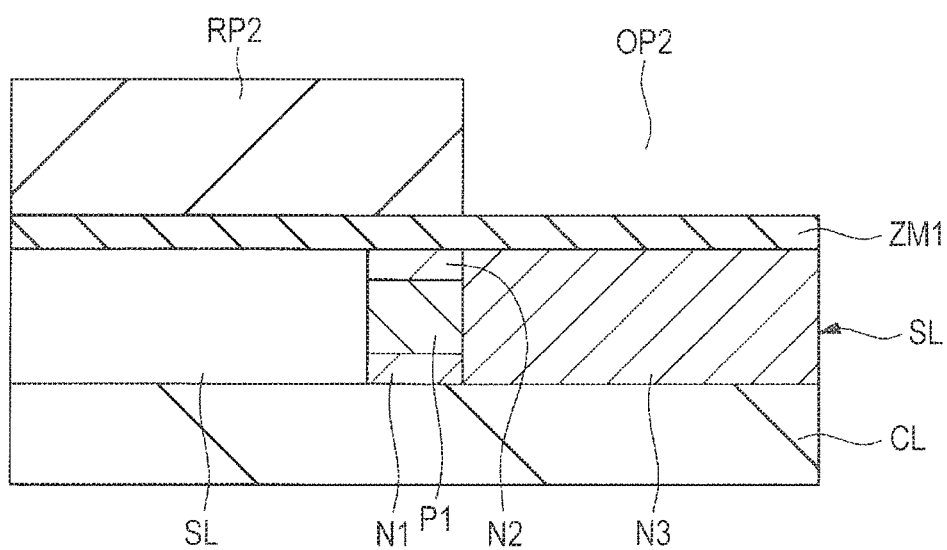
FIG. 19 is an essential part cross sectional view of the semiconductor device during the same manufacturing step as that of FIG. 18.

Then, the photoresist pattern RP1 is removed by asking. Then, using a photolithography technology, as shown in FIGS. 18 and 19, a photoresist pattern RP2 is formed over the insulation film ZM1. The photoresist pattern RP2 has an opening OP2 in the region where an n type semiconductor region N3 described later should be formed.

Then, using the photoresist pattern RP2 as a mask, an n type impurity is ion implanted. As a result, an n type semiconductor region N3 is formed in the portion (i.e., the portion overlapping the opening OP2 in a plan view) of the semiconductor layer SL not covered with the photoresist pattern RP2. The n type semiconductor region N3 is formed in the region to be the phase modulation part PM later in the semiconductor layer SL.

Specifically, at the semiconductor layer SL in the region to be the main section S1 of the phase modulation part PM later, the n type semiconductor region N3 is formed on both sides (both sides in the Y direction) of the lamination structure of the n type semiconductor region N1, the p type semiconductor region P1, and the n type semiconductor region N2 in such a manner as to be adjacent to both side surfaces of the lamination structure. Further, at the semiconductor layer SL in the region to be the secondary section S2 of the phase modulation part PM later, on one side of both sides (both sides in the Y direction) of the lamination structure of the n type semiconductor region N1, the p type semiconductor region P1, and the n type semiconductor region N2, the n type semiconductor region N3 is formed in such a manner as to be adjacent to one side surface of the lamination structure. However, the n type semiconductor region N3 is not formed on the other side of both sides of the lamination structure.

Figure 20:
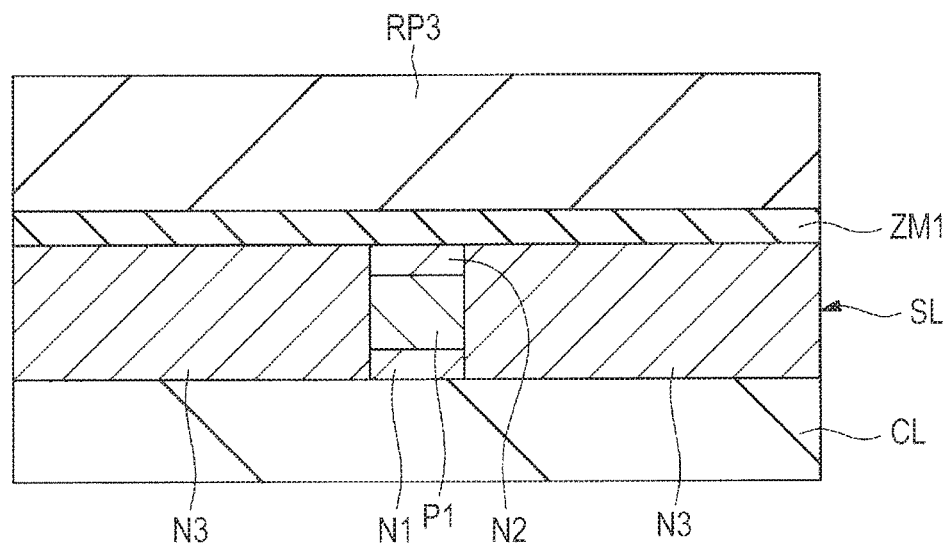
FIG. 20 is an essential part cross sectional view of the semiconductor device during a manufacturing step following FIG. 18.
Figure 21:
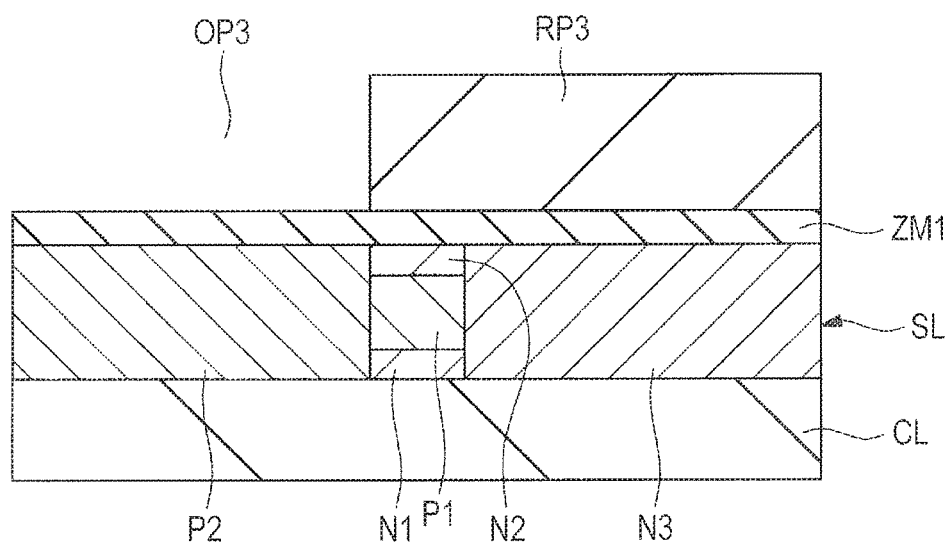
FIG. 21 is an essential part cross sectional view of the semiconductor device during the same manufacturing step as that of FIG. 20.

Then, the photoresist pattern RP2 is removed. Then, using a photolithography technology, as shown in FIGS. 20 and 21, a photoresist pattern RP3 is formed over the insulation film ZM1. The photoresist pattern RP3 has an opening OP3 in the region where a p type semiconductor region P2 described later should be formed.

Then, using the photoresist pattern RP3 as a mask, a p type impurity is ion implanted, thereby to form a p type semiconductor region P2 in the portion (i.e., the portion overlapping the opening OP3 in a plan view) of the semiconductor layer SL not covered with the photoresist pattern RP3. The p type semiconductor region P2 is formed in the region to be the secondary section S2 of the phase modulation part PM later at the semiconductor layer SL.

Specifically, at the semiconductor layer SL in the region to be the secondary section S2 of the phase modulation part PM later, on one side (the side on which the n type semiconductor region N3 is not formed) of both sides (both sides in the Y direction) of the lamination structure of the n type semiconductor region N1, the p type semiconductor region P1, and the n type semiconductor region N2, a p type semiconductor region P2 is formed in such a manner as to be adjacent to the side surface of the lamination structure. The p type semiconductor region P2 is not formed in the region to be the main section S1 of the phase modulation part PM later of the semiconductor layer SL. Thereafter, the photoresist pattern RP3 is removed.

At this stage, the lamination structure of the n type semiconductor region N1, the p type semiconductor region P1, and the n type semiconductor region N2 is formed in the semiconductor layer SL in the region to be the rib part RB of the phase modulation part PM later. Then, at the semiconductor layer SL in the region to be the main section S1 of the phase modulation part PM later, the n type semiconductor region N3 is formed on both sides of the lamination structure. At the semiconductor layer SL in the region to be the secondary section S2 of the phase modulation part PM later, the n type semiconductor region N3 is formed on one side of both sides of the lamination structure, and the p type semiconductor region P2 is formed on the other side. At any subsequent timing, a heat treatment (activating annealing) for activating the impurity implanted by the ion implantation up to this point can be performed.

Figure 22:
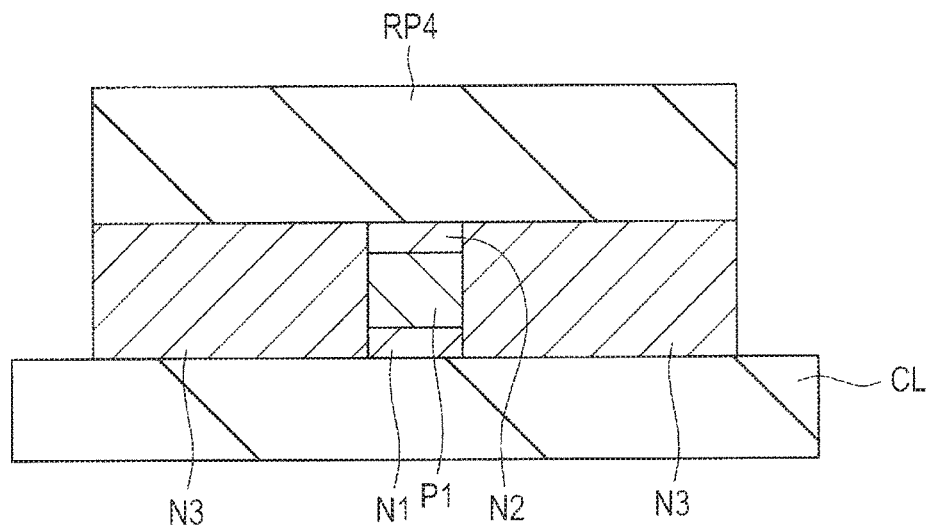
FIG. 22 is an essential part cross sectional view of the semiconductor device during a manufacturing step following FIG. 20.
Figure 23:
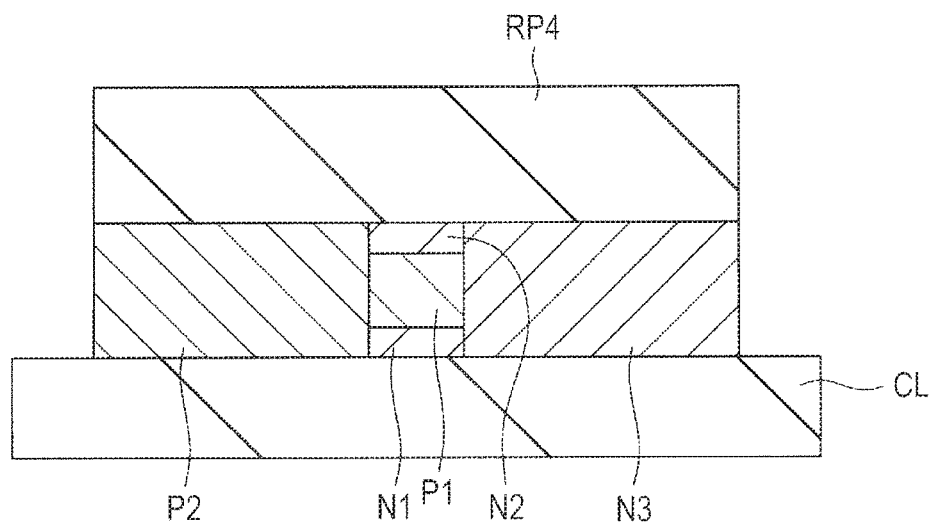
FIG. 23 is an essential part cross sectional view of the semiconductor device during the same manufacturing step as that of FIG. 22.

Then, the insulation film ZM1 is removed by wet etching or the like. Then, using a photolithography technology, as shown in FIGS. 22 and 23, a photoresist pattern RP4 is formed over the semiconductor layer SL. The photoresist pattern RP4 has such a pattern as to cover the region to be the phase modulation part PM later, the region to be the optical waveguide WO1 later, and the region to be the optical waveguide WO2 (WO2a and WO2b), and as to expose other regions.

Then, using the photoresist pattern RP4 as an etching mask, the semiconductor layer SL is etched. FIGS. 22 and 23 each show the stage at which the etching has been performed. At this step, the portion of the semiconductor layer SL not covered with the photoresist pattern RP4 is etched and removed, and the portion of the semiconductor layer SL situated under the photoresist pattern RP4 is not etched, and is left. As a result, the semiconductor layer SL is patterned. The patterned semiconductor layer SL forms the optical waveguide WO1, the optical waveguide WO2, and the phase modulation part PM. However, at this stage, the phase modulation part PM has not yet had a rib structure, and has the same thickness entirely. Further, for the etching at this step, so-called full etching of etching the overall thickness of the semiconductor layer SL is performed. For this reason, the upper surface of the insulation layer CL is exposed in the region from which the semiconductor layer SL has been removed.

Figure 24:
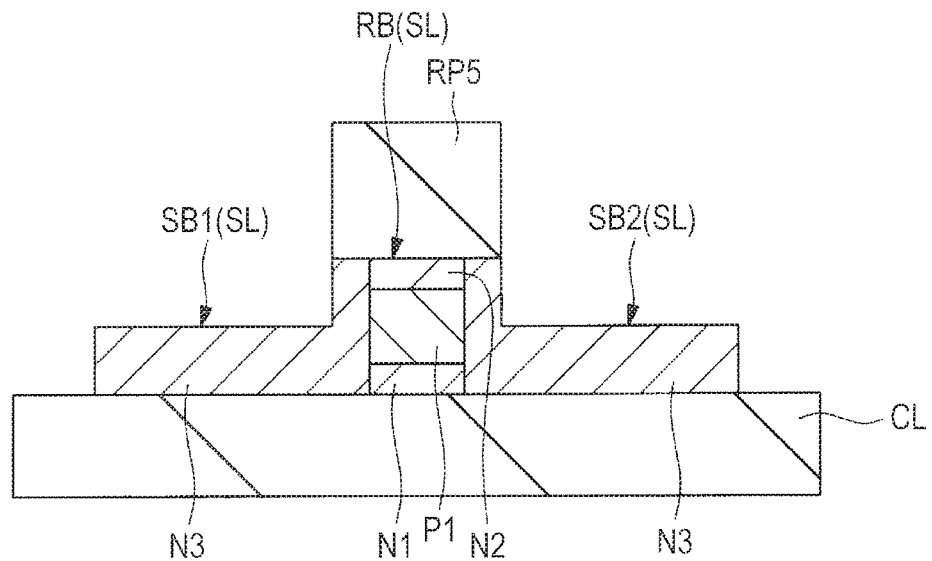
FIG. 24 is an essential part cross sectional view of the semiconductor device during a manufacturing step following FIG. 22.
Figure 25:
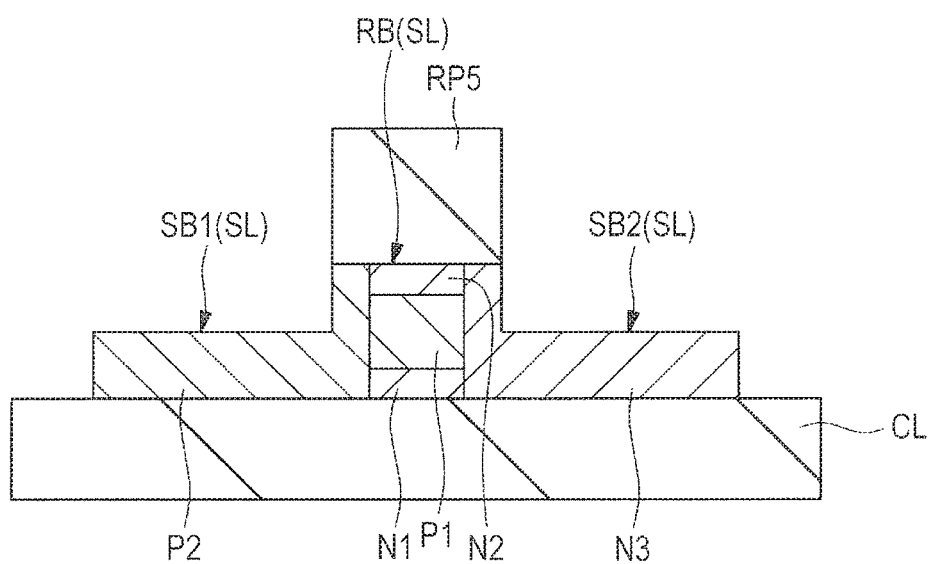
FIG. 25 is an essential part cross sectional view of the semiconductor device during the same manufacturing step as that of FIG. 24.

Then, after removing the photoresist pattern RP4, using a photolithography technology, as shown in FIGS. 24 and 25, a photoresist pattern RP5 is formed over the insulation layer CL in such a manner as to cover the optical waveguide WO1, the optical waveguide WO2, and the phase modulation part PM. The optical waveguide WO1, and the optical waveguide WO2 are entirely covered with the photoresist pattern RP5. On the other hand, the region of the phase modulation part PM which should be the rib part RB of the phase modulation part PM is covered with the photoresist pattern RP5. However, the region of the phase modulation part PM which should be the slab part SB is not covered with the photoresist pattern RP5, and is exposed.

Figure 26:
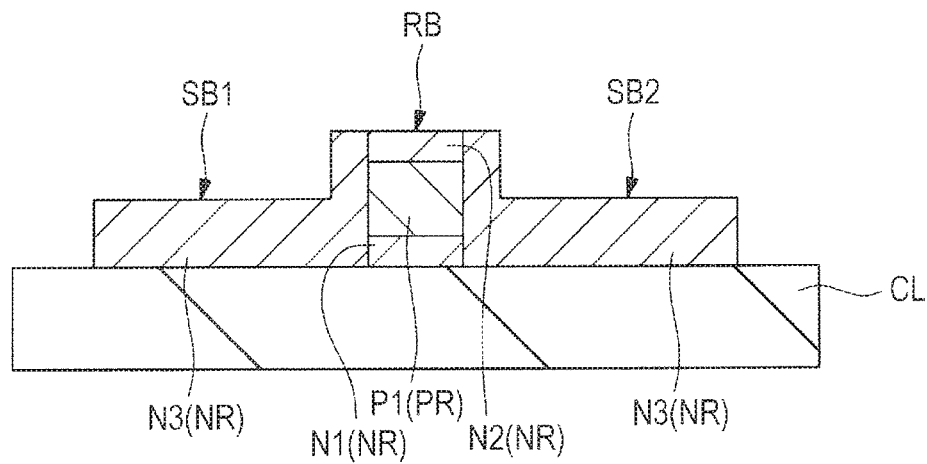
FIG. 26 is an essential part cross sectional view of the semiconductor device during a manufacturing step following FIG. 24.
Figure 27:
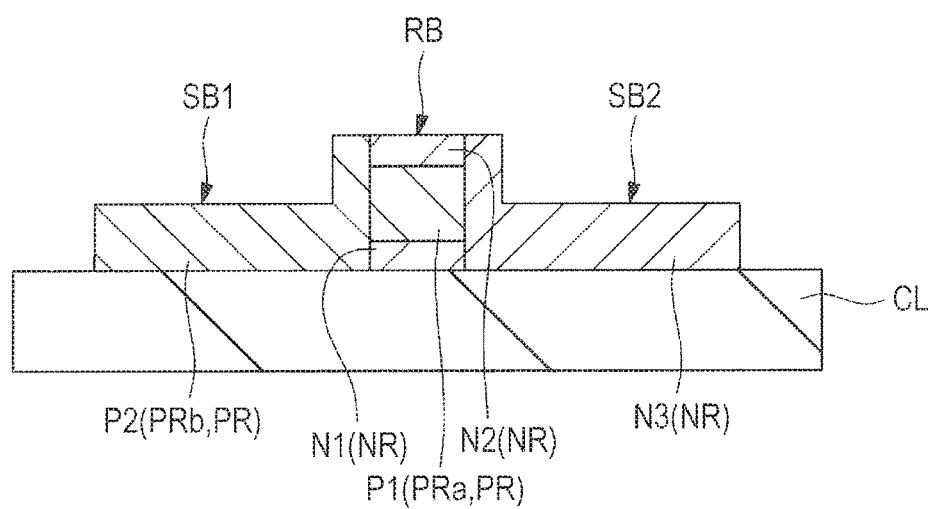
FIG. 27 is an essential part cross sectional view of the semiconductor device during the same manufacturing step as that of FIG. 24.

Then, using the photoresist pattern RP5 as an etching mask, the phase modulation part PM (the semiconductor layer SL forming the phase modulation part PM) is etched. FIGS. 24 and 25 each show the stage at which the etching has been performed. At this step, not that the overall thickness of the semiconductor layer SL forming the phase modulation part PM is etched, but that a part of the thickness of the semiconductor layer SL forming the phase modulation part PM is etched. In other words, so-called half etching is performed. As a result, the portion of the semiconductor layer SL forming the phase modulation part PM exposed without being covered with the photoresist pattern RP5 is etched in partial thickness, and is reduced in thickness, to be the slab parts SB1 and SB2 of the phase modulation part PM. On the other hand, the portion of the semiconductor layer SL forming the phase modulation part PM covered with the photoresist pattern RP5 is not etched, and is kept in thickness, to be the rib part RB of the phase modulation part PM. Thereafter, as shown in FIGS. 26 and 27, the photoresist pattern RP5 is removed.

As shown in FIG. 24, at the main section S1 of the phase modulation part PM, in a cross sectional view, the lamination structure of the n type semiconductor region N1, the p type semiconductor region P1, and the n type semiconductor region N2 is present in the rib part RB. The n type semiconductor region N3 is present on both sides of the lamination structure at the rib part RB, and in the slab parts SB1 and SB2. As shown in FIG. 25, at the secondary section S2 of the phase modulation part PM, in a cross sectional view, the lamination structure of the n type semiconductor region N1, the p type semiconductor region P1, and the n type semiconductor region N2 is present in the rib part RB. The p type semiconductor region P2 is present on one of both sides of the lamination structure at the rib part RB and in the slab part SB1. The n type semiconductor region N2 is present on the other of both sides of the lamination structure at the rib part RB and in the slab part SB2. At the main section S1 of the phase modulation part PM, the p type semiconductor region P2 is not formed in the rib part RB and the slab parts SB1 and SB2. As shown in FIG. 24, at the main section S1 of the phase modulation part PM, in a cross sectional view, the p type semiconductor region P1 is arranged at the central part of the rib part RB. In the rib part RB, an n type semiconductor region formed of the n type semiconductor regions N1, N2, and N3 is present in such a manner as to surround the entire circumference of the p type semiconductor region P1. The n type semiconductor region is also present in the slab parts SB1 and SB2.

The p type semiconductor region PR of the main section S1 and the p type semiconductor region PRa of the secondary section S2 of the phase modulation part PM are formed of the p type semiconductor region P1. The p type semiconductor region PRb of the secondary section S2 of the phase modulation part PM is formed of the p type semiconductor region P2. Further, the n type semiconductor regions NR of the main section S1 and the secondary section S2 of the phase modulation part PM are formed of the n type semiconductor regions N1, N2, and N3. Namely, the entire combination of the n type semiconductor region N1, the n type semiconductor region N2, and the n type semiconductor region N3 becomes the n type semiconductor region NR.

The semiconductor layer SL is processed in this manner, thereby to form the phase modulation part PM having a rib type structure.

Figure 28:
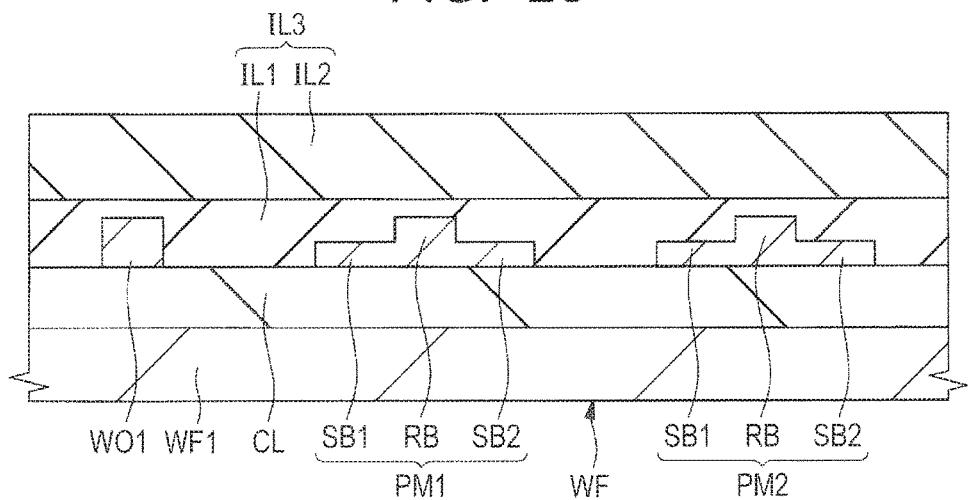
FIG. 28 is an essential part cross sectional view of the semiconductor device during a manufacturing step following FIG. 26.

Then, as shown in FIG. 28, an interlayer insulation film IL3 is formed over the insulation layer CL in such a manner as to cover the optical waveguide WO1, the optical waveguide WO2 (WO2a and WO2b), and the phase modulation part PM (PM1 and PM2). When the interlayer insulation film IL3 is formed of a lamination film of the insulation film IL1 and the insulation film IL2, first, the insulation film IL1 is formed over the insulation layer CL in such a manner as to cover the optical waveguides WO1 and WO2 and the phase modulation part PM using a CVD (Chemical Vapor Deposition) method or the like. Then, the upper surface of the insulation film IL1 is polished and planarized by a CMP (Chemical Mechanical Polishing) method or the like. Thereafter, the insulation film IL2 is formed over the insulation film IL1 using a CVD method or the like. After forming the insulation film IL2, the insulation film IL2 is polished by a CMP method. By this or other procedures, the upper surface of the insulation film IL2 can be planarized.

Further, although not shown, when the patterned semiconductor layer SL forms the p type semiconductor part for a germanium photodetector, after planarizing the insulation film IL1, an opening for exposing a part of the p type semiconductor part for a germanium photodetector is formed in the insulation film IL1. Then, an n type semiconductor part formed of germanium (Ge) is formed in the opening. This can result in the formation of a germanium photodetector (equivalent to the photodetector OT4) formed of a p type semiconductor part (Si layer) and an n type semiconductor part (Ge layer) thereover. Thereafter, the insulation film IL2 may be formed over the insulation film IL1 in such a manner as to cover the germanium photodetector.

Figure 29:
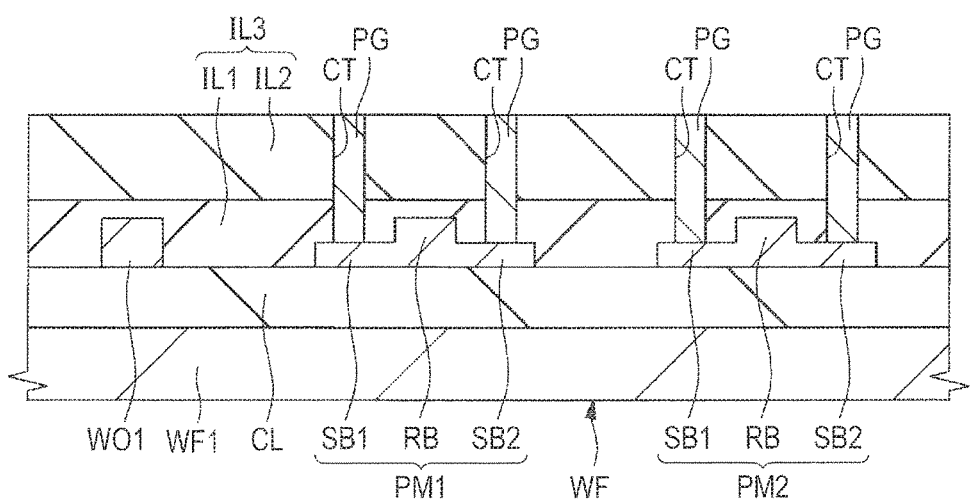
FIG. 29 is an essential part cross sectional view of the semiconductor device during a manufacturing step following FIG. 28.

Then, as shown in FIG. 29, contact holes CT are formed in the interlayer insulation film IL3. The contact holes CT include the contact holes CT1, CT2, CT3, and CT4, and are formed in such a manner as to penetrate through the interlayer insulation film IL3. For example, the contact holes CT can be formed in the following manner: a photoresist pattern (not shown) is formed over the interlayer insulation film IL3; then, using the photoresist pattern as an etching mask, the interlayer insulation film IL3 is etched.

Then, conductive plugs PG are formed in the contact holes CT in the interlayer insulation film IL3. The plugs PG include the plugs PG1, PG2, PG3, and PG4.

The plugs PG can be formed, for example, in the following manner. First, a barrier conductor film is formed over the interlayer insulation film IL3 including the bottom surface and the side surface of each contact hole CT. Then, a main conductor film is formed over the barrier conductor film in such a manner as to fill the inside of each contact hole CT. The barrier conductor film is formed of, for example, a titanium film or a titanium nitride film, or a lamination film thereof. The main conductor film is formed of, for example, a tungsten film. Thereafter, the unnecessary portions of the main conductor film and the barrier conductor film outside the contact holes CT are removed by a CMP method, an etch back method, or the like. As a result, the plugs PG can be formed. Each plug PG is formed of the main conductor film and the barrier conductor film left in each contact hole CT.

Figure 30:
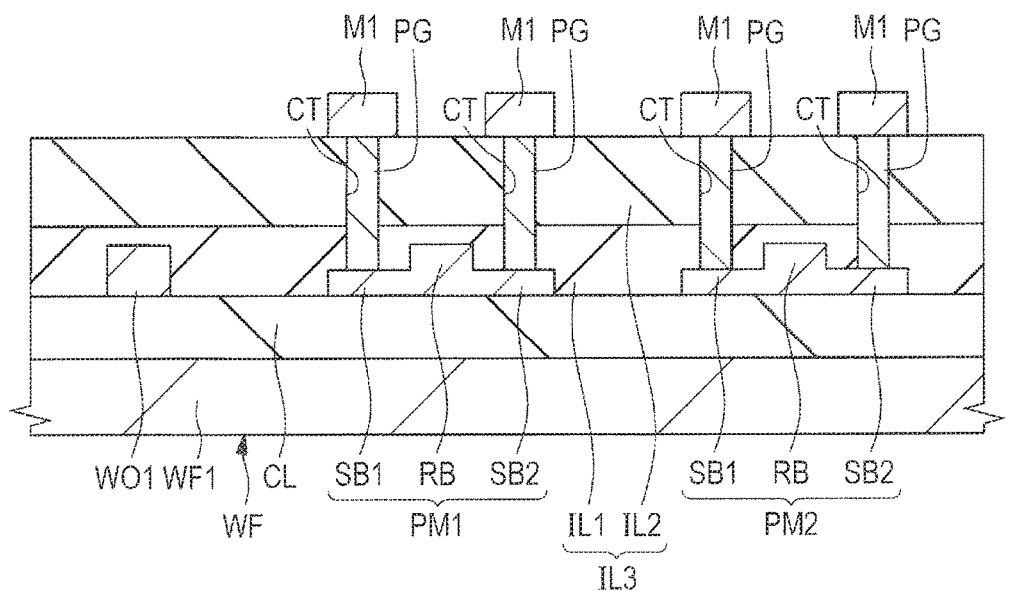
FIG. 30 is an essential part cross sectional view of the semiconductor device during a manufacturing step following FIG. 29.

Then, as shown in FIG. 30, a wire M1 is formed over the interlayer insulation film IL3 including the plugs PG buried therein.

The wire M1 can be formed, for example, in the following manner. First, over the interlayer insulation film IL3 including the plugs PG buried therein, a conductive film for forming the wire M1 is formed. The conductive film is formed of, for example, a lamination film of the barrier conductor film, the main conductor film thereover, and the barrier conductor film thereover. The barrier conductor film is formed of a titanium film or a titanium nitride film, or a lamination film thereof. The main conductor film is formed of an aluminum film or an aluminum alloy film. Then, the conductive film is patterned using a photolithography technology and an etching technology. As a result, the wire M1 can be formed. The wire M1 includes the wires M1$a$ and M1$b$.

Figure 31:
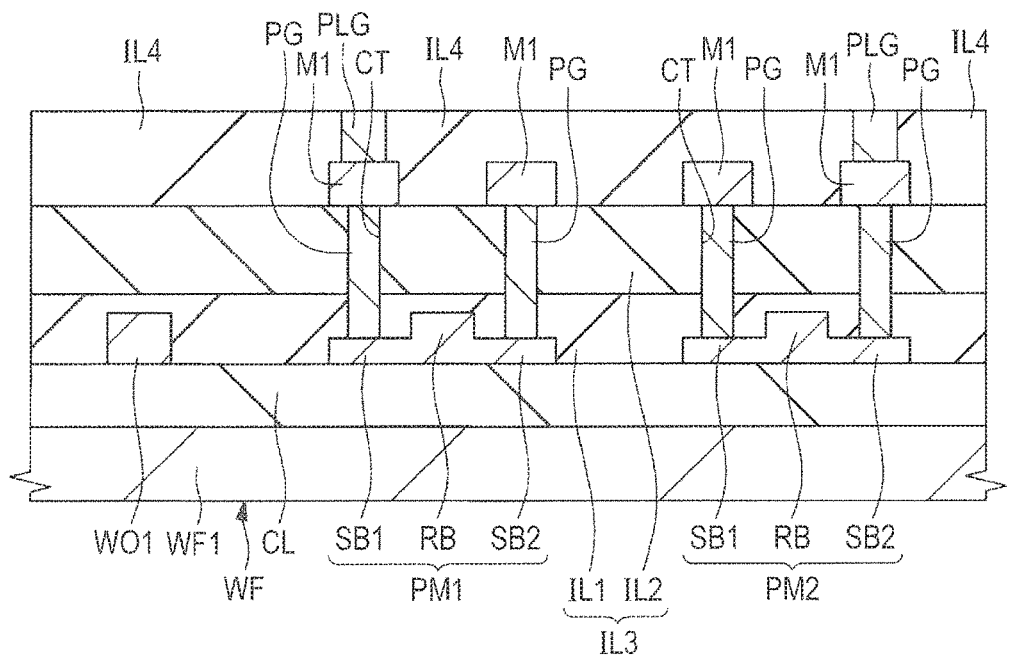
FIG. 31 is an essential part cross sectional view of the semiconductor device during a manufacturing step following FIG. 30.

Then, as shown in FIG. 31, over the interlayer insulation film IL3, an interlayer insulation film IL4 is formed using a CVD method or the like in such a manner as to cover the wire M1. After forming the interlayer insulation film IL4, the upper surface of the interlayer insulation film IL4 can be planarized by a CMP method.

Then, using a photolithography technology and an etching technology, through holes are formed in the interlayer insulation film IL5. Then, a conductive plug PLG is formed in each of the through holes. The plug PLG can be formed by almost the same method as that for the plug PG.

Figure 32:
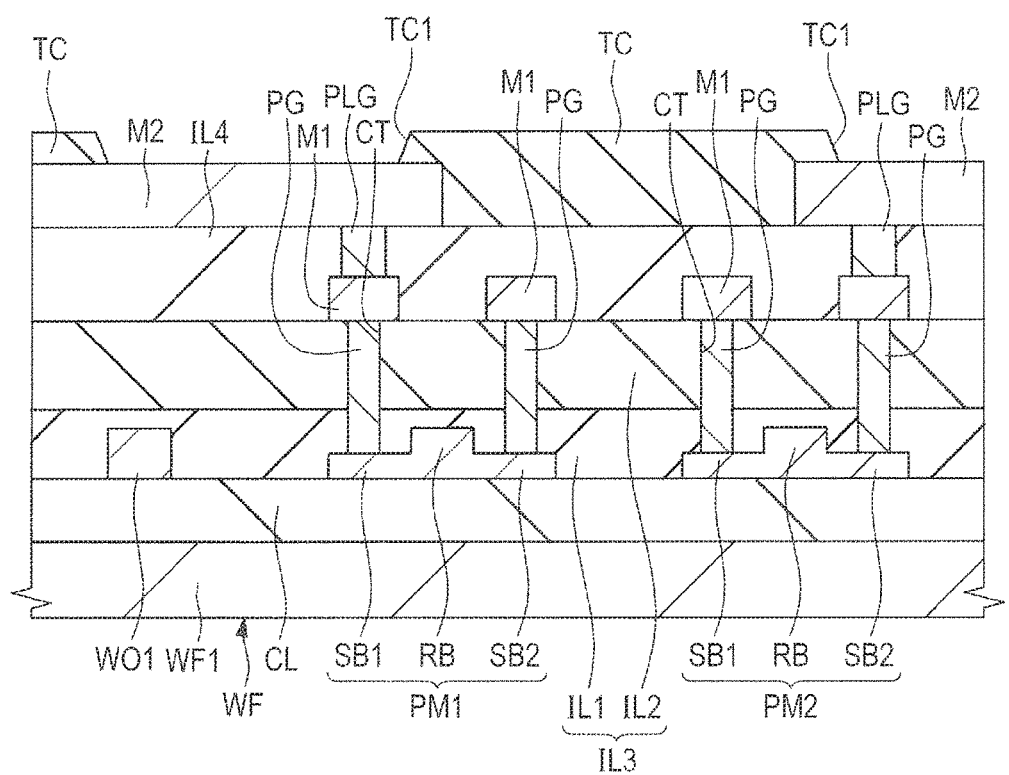
FIG. 32 is an essential part cross sectional view of the semiconductor device during a manufacturing step following FIG. 31.

Then, as shown in FIG. 32, a wire M2 is formed over the interlayer insulation film IL4 including the plugs PLG buried therein. The wire M2 can be formed by almost the same method as that for the wire M1.

Then, a protective film TC is formed over the interlayer insulation film IL5 using a CVD method or the like in such a manner as to cover the wire M2.

Then, an opening TC1 is formed in the protective film TC using a photolithography technology and an etching technology. A part of the wire M2 is exposed from the opening TC1 of the protective film TC. The portion of the wire M2 exposed from the opening OP2 becomes the pad part. Thereafter, the SOI substrate WF is diced (cut), and singulated together with the overlying structure, resulting in semiconductor chips (semiconductor devices).

The semiconductor device of the present embodiment can be manufactured in this manner.

Regarding Details of Study

Figure 33:
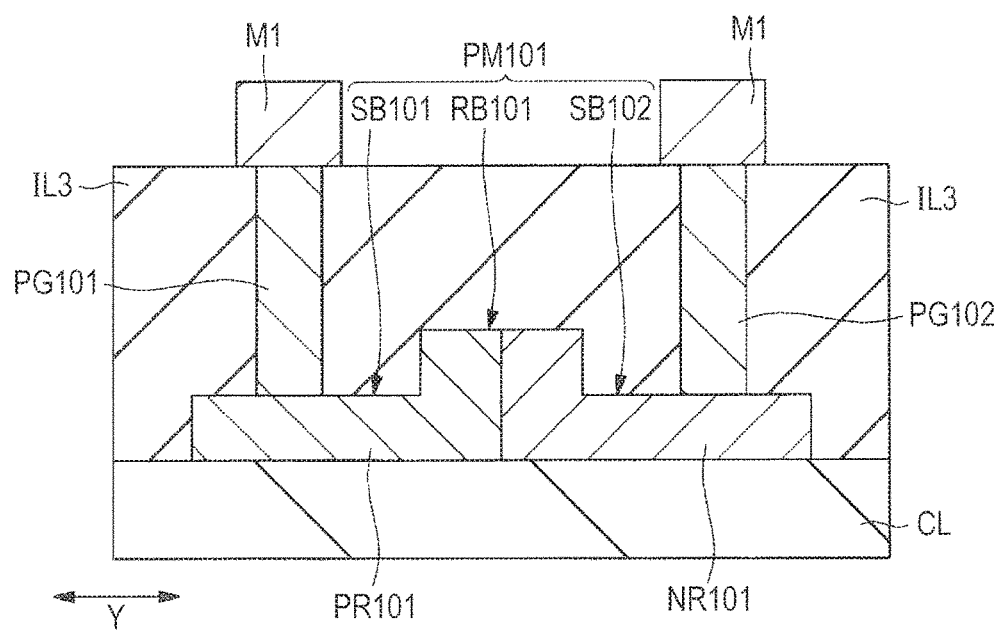
FIG. 33 is an essential part cross sectional view of a semiconductor device of Study Example.

A semiconductor device of Study Example studied by the present inventors will be described by reference to FIG. 33. FIG. 33 is an essential part cross sectional view of the semiconductor device of Study Example studied by the present inventors, and corresponds to FIG. 9.

The main difference between the semiconductor device of Study Example shown in FIG. 33 and the semiconductor device of the present embodiment of FIGS. 2 to 11 is mainly in the phase modulation part PM101. For this reason, herein, the configuration of the phase modulation part PM101 will be described.

In Study Example shown in FIG. 33, the phase modulation part PM101 has a rib type structure, and is formed of a rib part RB101, and a pair of slab parts SB101 and SB102 arranged on both sides of the rib part RB101. In the rib part RB101 of the phase modulation part PM101, a p type semiconductor region PR101 and an n type semiconductor region NR101 are formed. The pn junction surface between the p type semiconductor region PR101 and the n type semiconductor region NR101 is present in the rib part RB101.

As shown in FIG. 33, in a cross sectional view, the right half (the half on the slab part SB102 side) of the rib part RB101, and the entire slab part SB102 coupled therewith become the n type semiconductor region NR101. The left half (the half on the slab part SB101 side) of the rib part RB101, and the entire slab part SB101 coupled therewith become the p type semiconductor region PR101. For this reason, the pn junction surface between the p type semiconductor region PR101 and the n type semiconductor region NR101 is substantially perpendicular to the upper surface of the insulation layer CL, and extends in the X direction (the direction perpendicular to the paper plane of FIG. 33) along the center in the width direction of the rib part RB101 (the Y direction). Then, the plug PG101 is arranged over the slab part SB101, and is electrically coupled with the p type semiconductor region PR101. Whereas, the other plug PG102 is arranged over the slab part SB102, and is electrically coupled with the n type semiconductor region NR101.

Then, a description will be given to the operation of an optical modulator using the phase modulation part PM101.

At the phase modulation part PM101, a voltage is applied from the plug PG101 to the p type semiconductor region PR101, and a higher voltage than this is applied from the plug PG101 to the n type semiconductor region NR101. Namely, a reverse bias is applied to the p type semiconductor region PR101 and the n type semiconductor region NR101 formed in the phase modulation part PM101. As a result, at the phase modulation part PM101, the width of the depletion layer generated in the vicinity of the pn junction in the rib part RB101 increases. This results in a change in carrier density at the rib part RB101. A change in carrier density of the rib part RB101 of the phase modulation part PM101 results in a change in refractive index. Accordingly, the wavelength of the light passing therethrough is changed. For this reason, the phase of the light can be changed.

At the phase modulation part PM101, the width of the depletion layer generated in the vicinity of the pn junction can be increased by increasing the reverse bias to be applied to the p type semiconductor region PR101 and the n type semiconductor region NR101. However, at the phase modulation part PM101 in the case of Study Example shown in FIG. 33, it is difficult to deplete the entire rib part RB101 of the phase modulation part PM101. The reason for this is as follows. Herein, FIG. 34 is the same essential part cross sectional view of the semiconductor device of Study Example as FIG. 33, where the region (depletion layer) KB101 depleted by application with a reverse bias is indicated with dot hatching.

Figure 34:
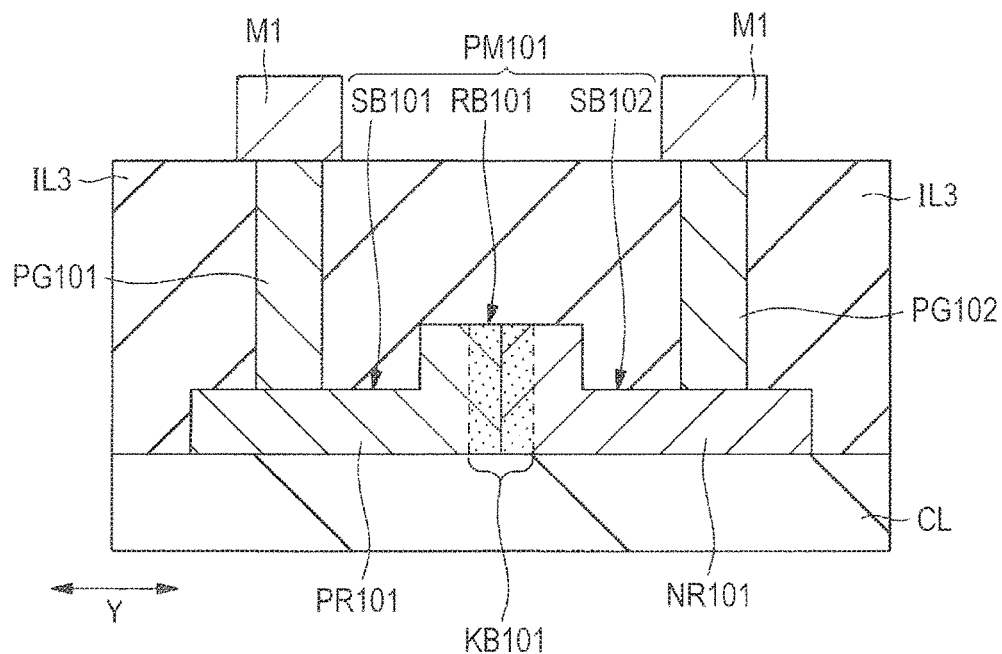
FIG. 34 is an essential part cross sectional view of a semiconductor device of Study Example.

Namely, at the rib part RB101 of the phase modulation part PM101 shown in FIGS. 33 and 34, even when the reverse bias is increased to expand the depletion layer from the pn junction surface, the direction of expansion of the depletion layer is only the width direction of the rib part RB101 (Y direction). Accordingly, only the vicinity of the center in the width direction of the rib part RB101 can be depleted. Thus, it is difficult to deplete up to the region on the side of the end in the width direction of the rib part RB101. For this reason, the ratio of the volume of the depletion layer (KB101) to the total volume of the rib part RB101 cannot be set very large. Thus, it is difficult to deplete the entire rib part RB101 of the phase modulation part PM101. Further, when the entire rib part RB101 of the phase modulation part PM101 is tried to be forcedly depleted, the reverse bias is required to be set considerably large. In that case, the circuit for controlling the phase modulation part PM101 is complicated. Further, the high speed operation becomes difficult. These and other disadvantages are caused.

For this reason, in the case of the phase modulation part PM101 shown in FIGS. 33 and 34, the amount of change in carrier density of the rib part RB101 in association with reverse bias application cannot be set very large. This restricts the amount of change in refractive index in association with reverse bias application. For this reason, in order to sufficiently change the phase of a light in the process of passing through the phase modulation part PM101, the length (the dimension in the X direction) of the phase modulation part PM101 is required to be set large. When the length of the phase modulation part PM101 is increased, the phase of the light can be sufficiently changed in the process of passing through the phase modulation part PM101 even if the entire rib part RB101 of the phase modulation part PM101 cannot be depleted. However, an increase in length of the phase modulation part PM101 incurs an increase in dimensions of the optical modulator including the phase modulation part PM101, and further incurs an increase in planar dimension (area) of the semiconductor device.

Regarding Main Features and Effects

The semiconductor device of the present embodiment includes the insulation layer CL (first insulation film), the phase modulation part PM (first optical waveguide part) formed (extending) over the insulation layer CL, and the interlayer insulation film IL3 (second insulation film) formed over the insulation layer CL in such a manner as to cover the phase modulation part PM. In the phase modulation part PM, the p type semiconductor region PR (first semiconductor region) and the n type semiconductor region NR (second semiconductor region) are formed. At the main section S1 (first portion) of the phase modulation part PM, in a cross sectional view perpendicular to the direction of extension of the phase modulation part PM (X direction), the p type semiconductor region PR is arranged at the central part (more specifically, the central part of the rib part RB) of the phase modulation part PM, and the n type semiconductor region NR is arranged in such a manner as to cover the entire circumference of the p type semiconductor region PR.

One of the main features of the present embodiment resides in that, at the main section S1 of the phase modulation part PM, in a cross sectional view, the p type semiconductor region PR is arranged at the central part of the phase modulation part PM, and that the n type semiconductor region NR is arranged in such a manner as to surround the entire circumference of the p type semiconductor region PR. More specifically, at the main section S1 of the phase modulation part PM, in a cross sectional view, the p type semiconductor region PR is arranged at the central part of the rib part RB, and the n type semiconductor region NR is arranged in such a manner as to surround the entire circumference of the p type semiconductor region PR in the rib part RB. This can increase the volume which can be depleted at the phase modulation part PM (more specifically, the rib part RB), and also enables the depletion of the entire rib part RB. Below, a description will be given specifically.

At the main section S1 of the phase modulation part PM, in a cross sectional view, the p type semiconductor region PR is arranged at the central part of the rib part RB of the phase modulation part PM, and the type semiconductor region NR is arranged in such a manner as to surround the entire circumference of the p type semiconductor region PR. For this reason, at the main section S1 of the phase modulation part PM, as shown in FIG. 9, at the rib part RB of the phase modulation part PM, the upper surface F1, the lower surface F2, and both side surfaces F3 and F4 of the p type semiconductor region PR are in contact with the n type semiconductor region NR, and the upper surface F1, the lower surface F2, and both side surfaces F3 and F4 of the p type semiconductor region PR become pn junction surfaces.

Figure 35:
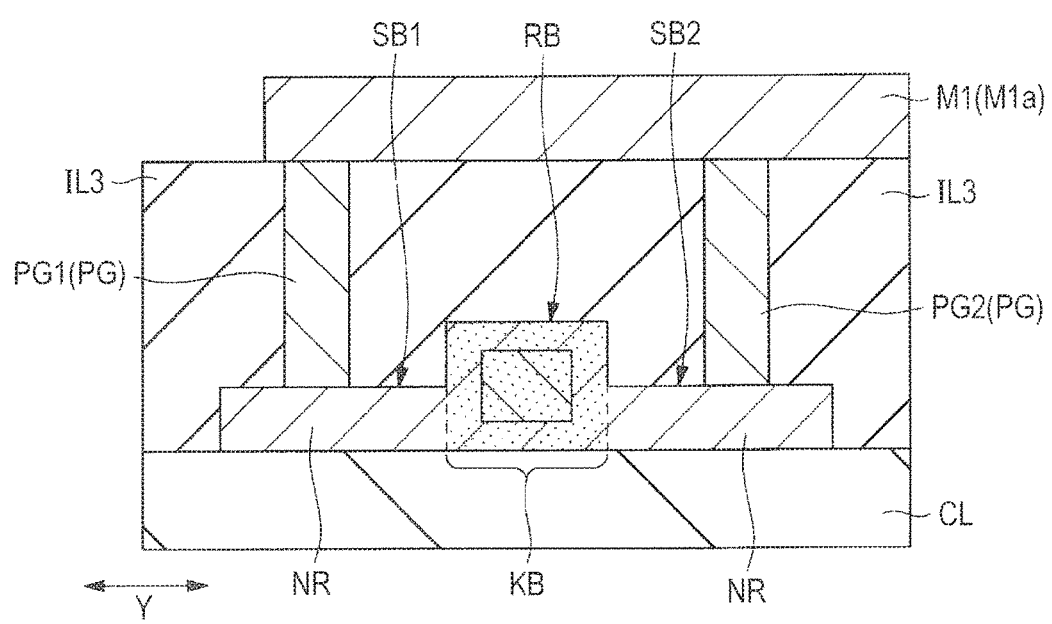
FIG. 35 is an essential part cross sectional view of the semiconductor device of one embodiment.

For this reason, when the p type semiconductor region PR and the n type semiconductor region NR are applied with a reverse bias, the depletion layer expands from the upper surface F1, the lower surface F2, and both side surfaces F3 and F4 of the p type semiconductor region PR. Namely, the depletion layer expands from the upper surface F1 of the p type semiconductor region PR in the direction of thickness of the rib part RB (vertical direction). Whereas, the depletion layer expands from the lower surface F2 of the p type semiconductor region PR in the direction of thickness of the rib part RB. Further, the depletion layer expands from the side surface F3 of the p type semiconductor region PR in the direction of width of the rib part RB (Y direction). Still further, the depletion layer expands from the side surface F4 of the p type semiconductor region PR in the direction of width of the rib part RB. Herein, FIG. 35 is the same essential part cross sectional view of the semiconductor device of the present embodiment as FIG. 9, where the region (depletion region) KB depleted by reverse bias application is indicated with dot hatching. Thus, the depletion layer expands from the upper surface F1, the lower surface F2, and the side surfaces F3 and F4 of the p type semiconductor region PR in the thickness direction and the width direction of the rib part RB. This can increase the volume (the volume of the depletion layer) depleted at the rib part RB of the phase modulation part PM, and also enables the depletion of the entire rib part RB.

In the present embodiment, at the rib part RB of the main section S1 of the phase modulation part PM, the volume to be depleted can be increased. For this reason, it is possible to increase the amount of change in carrier density of the rib part RB in association with reverse bias application. Namely, it is possible to increase the difference between the carrier density of the rib part RB when the p type semiconductor region PR and the n type semiconductor region NR are not applied with a reverse bias, and the carrier density of the rib part RB when a reverse bias is applied thereto. As a result, it is possible to increase the amount of change in refractive index of the light passing through the rib part RB in association with reverse bias application. Namely, it is possible to increase the difference between the refractive index of the light passing through the rib part RB when the p type semiconductor region PR and the n type semiconductor region NR are not applied with a reverse bias, and the refractive index of the light passing through the rib part RB when a reverse bias is applied thereto. For this reason, it becomes possible to efficiently change the phase of the light in the process of passing through the phase modulation part PM. Accordingly, it is possible to improve the modulation efficiency of the phase modulation part PM, or the optical modulator including the phase modulation part PM. Therefore, the performances of the semiconductor device can be improved. Further, even when the length (the dimension in the X direction) of the phase modulation part PM is not increased, the phase of the light can be efficiently changed in the process of passing through the phase modulation part PM. Accordingly, the length of the phase modulation part PM can be reduced. For this reason, the dimensions of the optical modulator including the phase modulation part PM can be suppressed, and further, the semiconductor device can be miniaturized. Further, even when the reverse bias to be applied to the p type semiconductor region PR and the n type semiconductor region NR is not increased, the volume of the depletion layer can be efficiently ensured at the rib part RB of the phase modulation part PM. This facilitates the formation of a circuit for controlling the phase modulation part PM, and also enables the high-speed operation.

Another of the main features of the present embodiment resides in that not only the main section S1 but also the secondary section S2 are provided at the phase modulation part PM. Namely, the phase modulation part PM not only has the main section S1, but also has the secondary section S2 (second portion) adjacent to the main section S1 (first portion) in the direction of extension of the phase modulation part PM (herein, the X direction). The main section S1 and the secondary section S2 are adjacent to each other in the direction of extension of the phase modulation part PM (herein, the X direction).

The reason why not only the main section S1 but also the secondary section S2 are provided at the phase modulation part PM is as follows. Namely, at the main section S1 of the phase modulation part PM, in a cross sectional view, the n type semiconductor region NR is arranged in such a manner as to surround the entire circumference of the p type semiconductor region PR. For this reason, when the phase modulation part PM is formed of only the main section S1, it is easy to apply a desired voltage to the n type semiconductor region NR, but it is difficult to apply a desired voltage to the p type semiconductor region PR. This is due to the following: when the n type semiconductor region NR is arranged in such a manner as to surround the entire circumference of the p type semiconductor region PR, it becomes difficult to extract the p type semiconductor region PR to outside the n type semiconductor region NR surrounding the p type semiconductor region PR; accordingly, it becomes difficult to couple the plug PG to the p type semiconductor region PR.

Under such circumstances, the secondary section S2 is provided at the phase modulation part PM so that a desired voltage can be applied not only to the n type semiconductor region but also to the p type semiconductor region of the p type semiconductor region and the n type semiconductor region formed in the phase modulation part PM. At the phase modulation part PM, the secondary section S2 is the region provided for enabling application of a desired voltage to the p type semiconductor region formed at the phase modulation part PM.

At the secondary section S2 (second portion) of the phase modulation part PM, in a cross sectional view perpendicular to the direction of extension of the phase modulation part PM (herein, the X direction), the p type semiconductor region PR and the n type semiconductor region NR are adjacent to each other, and the entire circumference of the p type semiconductor region PR is not surrounded by the n type semiconductor region NR. More specifically, at the secondary section S2 of the phase modulation part PM, in a cross sectional view, the p type semiconductor region PR and the n type semiconductor region NR are arranged adjacent to each other in the rib part RB, and the entire circumference of the p type semiconductor region PR is not surrounded by the n type semiconductor region NR. In other words, as distinct from the main section S1, the secondary section S2 does not adopt a structure in which the entire circumference of the p type semiconductor region PR is surrounded by the n type semiconductor region NR at the rib part RB. At the secondary section S2 of the phase modulation part PM, in a cross sectional view, the p type semiconductor region PR is arranged at the central part of the phase modulation part PM (more specifically, the rib part RB), and the n type semiconductor region NR is arranged in such a manner as not to surround the entire circumference of the p type semiconductor region PR.

For this reason, it is easy to apply a desired voltage to the p type semiconductor region PR of the secondary section S2 of the phase modulation part PM. Namely, when the entire circumference of the p type semiconductor region is surrounded by the n type semiconductor region in a cross sectional view as at the main section S1, the obstruction by the n type semiconductor region NR makes it difficult to couple the plug PG to the p type semiconductor region PR. For this reason, it is difficult to apply a desired voltage to the p type semiconductor region PR. In contrast, even when the p type semiconductor region PR and the n type semiconductor region NR are adjacent to each other as at the secondary section S2, the plug PG becomes more likely to be coupled to the p type semiconductor region PR unless the entire circumference of the p type semiconductor region PR is surrounded by the n type semiconductor region NR. Thus, it becomes easy to apply a desired voltage to the p type semiconductor region PR.

Then, the p type semiconductor region PR at the main section S1 of the phase modulation part PM is coupled with the p type semiconductor region PR at the secondary section S2 of the phase modulation part PM. Further, the n type semiconductor region NR at the main section S1 of the phase modulation part PM is coupled with the n type semiconductor region NR at the secondary section S2 of the phase modulation part PM. More specifically, the p type semiconductor region PR in the rib part RB at the main section S1 of the phase modulation part PM is coupled with the p type semiconductor region PR in the rib part RB at the secondary section S2 of the phase modulation part PM in the X direction. Further, the n type semiconductor region NR in the rib part RB at the main section S1 of the phase modulation part PM is coupled with the n type semiconductor region NR in rib part RB at the secondary section S2 of the phase modulation part PM in the X direction. As a result, it becomes possible to supply the voltage supplied to the p type semiconductor region PR of the secondary section S2 of the phase modulation part PM to the p type semiconductor region PR of the main section S1 of the phase modulation part PM.

In other words, at the main section S1, in a cross sectional view, the entire circumference of the p type semiconductor region PR is surrounded by the n type semiconductor region NR. For this reason, it is difficult to apply a desired voltage to the p type semiconductor region PR. However, at the secondary section S2, a desired voltage is applied from the plug PG, or the like to the p type semiconductor region PR. The voltage is transmitted to the p type semiconductor region PR of the main section S1. As a result, a desired voltage can be supplied via the p type semiconductor region PR of the secondary section S2 to the p type semiconductor region PR of the main section S1.

Thus, the main section S1 and the secondary section S2 are provided at the phase modulation part PM. Accordingly, at the main section S1, the volume to be depleted at the time of reverse bias application is increased to improve the modulation efficiency; and at the secondary section S2, the p type semiconductor region PR can be applied with a desired voltage. As a result, it is possible to improve the modulation efficiency of the phase modulation part PM, and it is possible to precisely control the phase modulation part PM.

Still other features of the present embodiment will be described.

At the main section S1 of the phase modulation part PM, the n type semiconductor regions NR are formed in the slab part SB1 (first slab part) and also the slab part SB2 (second slab part). The n type semiconductor region NR in the rib part RB, the n type semiconductor region NR in the slab part SB1, and the n type semiconductor region NR in the slab part SB2 are coupled with one another. As a result, a desired voltage can be supplied via the n type semiconductor regions NR in the slab parts SB1 and SB2 to the n type semiconductor region NR in the rib part RB. For this reason, it becomes easy to control the phase modulation part PM.

Specifically, at the main section S1 of the phase modulation part PM, a plug PG1 is arranged over the slab part SB1. The plug PG1 can be electrically coupled with the n type semiconductor region NR in the slab part SB1. Further, at the main section S1 of the phase modulation part PM, a plug PG2 is arranged over the slab part SB2. The plug PG2 can be electrically coupled with the n type semiconductor region NR in the slab part SB2. As a result, the plug PG1 is electrically coupled via the n type semiconductor region NR in the slab part SB1 with the n type semiconductor region NR in the rib part RB. Whereas, the plug PG2 is electrically coupled via the n type semiconductor region NR in the slab part SB2 with the n type semiconductor region NR in the rib part RB. For this reason, a desired voltage can be supplied from the plugs PG1 and PG2 via the n type semiconductor regions NR in the slab parts SB1 and SB2 to the n type semiconductor region NR in the rib part RB.

Further, at the main section S1 of the phase modulation part PM, a p type semiconductor region is not formed in the slab parts SB1 and SB2. This is due to the following: at the rib part RB of the main section S1 of the phase modulation part PM, the entire circumference of the p type semiconductor region PR is surrounded by the n type semiconductor region NR; accordingly, even when a p type semiconductor region is formed in the slab parts SB1 and SB2 of the main section S1, it is difficult to couple the p type semiconductor region to the p type semiconductor region PR in the rib part RB of the main section S1. For this reason, a p type semiconductor region is not formed at the slab parts SB1 and SB2 of the main section S1 of the phase modulation part PM. This facilitates the arrangement of the n type semiconductor regions NR at the slab parts SB1 and SB2 of the main section S1. Accordingly, the plugs PG1 and PG2 become more likely to be coupled with the n type semiconductor regions NR.

Further, at the secondary section S2 of the phase modulation part PM, the p type semiconductor region PR is also formed in the slab part SB1. The p type semiconductor region PR in the rib part RB and the p type semiconductor region PR in the slab part SB1 are coupled with each other. As a result, a desired voltage can be supplied via the p type semiconductor region PR in the slab part SB1 of the secondary section S2 to the p type semiconductor region PR in the rib part RB of the secondary section S2. Further, the voltage can be transmitted to the p type semiconductor region PR in the rib part RB of the main section S1. This facilitates control of the phase modulation part PM.

Specifically, at the secondary section S2 of the phase modulation part PM, a plug PG3 is arranged over the slab part SB1. The plug PG3 can be electrically coupled with the p type semiconductor region PR in the slab part SB1. As a result, the plug PG3 is electrically coupled via the p type semiconductor region PR in the slab part SB1 of the secondary section S2 to the p type semiconductor region PR in the rib part RB of the secondary section S2, and is further electrically coupled with the p type semiconductor region PR in the rib part RB of the main section S1. For this reason, a desired voltage can be supplied from the plug PG3 via the p type semiconductor region PR in the slab part SB1 of the secondary section S2 to the p type semiconductor region PR in the rib part RB of the secondary section S2. Further, the voltage can be supplied to the p type semiconductor region PR in the rib part RB of the main section S1.

Further, in the present embodiment, at the secondary section S2 of the phase modulation part PM, the n type semiconductor region NR is formed in the slab part SB2. The n type semiconductor region NR in the rib part RB and the n type semiconductor region NR in the slab part SB2 are coupled with each other. Then, at the secondary section S2 of the phase modulation part PM, a plug PG4 is arranged over the slab part SB2. The plug PG4 is electrically coupled with the n type semiconductor region NR in the slab part SB2.

As a result, the plug PG4 is electrically coupled via the n type semiconductor region NR in the slab part SB1 of the secondary section S2 with the n type semiconductor region NR in the rib part RB of the secondary section S2, and is further electrically coupled with the n type semiconductor region NR in the rib part RB of the main section S1. A common voltage is supplied to the plugs PG1, PG2, and PG4 through the wire M1a. A common voltage can also be supplied from the plug PG4 provided for the secondary section S2 in addition to the plugs PG1 and PG2 provided for the main section S1 to the n type semiconductor region NR of the main section S1 and the secondary section S2.

Whereas, as a modified example of the present embodiment, the conductivity types of the p type semiconductor region PR and the n type semiconductor region NR provided at the phase modulation part PM can be reversed. In that case, in FIGS. 6, and 9 to 11, the p type semiconductor region PR becomes an n type semiconductor region, and the n type semiconductor region NR becomes a p type semiconductor region. However, the present embodiment is more preferable than the case of the modified example in which the conductivity types of the p type semiconductor region PR and the n type semiconductor region NR are reversed. The reason for this is as follows.

Namely, when a light passes through the phase modulation part PM, the center (the center in a cross sectional view) of the rib part RB of the phase modulation part PM becomes the region with the largest light density. Further, comparison between the phase change amounts per carrier indicates that the phase change amount of holes is larger than the phase change amount of electrons. Herein, the phase change amount per carrier correspond to how much the phase of the light changes according to the variation per carrier. For this reason, the phase change amount can be more increased, and the modulation efficiency of the phase modulation part PM can be more improved in the present embodiment in which the p type semiconductor region using holes as the major carriers is arranged at the central part of the rib part RB with a larger light density than in the modified example in which the n type semiconductor region using electrons as the major carriers is arranged at the central part of the rib part RB with a larger light density. For this reason, the present embodiment is more preferable than the modified example. This also applies to Second Embodiment described later.

Further, the phase modulation part PM preferably has a plurality of main sections S1 and a plurality of secondary sections S2. In this case, in the direction of extension of the phase modulation part PM (herein, the X direction), the main sections S1 the secondary sections S2 are alternately arranged. For example, they are arranged like the main section S1, the secondary section S2, the main section S1, the secondary section S2, and the like in this sequence. Namely, the phase modulation part PM preferably has a plurality of main sections S1 and a plurality of secondary sections S2 alternately arranged in the direction of extension of the phase modulation part PM. The reason for this is as follows.

As described above, a voltage is supplied to the p type semiconductor region PR in the rib part RB of the main section S1 from the plug PG3 provided for the secondary section S2 via the p type semiconductor region PR of the secondary section S2. For this reason, the voltage value applied to the p type semiconductor region PR in the rib part RB can be more uniformized when the main section S1 having a large length in the X direction is divided into a plurality of parts, and the secondary sections S2 are provided therebetween than when one such long main section S1 is provided, and one secondary section S2 is provided adjacent thereto. This is because the resistance from the plug PG3 provided for the secondary section S2 to the p type semiconductor region PR at the central position in the X direction of the main section S1 can be reduced. For this reason, the phase modulation part PM preferably has a plurality of main sections S1 and a plurality of secondary sections S2 alternately arranged.

Further, when the phase modulation part PM has a plurality of main sections S1 and a plurality of secondary sections S2 alternately arranged, the arrangement pitch of the plurality of secondary sections S2 is preferably set so as to meet the following first condition or second condition.

Namely, the first condition is that a plurality of secondary sections S2 are not arranged at an equal pitch in the direction of extension of the phase modulation part PM (herein, the X direction).

The second condition is that, when a plurality of secondary sections S2 are arranged at an equal pitch in the direction of extension of the phase modulation part PM (herein, the X direction), the following expression 1, $$d \neq m\lambda/2n \quad \text{(Expression 1)}$$

holds.

Herein, d in the Expression 1 is the arrangement pitch of the plurality of secondary sections S2 in the direction of extension of the phase modulation part PM (herein, the X direction); λ in the Expression 1 is the wavelength of the light propagating in the phase modulation part PM (rib part RB); n in the Expression 1 is the refractive index of the phase modulation part PM (rib part RB); and m in the Expression 1 is an integer of 1 or more.

The reason why satisfying the first condition or second condition is preferable will be described below.

According to the arrangement pitch of the secondary sections S2, the pn junction surface present at the boundary between the main section S1 and the secondary section S2 may cause Bragg reflection, resulting in the transmission loss (propagation loss) of the light.

Namely, at the boundary between the main section S1 and the secondary section S2, the pn junction surface formed between the p type semiconductor region PRb of the secondary section S2 and the n type semiconductor region NR of the main section S1 is present. The pn junction surface is the surface substantially perpendicular to the direction of extension of the phase modulation part PM (herein, the X direction). The light propagating in the phase modulation part PM is made incident in the direction substantially perpendicular to the pn junction surface, and passes therethrough. At this step, a reflected wave of the light incident upon the pn junction surface may be generated. According to the arrangement pitch of the secondary sections S2, the reflected waves superimpose one another, so that Bragg reflection may be caused. When Bragg reflection is caused, the light propagating in the phase modulation part PM may be attenuated by Bragg reflection to generate the transmission loss of the light. For this reason, the arrangement pitch of the secondary sections S2 is desirably set so as not to cause Bragg reflection.

Namely, as the first condition, in the direction of extension of the phase modulation part PM (herein, the X direction), the plurality of secondary sections S2 are not arranged at an equal pitch. Bragg reflection caused by the pn junction surface present at the boundary between the main section S1 and the secondary section S2 may be caused when the pn junction surfaces present at the boundaries between the main sections S1 and the secondary sections S2 are arrayed at an equal interval in the direction of extension of the phase modulation part PM. For this reason, unless the plurality of secondary sections S2 are arranged at an equal pitch in the direction of extension of the phase modulation part PM, Bragg reflection due to the pn junction surface present at the boundary between the main section S1 and the secondary section S2 is not caused. Thus, it is possible to prevent the transmission loss due to Bragg reflection for the light propagating in the phase modulation part PM.

Further, when, in the direction of extension of the phase modulation part PM (herein, the X direction), the plurality of secondary sections S2 are arranged at an equal pitch, and when the following expression 2, $$d = m\lambda/2n \quad \text{(Expression 2)}$$

is satisfied, Bragg reflection is caused. Herein, what d, λ, n, and m in the Expression 2 correspond to, respectively, are as described in connection with the Expression 1.

In the case where, in the direction of extension of the phase modulation part PM, the plurality of secondary sections S2 are arranged at an equal pitch, when the arrangement pitch d of the secondary sections S2 satisfies the Expression 2, the phases of the reflected waves at the pn junction surfaces present at respective boundaries between the plurality of main sections S1 and the plurality of secondary sections S2 are in agreement with each other. Accordingly, the reflected waves superimpose one another, causing Bragg reflection. In this case, as described above, the light propagating in the phase modulation part PM may be attenuated by Bragg reflection, thereby to cause the transmission loss of the light.

Thus, when, in the direction of extension of the phase modulation part PM, the plurality of secondary sections S2 are arranged at an equal pitch, the arrangement pitch d of the secondary sections S2 is set so as not to satisfy the Expression 2. This prevents the occurrence of Bragg reflection. Incidentally, the Expression 2 being not satisfied, and the Expression 1 being satisfied are substantially equivalent with each other.

For this reason, in the case where, in the direction of extension of the phase modulation part PM, the plurality of secondary sections S2 are arranged at an equal pitch, when the arrangement pitch d of the secondary sections S2 is set so that the Expression 1 holds, Bragg reflection due to the pn junction surface present at the boundary between the main section S1 and the secondary section S2 is not caused. This can prevent the transmission loss due to Bragg reflection. Incidentally, the arrangement pitch d of the secondary sections S2 is shown in the FIGS. 5 and 6, and corresponds to the sum of the length (dimension) in the X direction of the main section S1 and the length (dimension) in the X direction of the secondary section S2. The plurality of secondary sections S2 being arranged at an equal pitch corresponds to the arrangement pitches d being equal to one another, and further also corresponds to the lengths in the X direction of the plurality of main sections S1 being equal to one another, and the lengths in the X direction of the plurality of secondary sections S2 being equal to one another.

Thus, when the phase modulation part PM has the plurality of main sections S1 and the plurality of secondary sections S2 alternately arranged, the arrangement pitch d of the plurality of secondary sections S2 is preferably set so as to satisfy the first condition or the second condition. This can prevent the transmission loss of the light due to Bragg reflection.

Further, when the arrangement pitch of the plurality of secondary sections S2 is large, in other words, when the interval between the plurality of secondary sections S2 is large, a voltage drop upon applying a voltage from the plug PG3 via the p type semiconductor region PR of the secondary section S2 to the p type semiconductor region PR in the rib part RB of the main section S1 increases. For this reason, the arrangement pitch of the plurality of secondary sections S2 is desirably set small to a certain degree. In other words, the interval between the plurality of secondary sections S2 is desirably set small to a certain degree. For this reason, when the arrangement pitch d of the secondary sections S2 is set so that $d<\lambda/2n$ holds, by reducing the arrangement pitch d of the secondary sections S2 while preventing the occurrence of Bragg reflection, it is possible to suppress the voltage drop upon applying a voltage from the plug PG3 via the p type semiconductor region PR of the secondary section S2 to the p type semiconductor region PR in the rib part RB of the main section S1.

Second Embodiment

Figure 36:
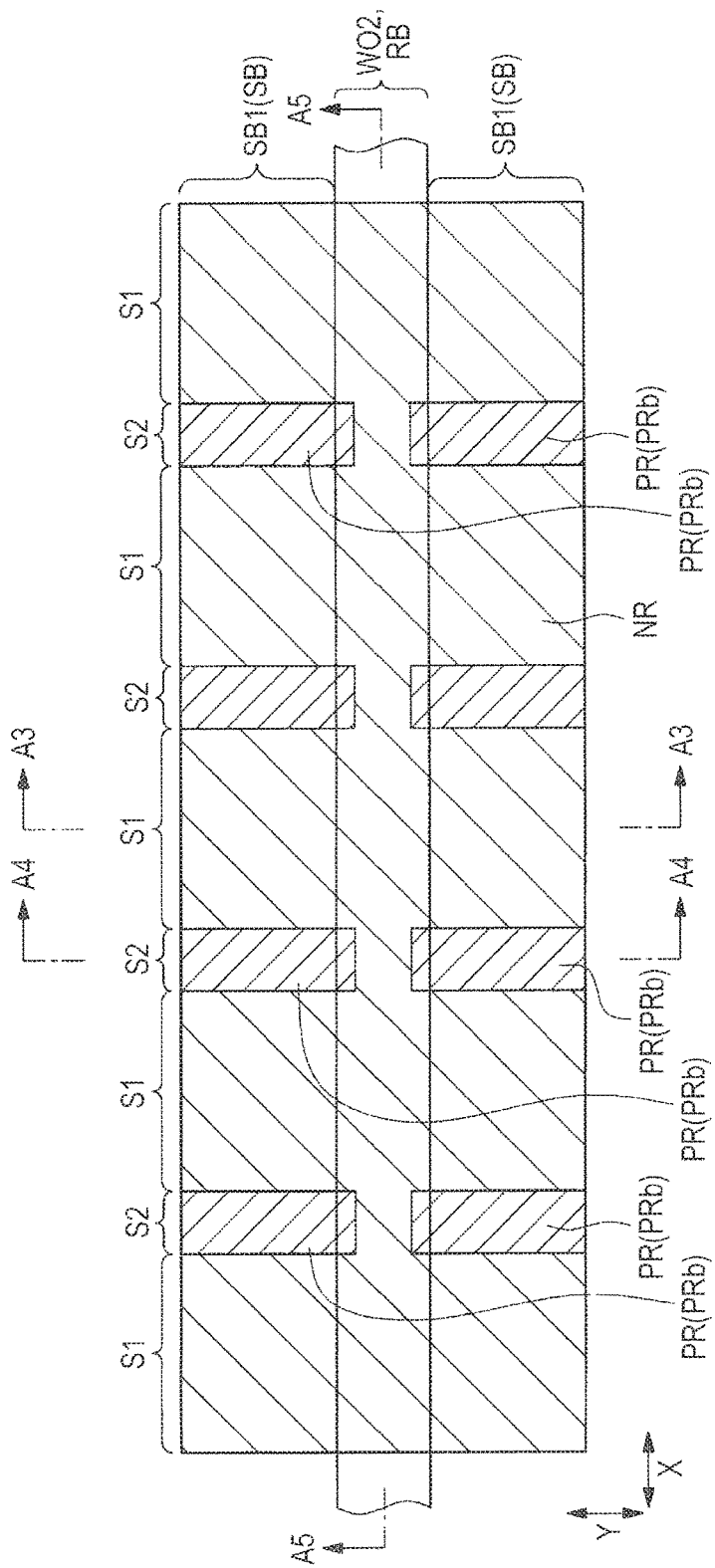
FIG. 36 is an essential part plan view of a semiconductor device of another embodiment.
Figure 37:
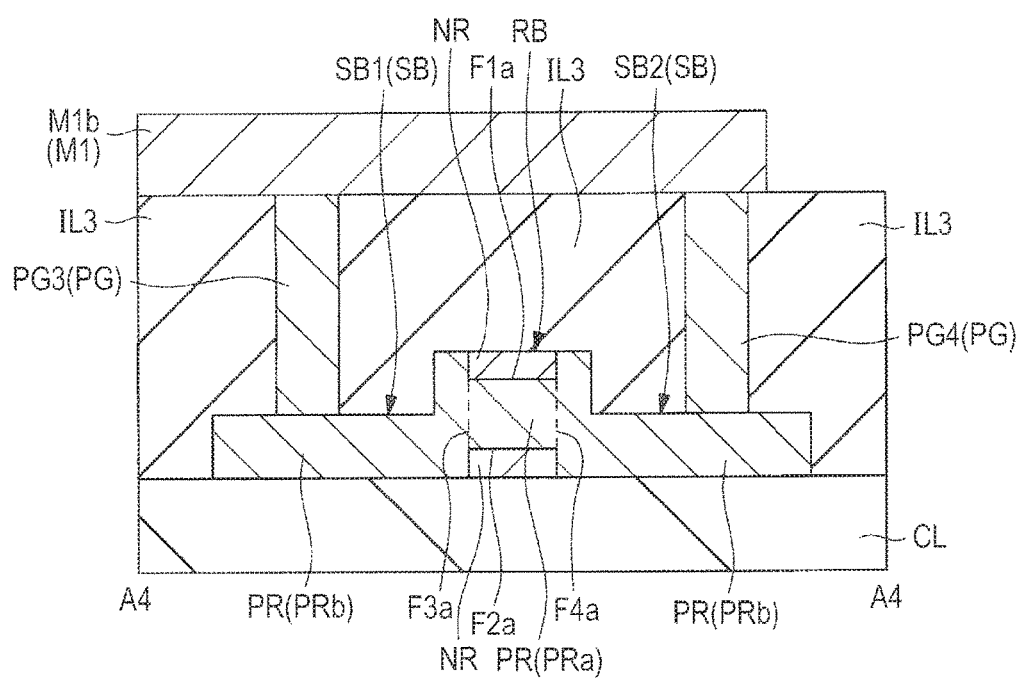
FIG. 37 is an essential part cross sectional view of the semiconductor device of the another embodiment.

A semiconductor device of the present Second Embodiment will be described by reference to FIGS. 36 and 37. FIGS. 36 and 37 are an essential part plan view and an essential part cross sectional view of the semiconductor device of the present Second Embodiment, respectively, and correspond to FIGS. 6 and 10 of the First Embodiment, respectively. FIG. 37 corresponds to a cross sectional view at the position along line A4-A4 of FIG. 36. The cross sectional view at the position along line A3-A3 of FIG. 36 in the present Second Embodiment is also the same as the FIG. 9 of the First Embodiment, and the cross sectional view at the position along line A5-A5 of FIG. 36 in the present Second Embodiment is also the same as the FIG. 11 in the First Embodiment, and hence herein these are not repeatedly shown. The FIGS. 2 to 5, 7, 9, and 11 can also be referred to in the present Second Embodiment.

The present Second Embodiment corresponds to Modified Example of the First Embodiment. The present Second Embodiment is different from the First Embodiment in the structure of the secondary section S2 of the phase modulation part PM (FIG. 37). The structure of the main section S1 of the phase modulation part PM in the present Second Embodiment is the same as that of the First Embodiment. For this reason, herein, the difference from the Second Embodiment will be mainly described, and the same matters as those of the First Embodiment are not repeatedly described.

In the present Second Embodiment, at the secondary section S2 of the phase modulation part PM, the p type semiconductor region PR is formed not only in the rib part RB and the slab part SB1, but also in the slab part SB2. At the secondary section S2 of the phase modulation part PM, the p type semiconductor region PR in the rib part RB, the p type semiconductor region PR in the part SB1, and the p type semiconductor region PR in the slab part SB2 are coupled with one another. Then, at the secondary section S2 of the phase modulation part PM, the plug PG3 is arranged over the slab part SB1. The plug PG3 is electrically coupled with the p type semiconductor region PR in the slab part SB1. Further, the plug PG4 is arranged over the slab part SB2. The plug PG4 is electrically coupled with the p type semiconductor region PR in the slab part SB2. As a result, at the phase modulation part PM, a voltage can be applied to the n type semiconductor region NR from the plugs PG1 and PG2, and a voltage can be applied to the p type semiconductor region PR from the plugs PG3 and PG4.

Below, a specific configuration of the secondary section S2 of the phase modulation part PM in the present Second Embodiment will be further described.

Also in the present Second Embodiment, at the secondary section S2 of the phase modulation part PM, the p type semiconductor region PR and the n type semiconductor region NR are formed in the rib part RB. However, the p type semiconductor region PR is not formed only at the central part of the rib part RB. Accordingly, the n type semiconductor region NR does not surround the entire circumference of the p type semiconductor region PR.

Namely, at the rib part RB of the secondary section S2 of the phase modulation part PM, the region of extension (specifically, extension in the X direction) of the p type semiconductor region PR formed at the rib part RB of the main section S1 of the phase modulation part PM becomes a p type semiconductor region PRa. The p type semiconductor region PRa of the secondary section S2 and the p type semiconductor region PR of the main section S1 are integrally coupled with each other in the X direction. Then, the region over the upper surface F1a of the p type semiconductor region PRa becomes the n type semiconductor region NR, and the region under the lower surface F2a of the p type semiconductor region PRa also becomes the n type semiconductor region NR. Accordingly, the upper surface F1a and the lower surface F2a of the p type semiconductor region PRa are in contact with the n type semiconductor region NR, and therefore are covered with the n type semiconductor region NR. For this reason, the upper surface F1a and the lower surface F2a of the p type semiconductor region PRa become pn junction surfaces. The n type semiconductor region NR of the secondary section S2 is integrally coupled with the n type semiconductor region NR of the main section S1 in the X direction.

However, the region adjacent to the side surface F3a of the p type semiconductor region PRa is not the n type semiconductor region NR, but the p type semiconductor region PRb. Further, the region adjacent to the side surface F4a of the p type semiconductor region PRa is also not the n type semiconductor region NR, but the p type semiconductor region PRb. For this reason, the side surface F3a and the side surface F4a of the p type semiconductor region PRa are in contact with not the n type semiconductor region NR, but the p type semiconductor region PRb. Therefore, the side surfaces F3a and F4a of the p type semiconductor region PRa are not pn junction surfaces.

Incidentally, the side surface F3a of the p type semiconductor region PRa of the secondary section S2 is the virtual extension surface of the side surface F3 of the p type semiconductor region PR of the main section S1. Further, the side surface F4a of the p type semiconductor region PRa of the secondary section S is the virtual extension surface of the side surface F4 of the p type semiconductor region PR of the main section S1. At the secondary section S2, the p type semiconductor region PRa and the p type semiconductor region PRb are integrally coupled with each other. Accordingly, a clear boundary (boundary surface) is not present between the p type semiconductor region PRa and the p type semiconductor region PRb. For this reason, in FIG. 37, the virtual side surfaces F3a and F4a are indicated with a dotted line. At the secondary section S2, the entire combination of the p type semiconductor region PRa and the p type semiconductor region PRb can be regarded as the p type semiconductor region PR.

Further, the p type semiconductor region PRa and the p type semiconductor region PRb of the secondary section S2 are integrally coupled with each other. In addition, the p type semiconductor region PRa of the secondary section S2 and the p type semiconductor region PR of the main section S1 are integrally coupled with each other in the X direction. Accordingly, the p type semiconductor region PR of the main section S1, the p type semiconductor region PRa of the secondary section S2, and the p type semiconductor region PRb of the secondary section S2 are coupled with one another. For this reason, the entire combination of the p type semiconductor region PR of the main section S1, and the p type semiconductor region PR of the secondary section S2, namely, the entire combination of the p type semiconductor region PR of the main section S1, the p type semiconductor region PRa of the secondary section S2, and the p type semiconductor region PRb of the secondary section S2 can be regarded as the p type semiconductor region PR (the p type semiconductor region PR formed at the phase modulation part PM).

Therefore, in the present Second Embodiment, the p type semiconductor region PR of the secondary section S2 of the phase modulation part PM has the upper surface F1a continuous to the upper surface F1 of the p type semiconductor region PR of the main section S1 in the X direction, and the lower surface F2a continuous to the lower surface F2 of the p type semiconductor region PR of the main section S1 in the X direction. The upper surface F1a and the lower surface F2a are in contact with the n type semiconductor region NR, and become pn junction surfaces. However, the p type semiconductor region PR of the secondary section S2 of the phase modulation part PM does not have the pn junction surface continuous to the side surface F3 of the p type semiconductor region PR of the main section S1 in the X direction, and the pn junction surface continuous to the side surface F4 of the p type semiconductor region PR of the main section S1 in the X direction. At the secondary section S2 of the phase modulation part PM, the position of extension of the side surface F3 of the p type semiconductor region PR of the main section S1 in the X direction (the position of the virtual side surface F3a), and the position of extension of the side surface F4 of the p type semiconductor region PR of the main section S1 (the position of the virtual side surface F4a) are in the p type semiconductor region PR of the secondary section S2. At the rib part RB of the secondary section S2, in addition to the extension region of the p type semiconductor region PR of the main section S1 (the p type semiconductor region PRa), the region on the left side (the side closer to the slab part SB1) of the extension surface (side surface F3a) of the side surface F3 of the p type semiconductor region PR of the main section S1, and the region on the right side (the side closer to the slab part SB2) of the extension surface (side surface F4a) of the side surface F4 of the p type semiconductor region PR of the main section S1 also become p type semiconductor regions PR.

Then, at the secondary section S2 of the phase modulation part PM, the p type semiconductor region PRb is formed almost entirely at the slab parts SB1 and SB2 on both sides of the rib part RB. In the case of FIG. 37, the n type semiconductor region NR is formed at a part of the rib part RB of the secondary section S2. However, the n type semiconductor region NR is not formed at the slab parts SB1 and SB2 of the secondary section S2.

The n type semiconductor region NR in the rib part RB of the secondary section S2 is coupled with the n type semiconductor region NR in the rib part RB of the main section S1 in the X direction. Further, the p type semiconductor region PRa in the rib part RB of the secondary section S2 is coupled with the p type semiconductor region PR in the rib part RB of the main section S1 in the X direction. However, the p type semiconductor region PRb of the secondary section S2 is adjacent to the n type semiconductor region NR of the main section S1 in the X direction. Namely, at the boundary between the secondary section S2 and the main section S1, the p type semiconductor region PRb of the secondary section S2 and the n type semiconductor region NR of the main section S1 are adjacent to each other in the X direction. The pn junction surface between the p type semiconductor region PRb of the secondary section S2 and the n type semiconductor region NR of the main section S1 is present at the boundary between the secondary section S2 and the main section S1. The pn junction surface between the p type semiconductor region PRb of the secondary section S2 and the n type semiconductor region NR of the main section S1 is substantially perpendicular to the X direction of the direction of extension of the phase modulation part PM.

Thus, at the main section S1 of the phase modulation part PM, the n type semiconductor region NR surrounds the entire circumference of the p type semiconductor region PR. However, at the secondary section S2 of the phase modulation part PM, the n type semiconductor region NR does not surround the entire circumference of the p type semiconductor region PR. Then, the p type semiconductor regions PR integrally coupled with the p type semiconductor region PR of the main section S1 are formed at the slab parts SB1 and SB2 of the secondary section S2. The plug PG3 arranged over the slab part SB1 is in contact with the p type semiconductor region PR formed at the slab part SB1 of the secondary section S2, and is electrically coupled with the p type semiconductor region PR. Further, the plug PG4 arranged over the slab part SB2 is in contact with the p type semiconductor region PR formed at the slab part SB2 of the secondary section S2, and is electrically coupled with the p type semiconductor region PR. As a result, the plugs PG3 and PG4 are electrically coupled with the p type semiconductor region PR of the secondary section S2, and is further electrically coupled with the p type semiconductor region PR in the rib part RB of the main section S1. For this reason, a desired voltage can be supplied from the plugs PG3 and PG4 via the p type semiconductor regions PR in the slab parts SB1 and SB2 of the secondary section S2 to the p type semiconductor region PR in the rib part RB of the secondary section S2. Further, the voltage can be supplied to the p type semiconductor region PR in the rib part RB of the main section S1.

Incidentally, in the present Second Embodiment, the plug PG4 is coupled not with the wire M1a, but with the wire M1b. Therefore, the plugs PG3 and PG4 are coupled with the common wire M1b, and a common voltage is supplied from the common wire M1b to the plugs PG3 and PG4.

Then, a description will be given to the manufacturing steps of the semiconductor device of the present Second Embodiment. FIGS. 38 to 43 are each an essential part cross sectional view of the semiconductor device of the present Second Embodiment during a manufacturing step.

Up to obtaining the structure of FIGS. 16 and 17, the manufacturing steps of the present Second Embodiment are also the same as those of the First Embodiment, and hence, herein, are not repeatedly described. The steps following FIGS. 16 and 17 will be described.

Figure 38:
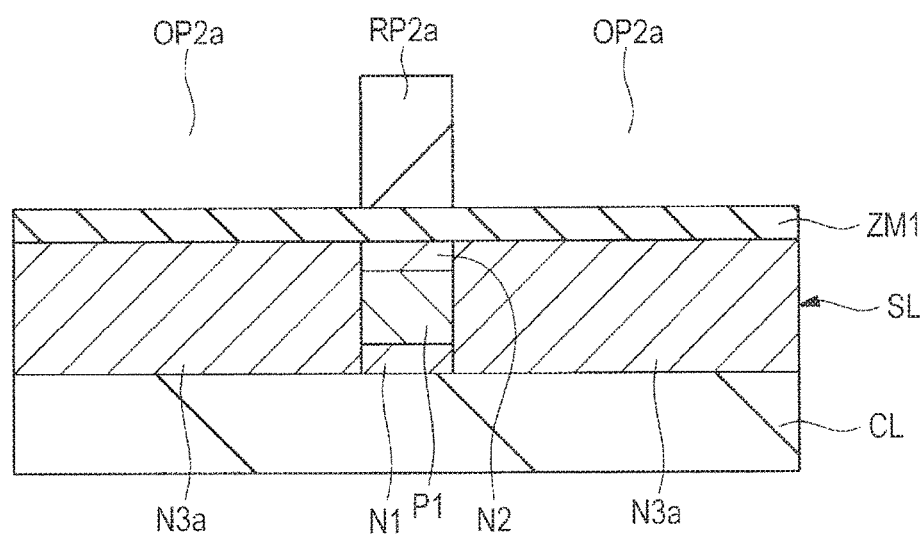
FIG. 38 is an essential part cross sectional view of the semiconductor device during a manufacturing step following FIG. 16.
Figure 39:
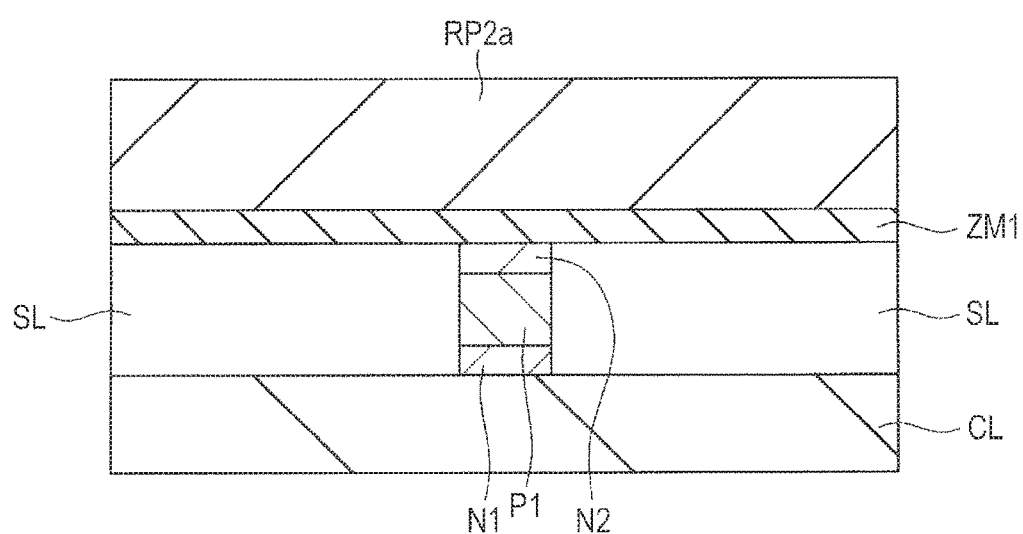
FIG. 39 is an essential part cross sectional view of the semiconductor device during the same manufacturing step as that of FIG. 38.

In the same manner as in the First Embodiment, the structure of the FIGS. 16 and 17 is obtained. Then, after removing the photoresist pattern RP1, as shown in FIGS. 38 and 39, a photoresist pattern RP2a is formed over the insulation film ZM1. The photoresist pattern RP2a is equivalent to the photoresist pattern RP2 of the First Embodiment, and has an opening OP2a in the region where an n type semiconductor region N3a described later should be formed.

Then, using the photoresist pattern RP2a as a mask, an n type impurity is ion implanted, thereby to form an n type semiconductor region N3a at the portion (i.e., the portion overlapping the opening OP2a in a plan view) of the semiconductor layer SL not covered with the photoresist pattern RP2a.

Specifically, at the semiconductor layer SL in the region to be the main section S1 of the phase modulation part PM later, n type semiconductor regions N3a are formed on both sides (both sides in the Y direction) of the lamination structure of the n type semiconductor region N1, the p type semiconductor region P1, and the n type semiconductor region N2 in such a manner as to be adjacent to both side surfaces of the lamination structure. The n type semiconductor region N3a is equivalent to the n type semiconductor region N3 of the First Embodiment, but is different from the n type semiconductor region N3 of the First Embodiment in that the n type semiconductor region N3a is not formed at the semiconductor layer SL in the region to be the secondary section S2 of the phase modulation part PM later.

Figure 40:
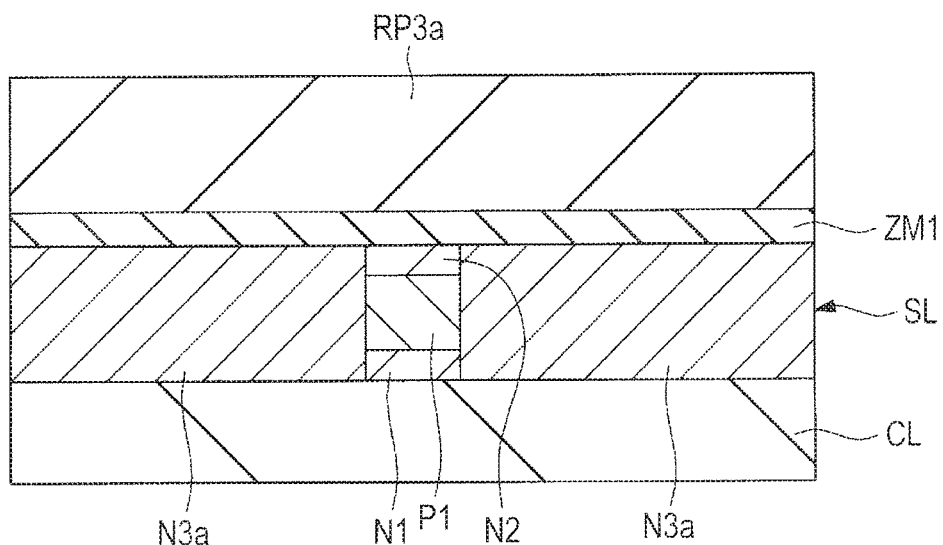
FIG. 40 is an essential part cross sectional view of the semiconductor device during a manufacturing step following FIG. 38.
Figure 41:
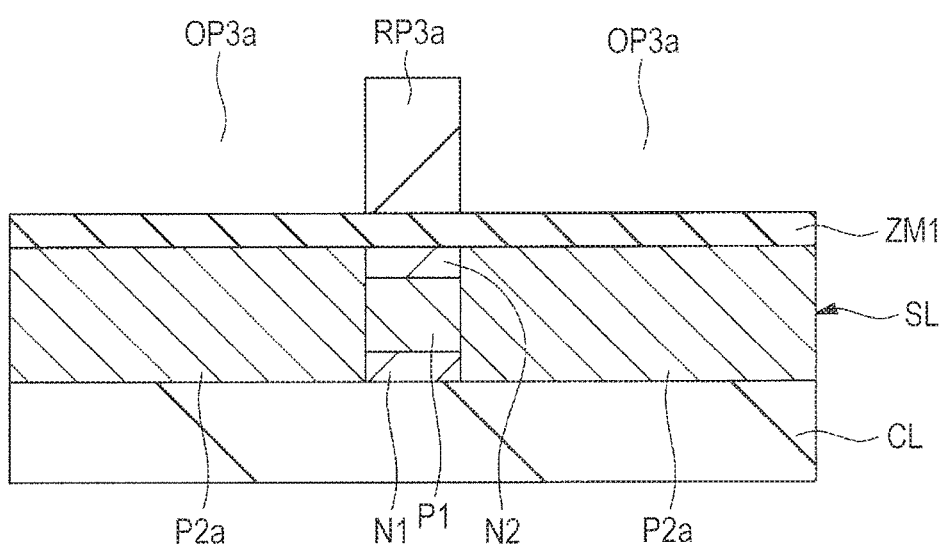
FIG. 41 is an essential part cross sectional view of the semiconductor device during the same manufacturing step as that of FIG. 40.

Then, after removing the photoresist pattern RP2a, using a photolithography technology, as shown in FIGS. 40 and 41, a photoresist pattern RP3a is formed over the insulation film ZM1. The photoresist pattern RP3a is equivalent to the photoresist pattern RP3 of the First Embodiment, and has an opening OP3a in the region where a p type semiconductor region P2a described later should be formed.

Then, using the photoresist pattern RP3a as a mask, a p type impurity is ion implanted, thereby to forma p type semiconductor region P2a at the portion (i.e., the portion overlapping the opening OP3a in a plan view) of the semiconductor layer SL not covered with the photoresist pattern RP3a.

Specifically, at the semiconductor layer SL in the region to be the secondary section S2 of the phase modulation part PM later, p type semiconductor regions P2a are formed on both sides (on both sides in the Y direction) of the lamination structure of the n type semiconductor region N1, the p type semiconductor region P1, and the n type semiconductor region N2 in such a manner as to adjacent to both side surfaces of the lamination structure. The p type semiconductor region P2a is not formed at the semiconductor layer SL in the region to be the main section S1 of the phase modulation part PM later. Thereafter, the photoresist pattern RP3a is removed.

At this stage, at the semiconductor layer SL in the region to be the rib part RB of the phase modulation part PM later, the lamination structure of the n type semiconductor region N1, the p type semiconductor region P1, and the n type semiconductor region N2 is formed. Then, at the semiconductor layer SL in the region to be the main section S1 of the phase modulation part PM later, n type semiconductor regions N3 are formed on both sides of the lamination structure. At the semiconductor layer SL in the region to be the secondary section S2 of the phase modulation part PM later, p type semiconductor regions P2a are formed on both sides of the lamination structure. At any subsequent timing, a heat treatment (activating annealing) for activating the impurity doped by the ion implantation up to this point can be performed.

The subsequent steps in the present Second Embodiment are also basically the same as those of the First Embodiment.

Figure 42:
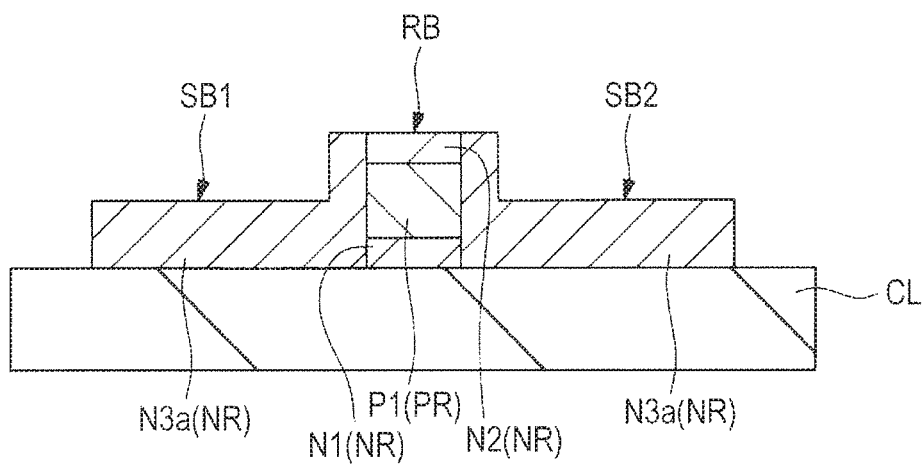
FIG. 42 is an essential part cross sectional view of the semiconductor device during a manufacturing step following FIG. 40.
Figure 43:
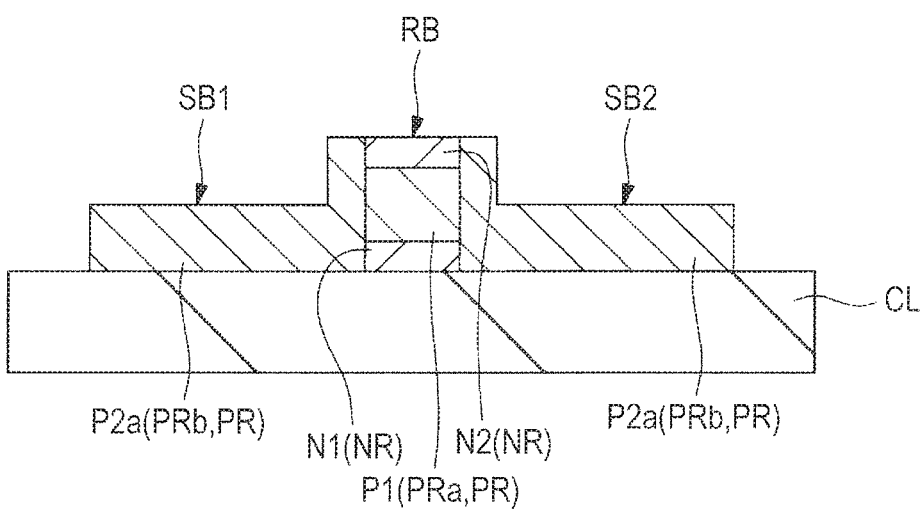
FIG. 43 is an essential part cross sectional view of the semiconductor device during the same manufacturing step as that of FIG. 42.

Namely, after removing the insulation film ZM1, by etching using the photoresist pattern RP4, the semiconductor layer SL is patterned, thereby to form the optical waveguides WO1 and WO2 and the phase modulation part PM. However, at this stage, the phase modulation part PM still entirely has the same thickness. Then, by etching (half etching) using the photoresist pattern RP5, a part of the semiconductor layer SL forming the phase modulation part PM is reduced in thickness. This results in the formation of the phase modulation part PM of a rib type structure having the rib part RB, and the slab parts SB1 and SB2 as shown in FIGS. 42 and 43.

At the main section S1 of the phase modulation part PM, in a cross sectional view, the lamination structure of the n type semiconductor region N1, the p type semiconductor region P1, and the n type semiconductor region N2 is present in the rib part RB, and the n type semiconductor regions N3 are present on both sides of the lamination structure at the rib part RB, and in the slab parts SB1 and SB2. At the secondary section S2 of the phase modulation part PM, in a cross sectional view, the lamination structure of the n type semiconductor region N1, the p type semiconductor region P1, and the n type semiconductor region N2 is present in the rib part RB, and the p type semiconductor regions P2 are present on both sides of the lamination structure, and in the slab parts SB1 and SB2 at the rib part RB. At the main section S1 of the phase modulation part PM, the p type semiconductor region P2 is not formed in the rib part RB and the slab parts SB1 and SB2. Further, at the secondary section S2 of the phase modulation part PM, the n type semiconductor region N3 is not formed in the rib part RB and the slab parts SB1 and SB2. At the main section S1 of the phase modulation part PM, in a cross sectional view, the p type semiconductor region P1 is arranged at the central part of the rib part RB, and an n type semiconductor region formed of the n type semiconductor regions N1, N2, and N3 is present in such a manner as to surround the entire circumference of the p type semiconductor region P1 in the rib part RB. The n type semiconductor regions are also present in the slab parts SB1 and SB2.

The p type semiconductor region PR of the main section S1 and the p type semiconductor region PRa of the secondary section S2 of the phase modulation part PM are formed of the p type semiconductor region P1. The p type semiconductor region PRb of the secondary section S2 of the phase modulation part PM is formed of the p type semiconductor region P2a. Whereas, the n type semiconductor regions NR of the main section S1 and secondary section S2 of the phase modulation part PM are formed of the n type semiconductor regions N1, N2, and N3. Namely, the entire combination of the n type semiconductor region N1, the n type semiconductor region N2, and the n type semiconductor region N3 becomes the n type semiconductor region NR.

Thereafter, the interlayer insulation film IL3 is formed, but herein is not shown and is not described. In this manner, the semiconductor device of the present Second Embodiment is manufactured.

In the present Second Embodiment, at the secondary section S2 of the phase modulation part PM, the p type semiconductor regions PR are provided at the slab parts SB1 and SB2 on both sides of the rib part RB. Accordingly, a common voltage can be applied via the plug PG to the p type semiconductor region PR of the slab part SB1 and the p type semiconductor region PR of the slab part SB2. For this reason, the electric potential of the p type semiconductor region PR of the phase modulation part PM can be more stabilized. Thus, the electric potential of the p type semiconductor region PR of the phase modulation part PM becomes more likely to be fixed at a desired electric potential.

On the other hand, in the First Embodiment, at the secondary section S2 of the phase modulation part PM, the p type semiconductor region PR is provided at one slab part SB1 of the slab parts SB1 and SB2 on both sides of the rib part RB. However, without providing the p type semiconductor region PR, the n type semiconductor region NR is provided at the other slab part SB2. In association therewith, in the First Embodiment, the area of the pn junction surface formed at the rib part RB of the secondary section S2 of the phase modulation part PM can be set larger than that in the present Second Embodiment. This results in that the volume of the depletion layer formed at the rib part RB of the main section S1 at the time of reverse bias application is equal between in the First Embodiment and in the present Second Embodiment. However, the volume of the depletion layer formed at the rib part RB of the secondary section S2 at the time of reverse bias application is larger in the First Embodiment than in the present Second Embodiment. As a result, in the First Embodiment, the modulation efficiency of the phase modulation part PM can be more improved than in the present Second Embodiment.

For this reason, from the viewpoint of maximizing the area of the pn junction not only at the main section S1 of the phase modulation part PM but also at the secondary section S2 of the phase modulation part PM, the First Embodiment is more preferable. On the other hand, from the viewpoint of facilitating fixing of the electric potential of the p type semiconductor region PR of the phase modulation part PM at a desired electric potential, the present Second Embodiment is more preferable.

Up to this point, the invention completed by the present inventors was specifically described by way of embodiments thereof. However, it is naturally understood that the present invention is not limited to the embodiments, and may be variously changed within the scope not departing from the gist thereof.

Other than these, a part of the contents described in the embodiments will be described below.

[Additional Statement 1]

A method for manufacturing a semiconductor device, includes the steps of:

(a) providing a substrate having an insulation layer, and a semiconductor layer formed over the insulation layer;

(b) forming a first semiconductor region of a first conductivity type, a second semiconductor region of a second conductivity type different from the first conductivity type arranged over the first semiconductor region, and a third semiconductor region of the first conductivity type arranged over the first semiconductor region in the semiconductor layer;

(c) forming a fourth semiconductor region of the first conductivity type in the semiconductor layer; and (d) processing the semiconductor layer, and forming an optical waveguide part having a rib part to be an optical waveguide, a first slab part arranged adjacent to one side of both sides of the rib part, and a second slab part arranged adjacent to the other side, in which at a first portion of the optical waveguide part, in a cross sectional view perpendicular to the direction of extension of the rib part, a lamination structure of the first semiconductor region, the second semiconductor region, and the third semiconductor region is present, and the fourth semiconductor region is present on both sides of the lamination structure at the rib part, and in the first slab part and the second slab part.

[Additional Statement 2]

In the method for manufacturing a semiconductor device according to Additional Statement 1, at the first portion of the optical waveguide part, in a cross sectional view perpendicular to the direction of extension, the second semiconductor region is arranged at the central part of the rib part, and the first, third, and fourth semiconductor regions are present in such a manner as to surround the entire circumference of the second semiconductor region in the rib part.

[Additional Statement 3]

The method for manufacturing a semiconductor device according to Additional Statement 1, further includes a step of (d1) forming a fifth semiconductor region of the second conductivity type in the semiconductor layer, in which the optical waveguide part has a second portion adjacent to the first portion in the direction of extension, in which at the first portion of the optical waveguide part, the fifth semiconductor region is not formed in the rib part, the first slab part, and the second slab part, and in which at the second portion of the optical waveguide part, in a cross sectional view perpendicular to the direction of extension, the lamination structure is present in the rib part, the fifth semiconductor region is present on one side of both sides of the lamination structure at the rib part, and in the first slab part, and the fourth semiconductor region is present on the other side of both sides of the lamination structure at the rib part, and in the second slab part.

[Additional Statement 4]

The method for manufacturing a semiconductor device according to Additional Statement 1, further includes a step of (d2) forming a fifth semiconductor region of the second conductivity type in the semiconductor layer, in which the optical waveguide part has a second portion adjacent to the first portion in the direction of extension, in which at the first portion of the optical waveguide part, the fifth semiconductor region is not formed in the rib part, the first slab part, and the second slab part, and in which at the second portion of the optical waveguide part, in a cross sectional view perpendicular to the direction of extension, the lamination structure is present in the rib part, and the fifth semiconductor region is present on both sides of the lamination structure at the rib part, and in the first slab part and the second slab part.

What is claimed is:

1. A semiconductor device, comprising:
a first insulation film;
a first optical waveguide part formed over the first insulation film; and
a second insulation film formed over the first insulation film in such a manner as to cover the first optical waveguide part,
wherein in the first optical waveguide part, a first semiconductor region of a first conductivity type, and a second semiconductor region of a second conductivity type different from the first conductivity type are formed,
wherein at a first portion of the first optical waveguide part, in a cross sectional view perpendicular to the direction of extension of the first optical waveguide part, the first semiconductor region is arranged at the central part of the first optical waveguide part, and the second semiconductor region is arranged in such a manner as to surround the entire circumference of the first semiconductor region.

2. The semiconductor device according to claim 1,
wherein the first optical waveguide part has a second portion adjacent to the first portion in the direction of extension, and
wherein at the second portion of the first optical waveguide part, in a cross sectional view perpendicular to the direction of extension of the first optical waveguide part, the first semiconductor region is arranged at the central part of the first optical waveguide part, and the second semiconductor region is arranged in such a manner as not to surround the entre circumference of the first semiconductor region.

3. The semiconductor device according to claim 2,
wherein at the second portion of the first optical waveguide part, in a cross sectional view perpendicular to the direction of extension, the first semiconductor region and the second semiconductor region are adjacent to each other,
wherein the first semiconductor region at the first portion of the first optical waveguide part is coupled with the first semiconductor region at the second portion of the first optical waveguide part, and
wherein the second semiconductor region at the first portion of the first optical waveguide part is coupled with the second semiconductor region at the second portion of the first optical waveguide part.

4. The semiconductor device according to claim 1,
wherein the first optical waveguide part has a rib part to be an optical waveguide, a first slab part arranged in such a manner as to be adjacent to one side of both sides of the rib part, and a second slab part arranged in such a manner as to be adjacent to the other side,
wherein respective thicknesses of the first slab part and the second slab part are smaller than the thickness of the rib part,
wherein at the first portion of the first optical waveguide part, in a cross sectional view perpendicular to the direction of extension, the first semiconductor region is arranged at the central part of the rib part, and the second semiconductor region is arranged in such a manner as to surround the entire circumference of the first semiconductor region in the rib part.

5. The semiconductor device according to claim 2,
wherein the first optical waveguide part has a rib part to be an optical waveguide, a first slab part arranged in such a manner as to be adjacent to one side of both sides of the rib part, and a second slab part arranged in such a manner as to be adjacent to the other side,
wherein respective thicknesses of the first slab part and the second slab part are smaller than the thickness of the rib part,
wherein at the second portion of the first optical waveguide part, in a cross sectional view perpendicular to the direction of extension, the first semiconductor region is arranged at the central part of the rib part, and the second semiconductor region is arranged in such a manner as not to surround the entire circumference of the first semiconductor region in the rib part.

6. The semiconductor device according to claim 1,
wherein at the first portion of the first optical waveguide part, a first upper surface, a first lower surface, a first side surface, and a second side surface opposite to the first side surface of the first semiconductor region are in contact with the second semiconductor region.

7. The semiconductor device according to claim 2,
wherein the first semiconductor region of the second portion of the first optical waveguide part has a first surface continuous with the first upper surface of the first portion in the direction of extension, a second surface continuous with the first lower surface of the first portion in the direction of extension, and a third surface continuous with the first side surface of the first portion in the direction of extension,
wherein at the second portion of the first optical waveguide part, the first surface, the second surface, and the third surface of the first semiconductor region are in contact with the second semiconductor region,
wherein the first semiconductor region of the second portion of the first optical waveguide part does not have a pn junction surface continuous with the second side surface of the first portion in the direction of extension, and
wherein at the second portion of the first optical waveguide part, the position of extension of the second side surface of the first portion in the direction of extension is in the first semiconductor region.

8. The semiconductor device according to claim 2,
wherein the first semiconductor region of the second portion of the first optical waveguide part has a first surface continuous with the first upper surface of the first portion in the direction of extension, and a second surface continuous with the first lower surface of the first portion in the direction of extension,
wherein at the second portion of the first optical waveguide part, the first surface and the second surface of the first semiconductor region are in contact with the second semiconductor region,
wherein the first semiconductor region of the second portion of the first optical waveguide part does not have a pn junction surface continuous with the first side surface of the first portion in the direction of extension, and a pn junction surface continuous with the second side surface of the first portion in the direction of extension, and wherein at the second portion of the first optical waveguide part, the position of extension of the first side surface of the first portion in the direction of extension, and the position of extension of the second side surface of the first portion in the direction of extension are in the first semiconductor region.

9. The semiconductor device according to claim 4, wherein at the first portion of the first optical waveguide part, the second semiconductor regions are also formed in the first slab part and the second slab part, and the second semiconductor region in the rib part, the second semiconductor region in the first slab part, and the second semiconductor region in the second slab part are coupled with one another.

10. The semiconductor device according to claim 4, further comprising:
a first conductive plug and a second conductive plug buried in the second insulation film,
wherein the first conductive plug is arranged over the first slab part at the first portion of the first optical waveguide part, and is electrically coupled with the second semiconductor region, and
wherein the second conductive plug is arranged over the second slab part at the first portion of the first optical waveguide part, and is electrically coupled with the second semiconductor region.

11. The semiconductor device according to claim 5, wherein at the second portion of the first optical waveguide part, in a cross sectional view perpendicular to the direction of extension, the first semiconductor region and the second semiconductor region are arranged adjacent to each other in the rib part,
wherein the first semiconductor region in the rib part at the first portion of the first optical waveguide part is coupled with the first semiconductor region in the rib part at the second portion of the first optical waveguide part, and
wherein the second semiconductor region in the rib part at the first portion of the first optical waveguide part is coupled with the second semiconductor region in the rib part at the second portion of the first optical waveguide part.

12. The semiconductor device according to claim 11, wherein at the second portion of the first optical waveguide part, the first semiconductor region is also formed in the first slab part, and the first semiconductor region in the rib part and the first semiconductor region in the first slab part are coupled with each other.

13. The semiconductor device according to claim 5, further comprising:
a first conductive plug, a second conductive plug, and a third conductive plug buried in the second insulation film,
wherein the first conductive plug is arranged over the first slab part at the first portion of the first optical waveguide part, and is electrically coupled with the second semiconductor region,
wherein the second conductive plug is arranged over the second slab part at the first portion of the first optical waveguide part, and is electrically coupled with the second semiconductor region, and wherein the third conductive plug is arranged over the first slab part at the second portion of the first optical waveguide part, and is electrically coupled with the first semiconductor region.

14. The semiconductor device according to claim 12, further comprising:
a fourth conductive plug buried in the second insulation film,
wherein at the second portion of the first optical waveguide part, the second semiconductor region is formed in the second slab part, and the second semiconductor region in the rib part and the second semiconductor region in the second slab part are coupled with each other, and
wherein the fourth conductive plug is arranged over the second slab part at the second portion of the first optical waveguide part, and is electrically coupled with the second semiconductor region.

15. The semiconductor device according to claim 13, further comprising:
a fourth conductive plug buried in the second insulation film,
wherein at the second portion of the first optical waveguide part, the first semiconductor region is also formed in the second slab part, and the first semiconductor region in the rib part, the first semiconductor region in the first slab part, and the first semiconductor region in the second slab part are coupled with one another, and
wherein the fourth conductive plug is arranged over the second slab part at the second portion of the first optical waveguide part, and is electrically coupled with the first semiconductor region.

16. The semiconductor device according to claim 1, wherein the first conductivity type is a p type, and the second conductivity type is an n type.

17. The semiconductor device according to claim 1, wherein a first voltage to be applied to the first semiconductor region, and a second voltage to be applied to the second semiconductor region are controlled, thereby to control the phase of a light propagating through the first optical waveguide part.

18. The semiconductor device according to claim 2, wherein the first optical waveguide part has the first portions and the second portions alternately arranged in the direction of extension.

19. The semiconductor device according to claim 18, wherein in the direction of extension, the second portions are not arranged at an equal pitch.

20. The semiconductor device according to claim 18, wherein in the direction of extension, the second portions are arranged at an equal pitch, and
wherein $$d \ne m\lambda/2n \qquad \text{(Expression 1)}$$

holds, where d represents the arrangement pitch of the second portions in the direction of extension, λ represents the wavelength of the light propagating in the first optical waveguide part, n represents the refractive index of the first optical waveguide part, and m represents an integer of 1 or more.

* * * * *